(12) United States Patent
Tanida et al.

(10) Patent No.: US 8,063,754 B2
(45) Date of Patent: Nov. 22, 2011

(54) VEHICLE STATE INFORMATION TRANSMISSION APPARATUS USING TACTILE DEVICE

(75) Inventors: Koji Tanida, Saitama (JP); Shugo Kondo, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 310 days.

(21) Appl. No.: 12/002,371

(22) Filed: Dec. 17, 2007

(65) Prior Publication Data

US 2008/0174415 A1    Jul. 24, 2008

(30) Foreign Application Priority Data

Dec. 15, 2006 (JP) ................. P2006-338803
Dec. 15, 2006 (JP) ................. P2006-338837
Apr. 26, 2007 (JP) ................. P2007-117630

(51) Int. Cl.
  *B60Q 1/00* (2006.01)
(52) U.S. Cl. ............ 340/435; 340/407.1; 340/988; 340/691.2; 340/7.6
(58) Field of Classification Search .......... 340/435, 340/691.2, 407.1, 988, 438, 576, 575, 426.31, 340/439; 116/36, 31; 701/36, 1
  See application file for complete search history.

(56) References Cited

U.S. PATENT DOCUMENTS

| | | | |
|---|---|---|---|
| 6,320,496 B1 * | 11/2001 | Sokoler et al. ............. | 340/407.1 |
| 6,744,370 B1 * | 6/2004 | Sleichter et al. ............. | 340/576 |
| 7,141,520 B2 * | 11/2006 | Zimmer et al. .................. | 501/5 |
| 7,386,371 B2 * | 6/2008 | Kuge et al. ........................ | 701/1 |
| 7,602,278 B2 * | 10/2009 | Prost-Fin et al. ............. | 340/438 |
| 7,902,693 B2 * | 3/2011 | Hijikata et al. .............. | 307/10.1 |
| 2003/0197601 A1 * | 10/2003 | Takagi et al. .................. | 340/435 |
| 2004/0049323 A1 * | 3/2004 | Tijerina et al. ..................... | 701/1 |
| 2005/0021204 A1 * | 1/2005 | Kudo .............................. | 701/36 |
| 2006/0052907 A1 * | 3/2006 | Hein .................................. | 701/1 |
| 2006/0097857 A1 * | 5/2006 | Osaka et al. .................. | 340/435 |
| 2007/0109104 A1 * | 5/2007 | Altan et al. ................. | 340/407.1 |
| 2007/0176742 A1 * | 8/2007 | Hofmann et al. ............. | 340/7.6 |

FOREIGN PATENT DOCUMENTS

| | | |
|---|---|---|
| JP | 2001-010518 | 1/2001 |
| JP | 2001-080436 | 3/2001 |
| JP | 2002-002418 | 1/2002 |
| JP | 2005-041471 | 2/2005 |
| JP | 2005-182406 | 7/2005 |
| JP | 2006-240412 | 9/2006 |
| JP | 2006-298166 | 11/2006 |

* cited by examiner

*Primary Examiner* — Hoi Lau

(74) *Attorney, Agent, or Firm* — Carrier Blackman & Associates, P.C.; Joseph P. Carrier; William D. Blackman

(57) ABSTRACT

A vehicle state information transmission apparatus includes a warning device for issuing a warning to the driver based on information pertaining to a vehicle state detected by a vehicle state detecting device, and a vehicle state information transmission device for transmitting the information pertaining to the vehicle state detected by the vehicle state detecting device to the driver. The vehicle state information transmission device includes a tactile device, which transmits a change in the vehicle state via a vehicle operating device such as steering wheel to the driver as tactile information. The tactile device is operable in conjunction with the warning means.

15 Claims, 36 Drawing Sheets

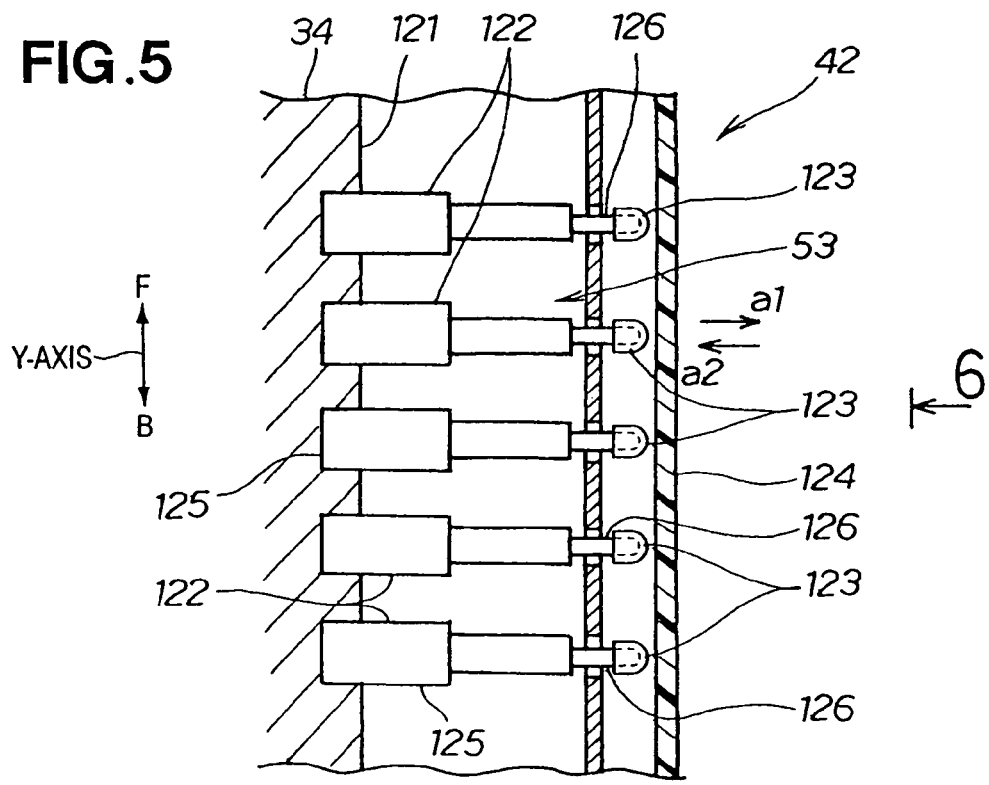
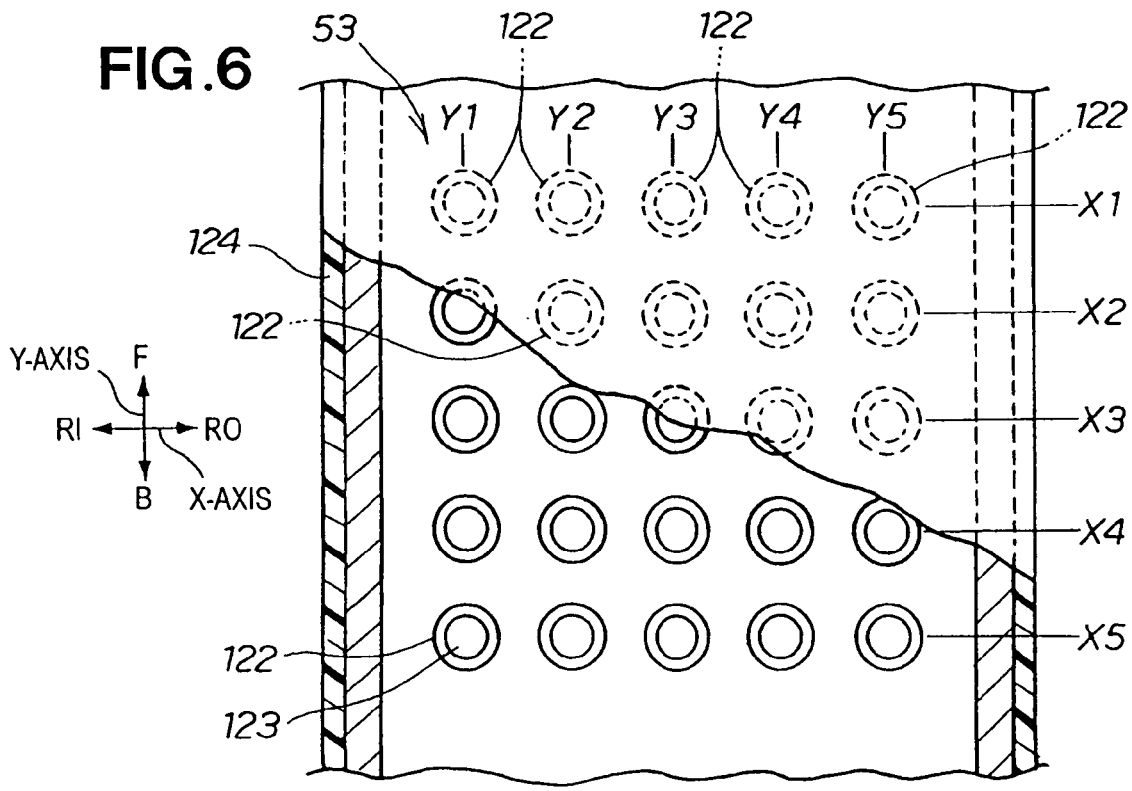

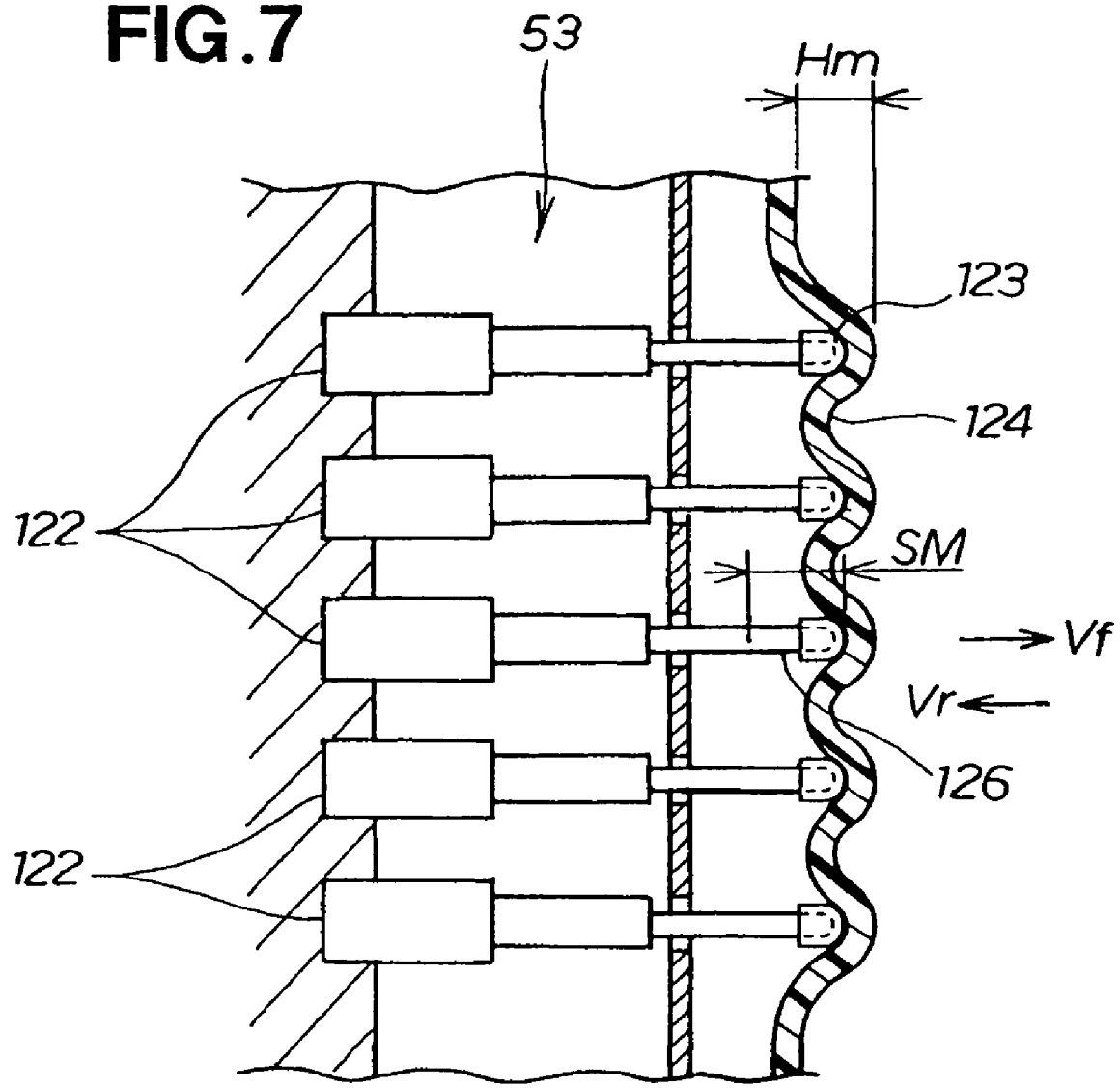

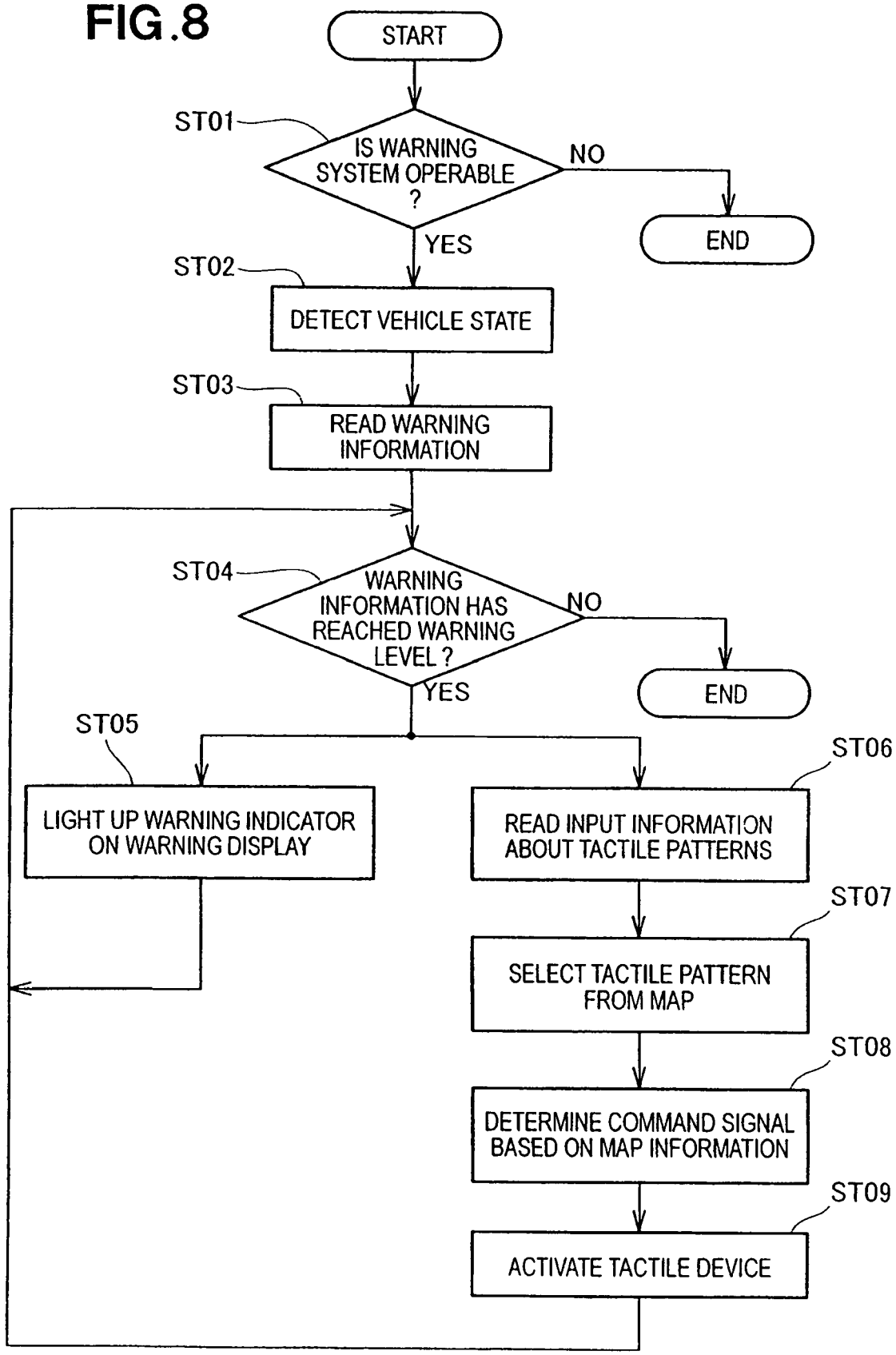

FIG.9A
FIG.9B
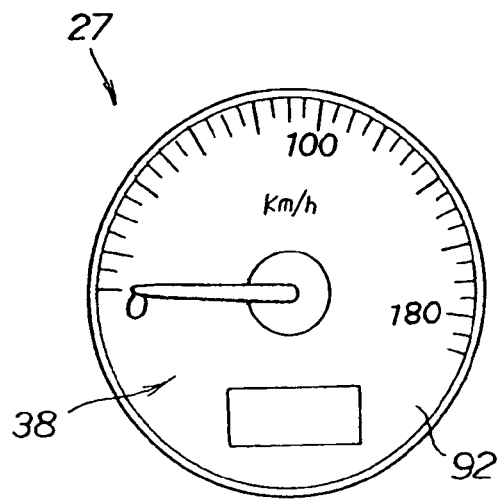
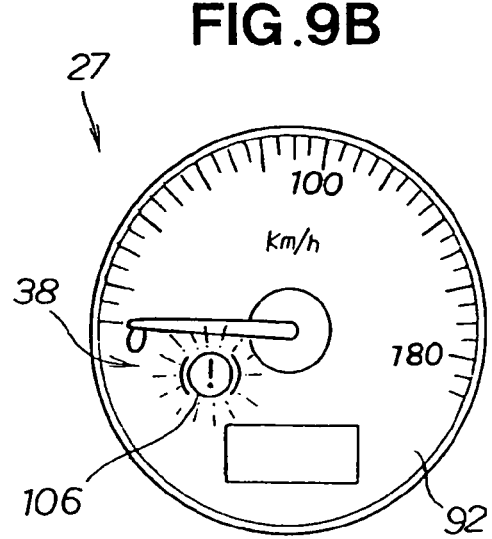
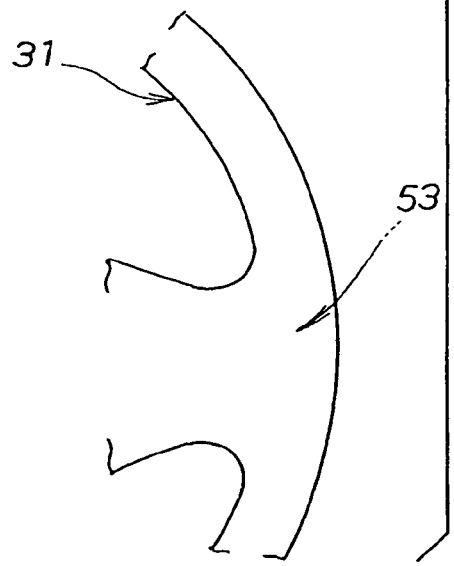
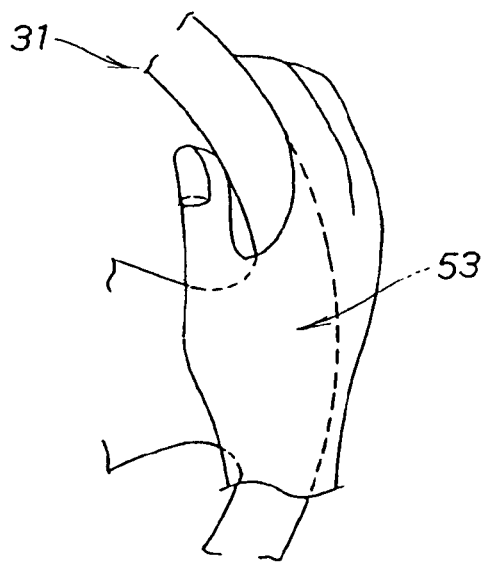
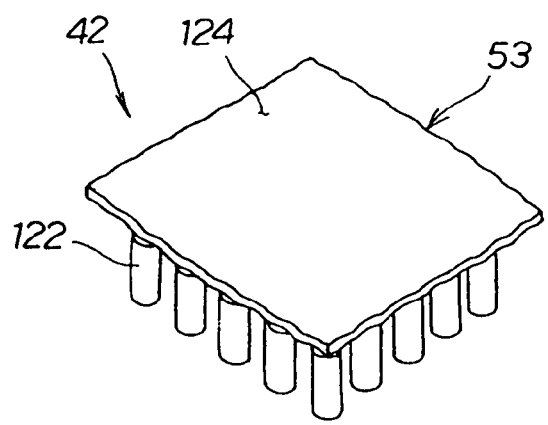

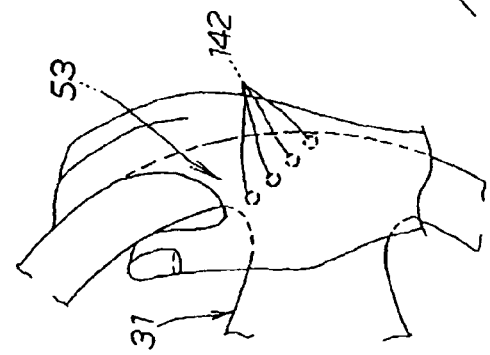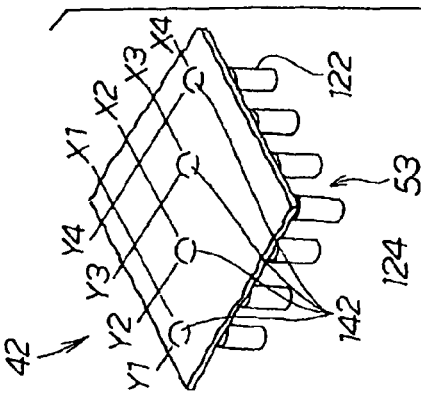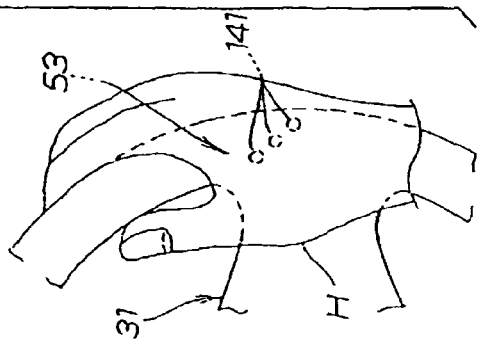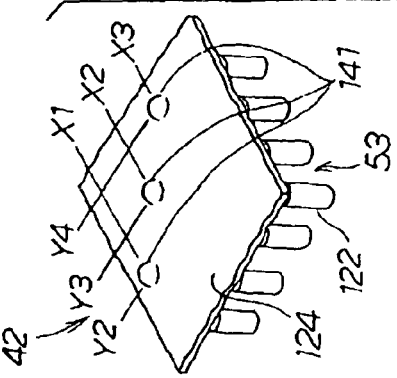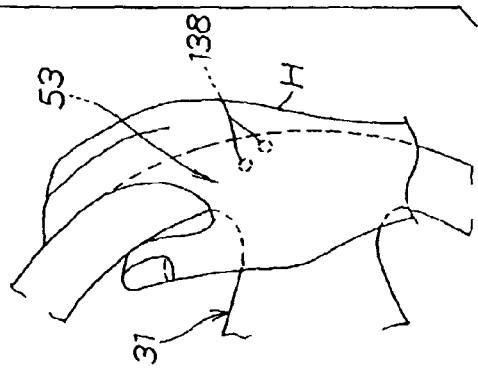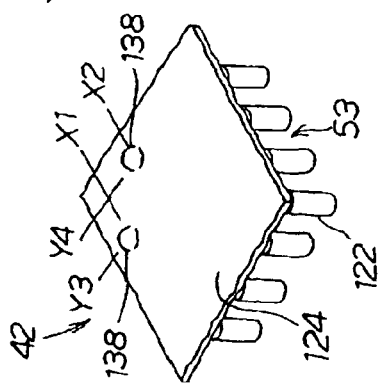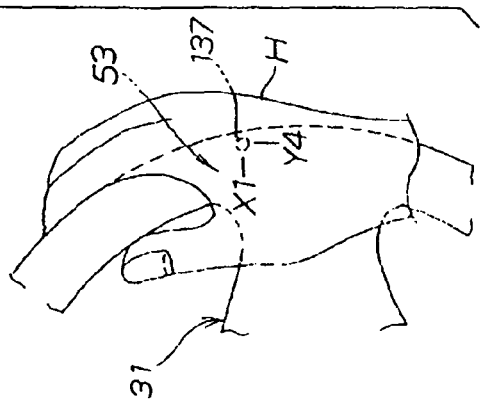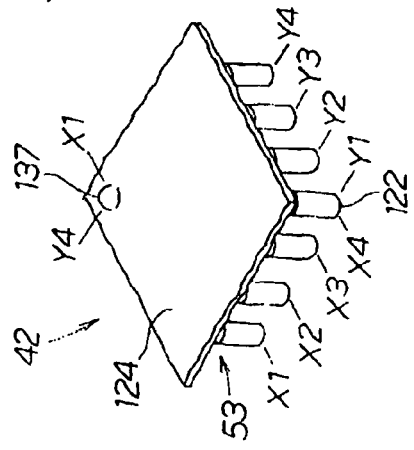

FIG.12A
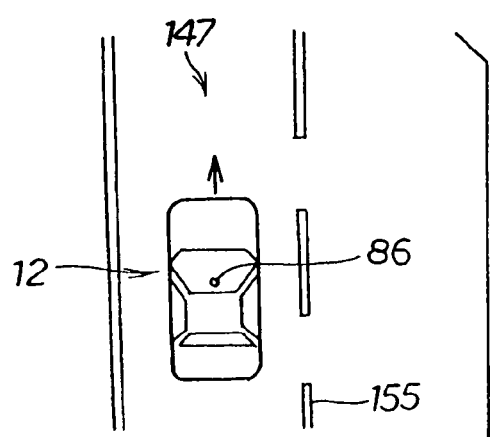
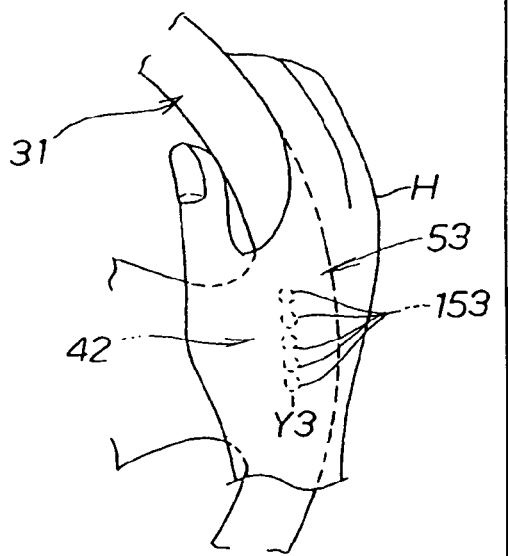
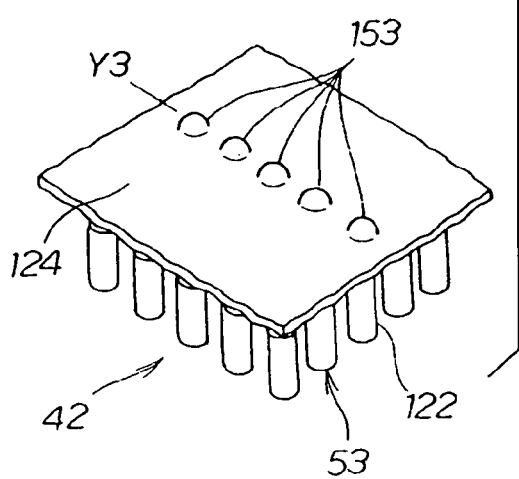
FIG.12B
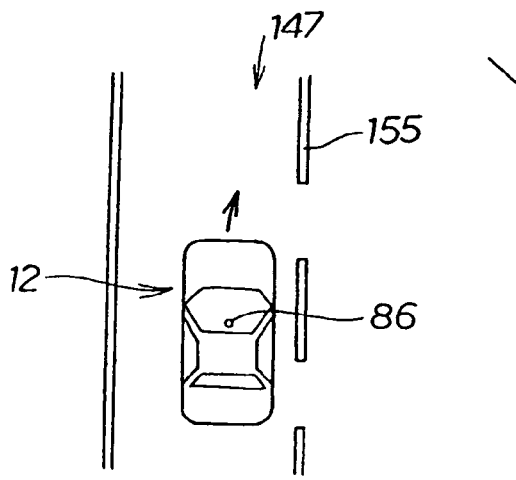
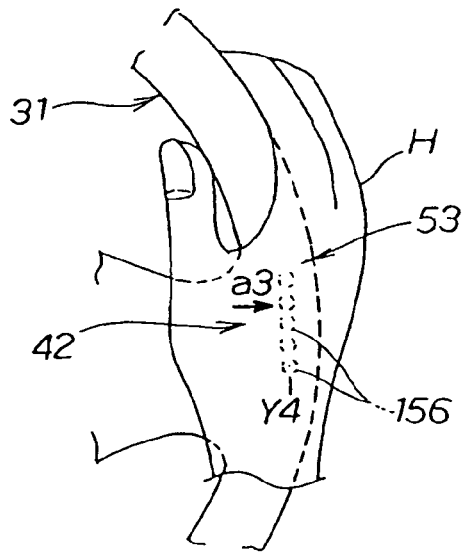
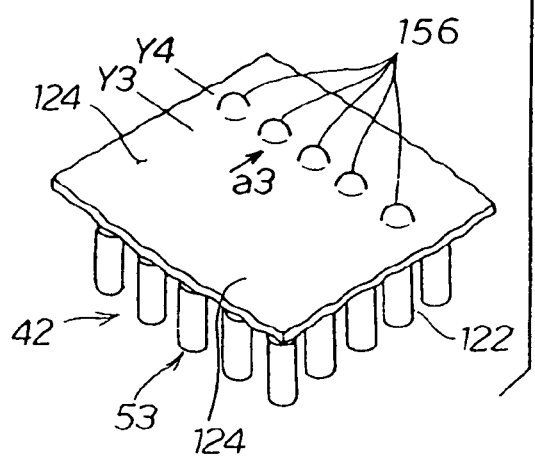

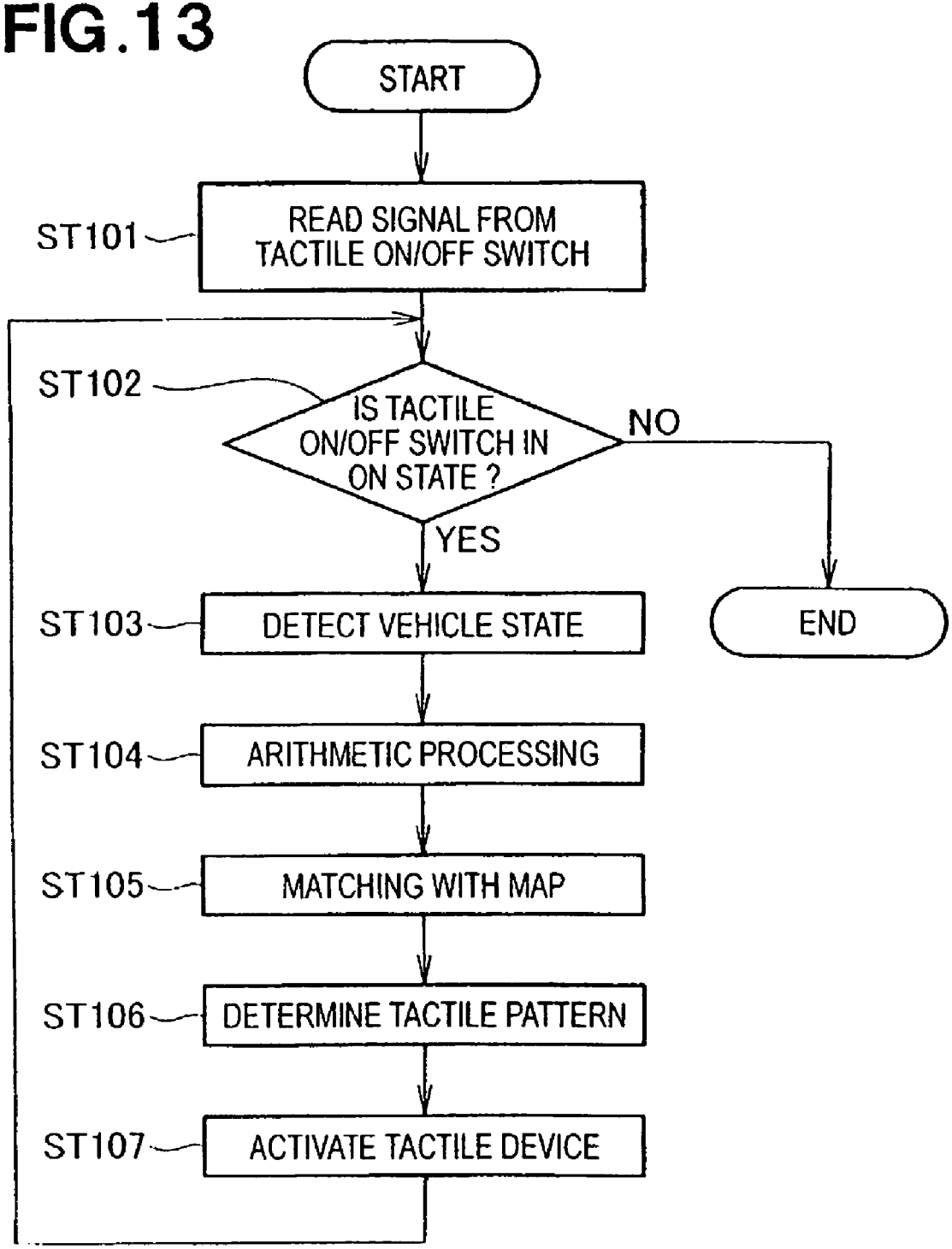

FIG.16D
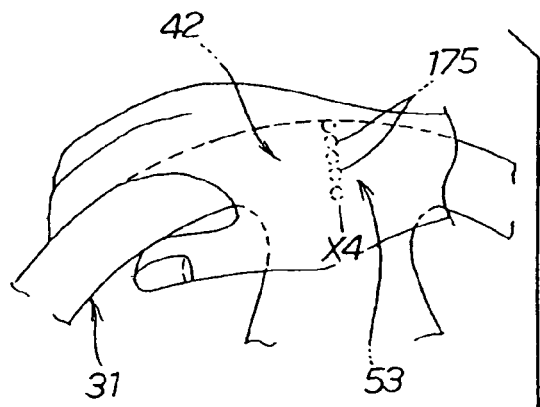
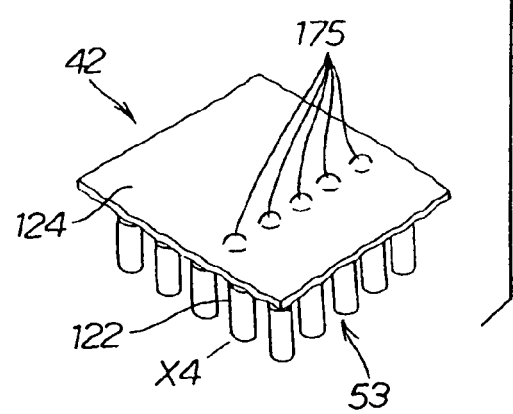
FIG.16E
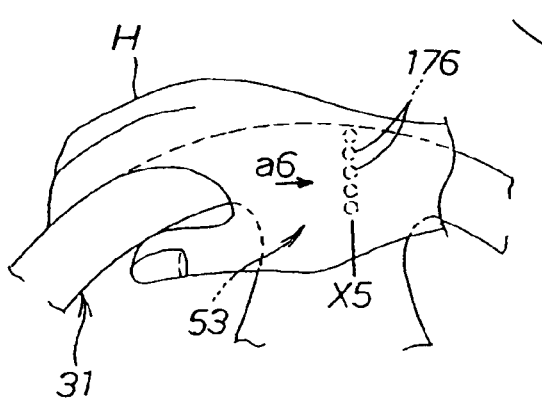
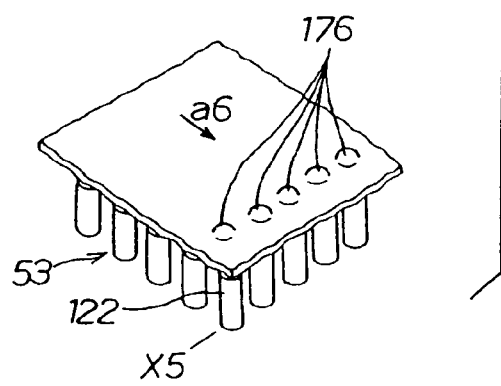

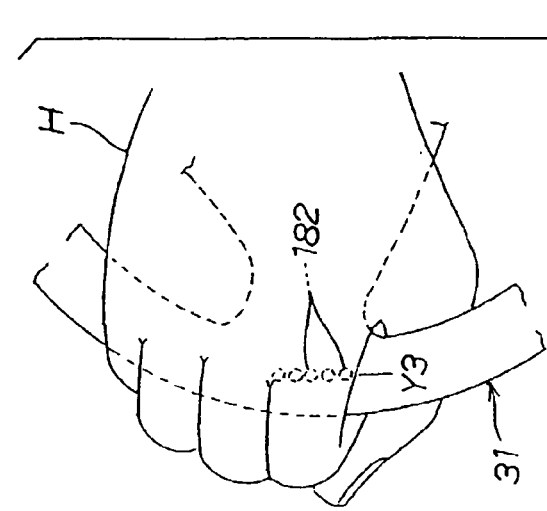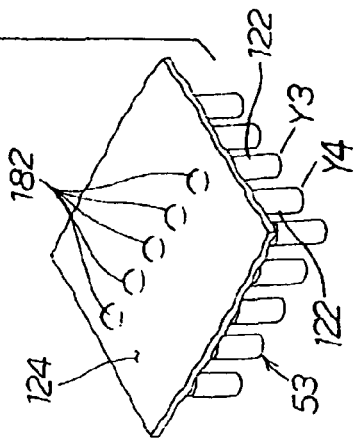
FIG. 17A
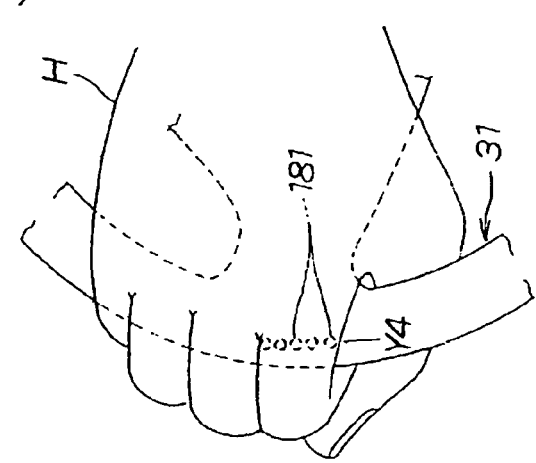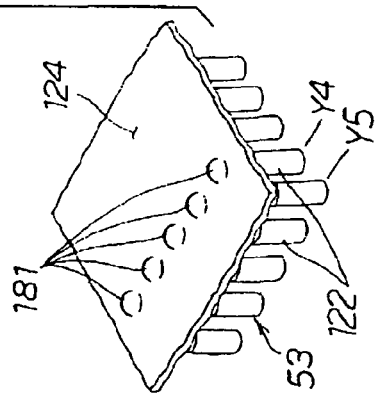
FIG. 17B
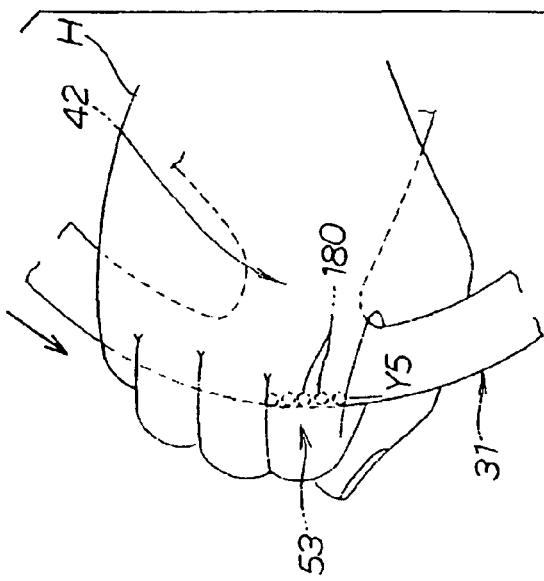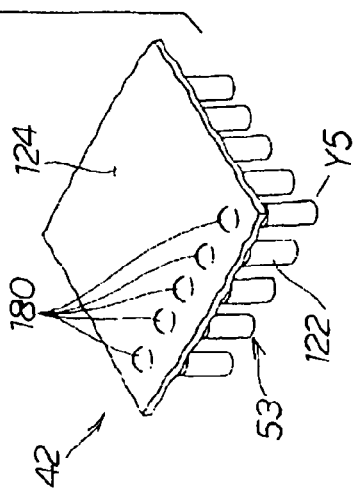
FIG. 17C

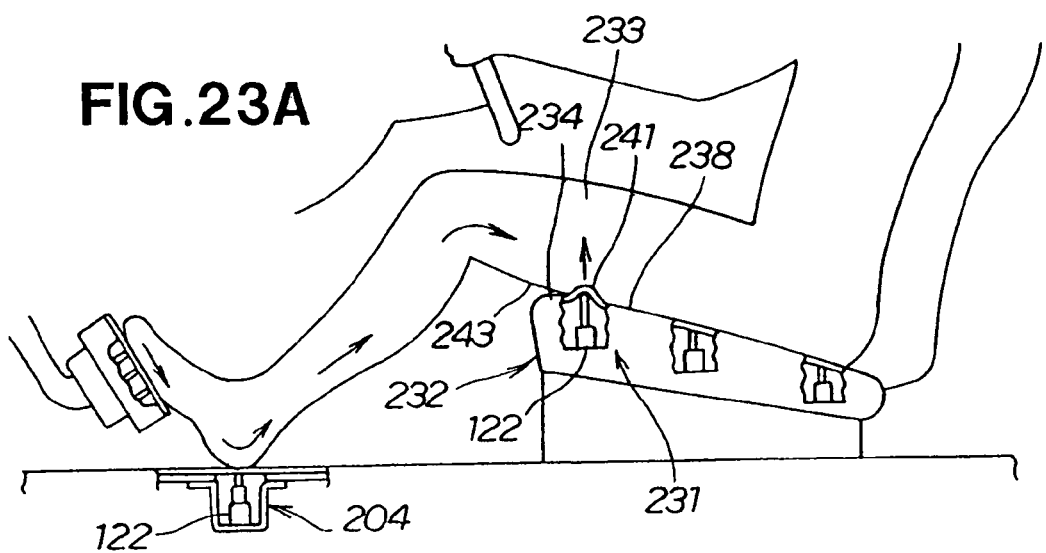
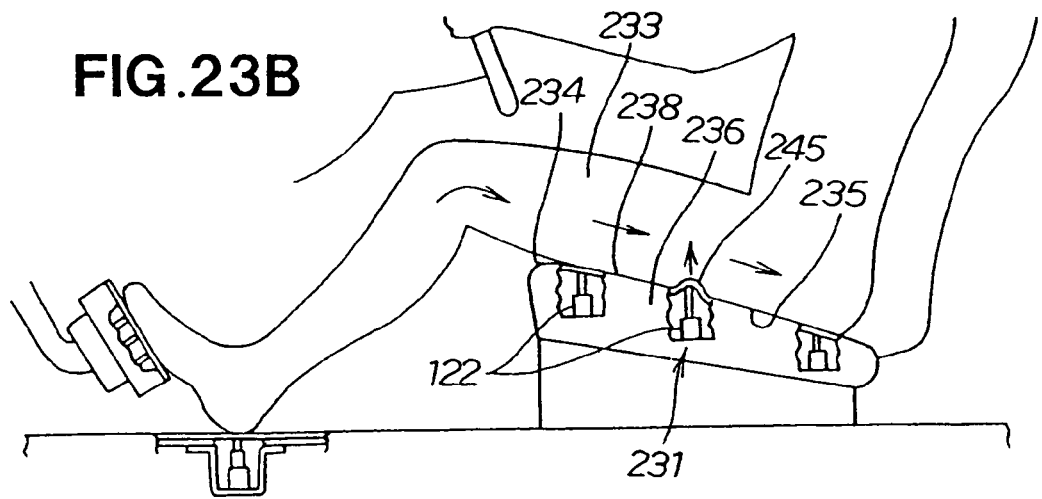
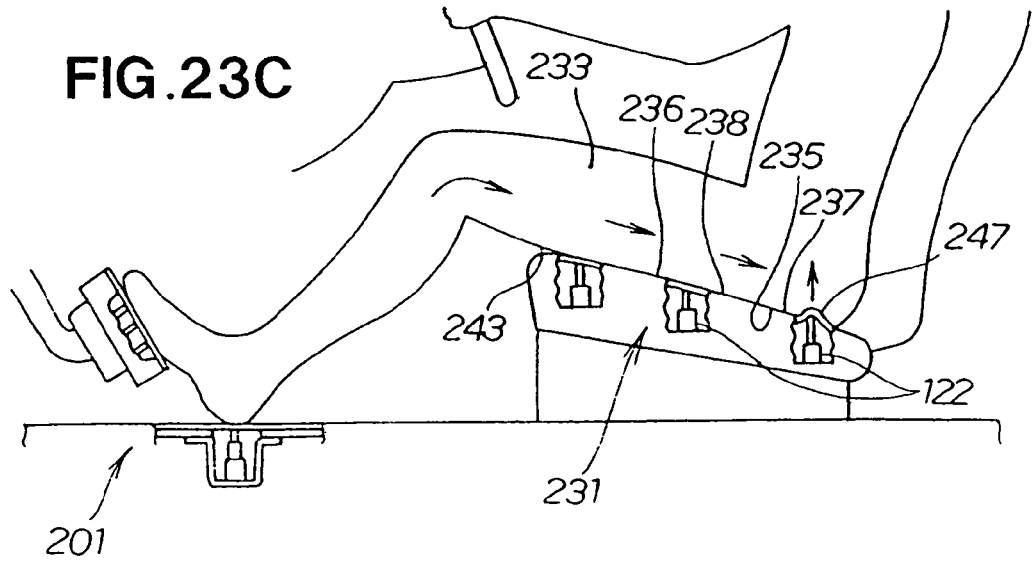

(COMPARATIVE EXAMPLE)

(EMBODIMENT)

VEHICLE STATE INFORMATION TRANSMISSION APPARATUS USING TACTILE DEVICE

FIELD OF THE INVENTION

The present invention relates to an apparatus for transmitting vehicle state information to a driver by way of tactile information produced by a tactile device.

BACKGROUND OF THE INVENTION

Various vehicle state information transmission apparatus or systems for transmitting vehicle state information to a driver as tactile information are known as disclosed in Japanese Patent Laid-open Publications (JP-A) Nos. 2005-182406, 2001-080436, 2005-041471, 2001-010518, and 2006-298166.

The vehicle state information transmission apparatus disclosed in JP-2005-182406A, as shown in FIG. 30 hereof, takes the form of a lane departure prevention apparatus 501 comprised of a visual external sensor (CCD camera) 502, a camera (sensor) controller 503, an electronic control unit ECU including a departure determining section, a warning device 504, and a brake hydraulic pressure control circuit operatively connected to the ECU and brake units associated with vehicle wheels. When the departure determining section of the ECU, on the basis of information received from the CCD camera 502, determines that the vehicle tends to cause a lane departure, the ECU controls operations of the brake hydraulic pressure control circuit and the individual brake units to perform a variable brake force control operation in which the brake force acting on each individual vehicle wheel is frequently varied to provide the driver with a departure warning in the form of vibration of a steering wheel shaft 505 of the vehicle and, at the same time, to correct the traveling course in a direction to avoid lane departure. In synchronism with the braking cycle, the warning device 504 (formed by a speaker or a buzzer) provides an audible warning sound to the driver.

However, the foregoing lane departure prevention apparatus (vehicle state information transmission apparatus) 501 is not fully satisfactory in that when the vehicle is traveling along a road with irregular road surface while passing in loud environments or playing an audio device at top volume, both the vibratory motion of the steering wheel shaft 505 and the audio warning from the warning device 504 cannot be clearly perceived by the driver.

FIG. 31 hereof shows the vehicle state information transmission apparatus disclosed in JP 2001-080436A. The disclosed apparatus takes the form of a vehicle warning apparatus 551, which comprises a doughnut-shaped rubber tube 553 arranged around a recessed peripheral portion of a steering wheel 552, and a variable pressure control device 554 connected to the rubber tube 553 for variably controlling the internal pressure of the rubber tube 553 in accordance with a command signal from an ECU so that when lowering of the tire pressure is detected, the variable pressure control device 554 operates to repeatedly increase and decrease the internal pressure of the rubber tube 553 to thereby generate minute vibration. The thus generated minute vibration is directly transmitted to the driver's hand as tactile low-tire-pressure warning information.

The vehicle warning apparatus (vehicle state information transmitting apparatus) 551 of the foregoing construction, however, necessarily involves a response time lag problem due to the use of a working fluid.

The vehicle state information transmission apparatus disclosed in JP 2005-041471A takes the form of a vehicular travel safety device configured such that the likelihood of a rear-end collision is determined by calculation based on an inter-vehicle distance determined by using a radar, and when the likelihood of a rear-end collision is determined to be critically high, a seatbelt device is automatically operated to repeatedly tighten a seatbelt and release the tightening of the seatbelt. With this arrangement, however, since a rear-end collision warning is provided to the driver by way of vibrations produced by repeated tightening of the seatbelt, a reliable perception of such vibratory warning cannot be expected for a pregnant woman driver who has no obligation to fasten a seatbelt, or a driver thickly dressed with a winder sweater and a down-jacket.

The vehicle state information transmission apparatus disclosed in JP 2001-010518A takes the form of a vehicle steering control device serving as a lane keep assistance device. The steering control device is arranged such that when the vehicle is traveling at the center of a drive lane, a small steering reaction force is provided to the driver via a steering wheel, and when the vehicle deviates or offsets leftward or rightward from the drive lane center, the steering reaction force transmitted via the steering wheel to the driver is increased to thereby providing the driver with a sensation as if the vehicle drifts across the drive lane in a direction to take up the lane deviation. However, the thus arranged vehicle state information transmission apparatus (lane keep assistance device) is disadvantageous in that increasing the steering reaction force to take up a lane departure of the vehicle will require a measurable amount of electric power if the steering reaction force is electrically produced, or involve high fuel consumption if the steering reaction force is hydraulically produced. Furthermore, due to the presence of surface irregularities, undulations, or ruts on the road surface, it is difficult for the driver to perceive whether the steering reaction force is produced by either the lane keep assistance device or the road surface profile.

FIGS. 32A to 32D hereof diagrammatically illustrate operation of the vehicle state information transmission apparatus disclosed in JP 2006-298166A. The disclosed apparatus 501 includes a tactile device 504 assembled in a vehicle steering wheel (only a flexible skin layer 503 being shown) at around the 3-o'clock position for being gripped with the right hand H of the driver. Though not shown, a similar tactile device is incorporated in the steering wheel at around the 9-o'clock position for being gripped with the driver's left hand. The tactile device 504 includes a rectangular array of actuator pins (not shown) arranged in rows X1-X4 and columns Y1-Y4 and individually drivable to undergo axial reciprocation to form a series of projections 505-508 on a front surface of the flexible skin layer 503 of the steering wheel. When the driver turns the steering wheel counterclockwise (leftward in FIG. 32A) to steer the vehicle 502 leftward, the actuator pins of the tactile device 504 operate such that a series of projections formed on the front surface of the flexible skin layer 503 of the steering wheel in parallel with the circumferential direction of the steering wheel shifts stepwise (or column by column) in a radial outward direction of the steering wheel as at 505-508 shown in FIG. 32A-32D. The thus shifting projections 505-508 produce a wavy motion advancing in the radial outward direction of the steering wheel (from left to right in FIG. 32A-32D), which is transmitted via the steering wheel to the driver as tactile vehicle steering information.

With this arrangement, however, since the wavy motion produced by the projections 505-508 using the tactile device 504 always travels in the same direction (radially outward direction of the steering wheel) regardless of the angular position (steering angle) of the steering wheel, a problem will occur in that when the steering wheel has been turned more than 90 degrees ahead of the neutral position, the traveling direction of the wavy motion relative to the turning direction of the vehicle 502 is reversed and this reversed condition will continue until the steering angle exceeds 270 degrees. Reversal of the relation-ship between the two movement directions would confuse the driver and hinders reliable perception of the tactile information by the driver.

SUMMARY OF THE INVENTION

It is accordingly a principal object of the present invention to provide a vehicle state information transmission apparatus, which is capable of transmitting vehicle state information including a warning to the driver in the form of tactile information well perceivable by the driver.

With the foregoing object in view, in one aspect the present invention provides a vehicle state information transmitting apparatus comprising: operation means actuatable by a driver of a vehicle for operating the vehicle; a vehicle state detecting device for detecting a state of the vehicle; warning means for issuing a warning to the driver based on information pertaining to the vehicle state detected by the vehicle state detecting device; and vehicle state information transmitting means for transmitting the information pertaining to the vehicle state detected by the vehicle state detecting device to the driver. The vehicle state information transmitting means comprises a tactile device, which transmits a change in the vehicle state via the operating means to the driver as tactile information, and the tactile device is operable in conjunction with the warning means.

With this arrangement, since the tactile device is operable in conjunction with the warning means, the vehicle state information representing a warning state of the vehicle is transmitted from the tactile device via the vehicle operating means to the driver as tactile information. With this tactile information transmission, the warning vehicle state information can be well perceived by driver with extremely high reliability even when the vehicle is traveling in loud environments with an audio device operating with full volume and/or the driver is a pregnant female which is freed from the obligation to drive with a seat belt securely fastened.

Preferably, the tactile device is capable of producing a movement of the tactility in different patterns that can be varied based on the information pertaining to the vehicle state detected by the vehicle state detecting device. By thus providing different tactile patterns, the vehicle state information can be transmitted to the driver with improved certainty.

The vehicle state detecting device preferably comprises a lane departure sensor for detecting a lane departure of the vehicle, and when the lane departure of the vehicle is detected by the lane departure sensor, the tactile device operates to issue a lane departure warning to the driver by way of the tactile information transmitted via the operation means to the driver. With this arrangement, information indicative of the vehicle traveling with a lane departure can be clearly perceived by the driver as tactile warning information provided in combination with a warning from the warning means.

In another aspect the invention provides a vehicle state information transmission apparatus comprising: operation means actuatable by a driver of a vehicle for operating the vehicle; a vehicle state detecting device for detecting a state of the vehicle; and vehicle state information transmitting means for transmitting the information pertaining to the vehicle state detected by the vehicle state detecting device to the driver. The vehicle state detecting device comprises a steering angle sensor for detecting a steering angle of a steering wheel of the vehicle, and the vehicle state information transmitting means comprises a tactile device which transmits a change in the vehicle state via the operating means to the driver as tactile information. The tactile device has a variable action pattern, which is variable with the progress of turning movement of the vehicle on the basis of information pertaining to the steering angle detected by the steering sensor.

With this arrangement, because the tactile device has a variable action pattern, which is variable with the progress of turning movement of the vehicle on the basis of information pertaining to the steering angle detected by the steering sensor, the information pertaining to the steering angle of the steering wheel can be clearly and reliably perceived at all times by the driver through the tactile information transmitted by the tactile device regardless of the steering angle, and more particularly even when the steering wheel is turned through an angle more than 90 degrees.

In still another aspect invention provides a vehicle state information transmission apparatus comprising: operation means actuatable by a driver of a vehicle for operating the vehicle; a vehicle state detecting device for detecting a state of a vehicle; and vehicle state information transmitting means for transmitting the information pertaining to the vehicle state detected by the vehicle state detecting device to the driver. The vehicle state detecting device comprises a travel direction sensor for detecting a travel direction of the vehicle, and the vehicle state information transmitting means comprises a tactile device which transmits a change in the vehicle state via the operating means to the driver as tactile information. The tactile device has a variable action pattern, which is variable in accordance with the travel direction of the vehicle on the basis of information pertaining to the travel direction detected by the travel direction sensor.

With this arrangement, since tactile device has a variable action pattern, which is variable in accordance with the travel direction of the vehicle on the basis of information pertaining to the travel direction detected by the travel direction sensor, the drive is allowed to perceive the tactile information indicative of the vehicle state even when the vehicle is traveling reverse. This will significantly improve the driving safety.

In yet another aspect the invention provides a vehicle state information transmission apparatus comprising: operation means actuatable by a driver of a vehicle for operating the vehicle; a vehicle state detecting device for detecting a state of the vehicle, the vehicle state detecting device comprising a parked vehicle sensor for detecting the vehicle while being in a parked state; and vehicle state information transmitting means for transmitting the information pertaining to the vehicle state detected by the vehicle state detecting device to the driver, wherein the vehicle state information transmitting means comprises a tactile device which transmits a change in the vehicle state via the operating means to the driver as tactile information; adjustment permission means for permitting an operation amount adjustment of the tactile device to start; adjustment amount input means for inputting an adjustment amount to thereby increase or decrease the operation amount of the tactile device; and simulation means for, on the basis of information pertaining to the parked vehicle detected by the parked vehicle sensor, information pertaining to the permission provided by the adjustment permission means, and information pertaining to the increase/decrease achieved by the adjustment amount input means, outputting information to activate the tactile device in the same manner as it does during traveling of the vehicle, while the vehicle is in a parked state.

With this arrangement, even when the vehicle is parked, the driver is allowed to confirm and adjust various conditions, such as amplitude and frequency, of the tactile pattern of the tactile device in the same manner as it achieves during traveling.

Preferably, the operation means comprises a steering wheel of the vehicle, which has a grip portion for being gripped by the driver. The tactile device is assembled in the grip portion of the steering wheel. The steering wheel further has a guard protrusion disposed in the grip portion and engageable with a hand of the driver to prevent the tactile device from being subjected to undue stress during steering operation.

The guard protrusion thus provided limits a tendency of the driver's hand to displace in a radial outward direction during steering, which will apply more force to the tactile device assembled in the grip portion. The tactile device is therefore durable and has a long service life.

Preferably, the operation means comprises an accelerator pedal of the vehicle, and the tactile device comprises a vibration generating mechanism assembled with the accelerator pedal. The vibration generating mechanism directly vibrates the accelerate pedal and is able to transmit vibration of the accelerate pedal directly to the driver's foot. This arrangement allows for the use of the existing accelerating pedal without reconstruction, which will lead to a reduction of the vehicle weight and cost cutting.

BRIEF DESCRIPTION OF THE DRAWINGS

Certain preferred structural embodiments of the present invention will be described in detail herein below, by way of example only, with the reference to the accompanying drawings, in which:

FIG. 5 is a cross-sectional view taken along line 5-5 of FIG. 4A;

FIG. 6 is a plan view with parts cut away for clarity of the steering wheel portion in which the tactile device comprised of a rectangular array of linear reciprocation actuators is incorporated.

FIG. 7 is a cross-sectional view illustrative of the operation of the tactile device;

FIG. 8 is a flowchart showing a series of operations to be achieved by an electronic control device (ECU) of the vehicle warning apparatus to operate the tactile device in conjunction with the warning means;

FIGS. 9A and 8B are diagrammatical views illustrative of the operation of a parking brake reminder light (warning indicator) which is performed in conjunction with the operation of the tactile device;

FIGS. 11A to 11G are diagrammatical views illustrative of the operation of the tactile device when used for transmitting information about incoming message to the driver;

FIGS. 12A to 12D are diagrammatical views illustrative of the operation of the tactile device when used for transmitting information about a lane departure warning;

FIG. 13 is a flowchart showing a series of operations to be achieved by the ECU to as to perform a tactile vehicle state information transmission operation using the tactile device;

FIGS. 16A to 16E are diagrammatical views showing the operation performed by the tactile device to transmit tactile information via the steering wheel to the driver when the driver further turns the steering wheel counterclockwise to a position approximately 90-degrees ahead of the neutral position;

FIGS. 17A to 17E are diagrammatical views showing the operation performed by the tactile device to transmit tactile information via the steering wheel to the driver when the driver further turns the steering wheel counter-clockwise to a position approximately 180-degrees ahead of the neutral position;

FIGS. 23A to 23C are diagrammatical views illustrative of the operation of the in-seat tactile device performed when the accelerator pedal is depressed;

FIG. 30 is a block diagram showing a conventional vehicle state information transmission apparatus according to;

DETAILED DESCRIPTION OF THE PREFERRED EMBODIMENTS

Figure 1:
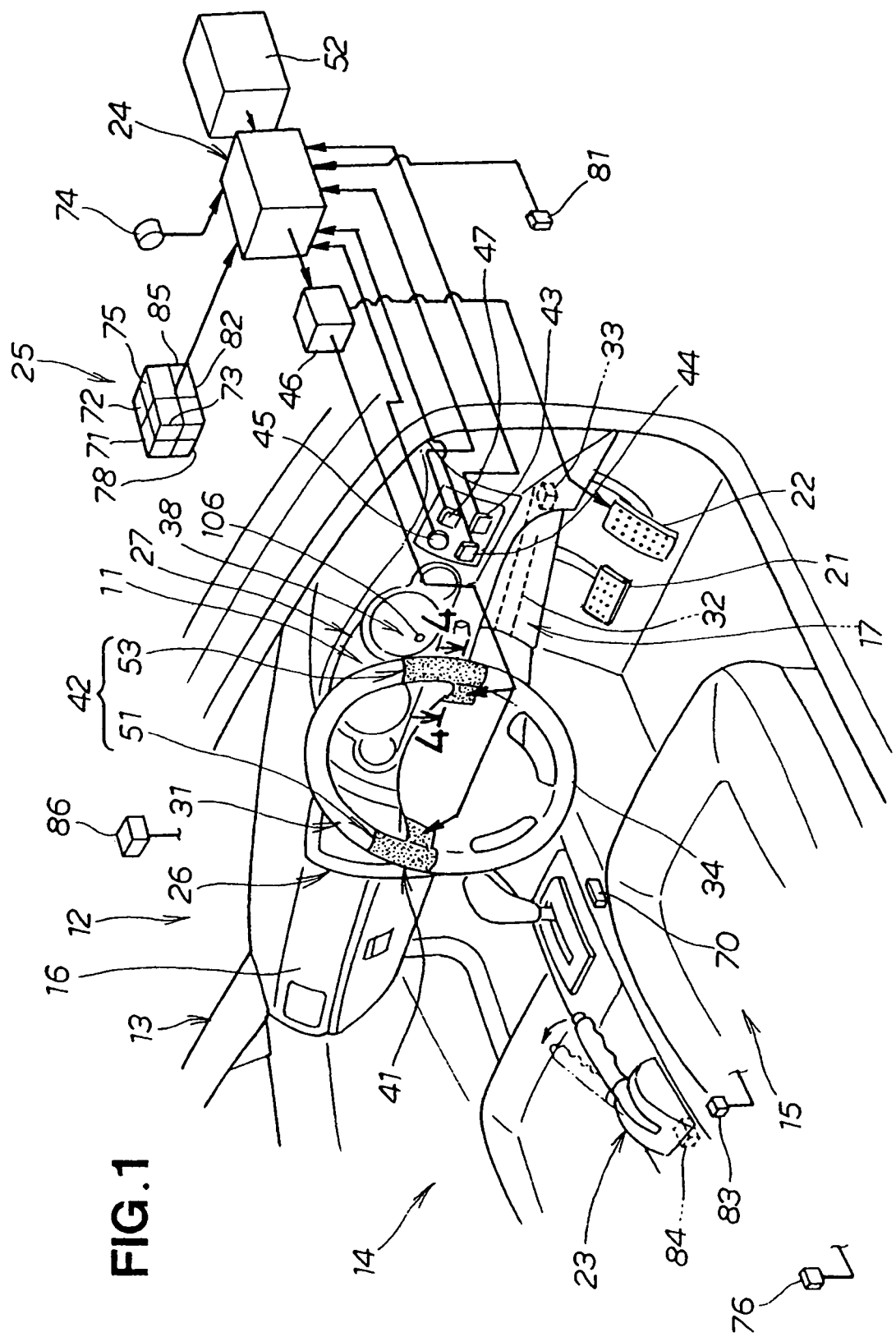
FIG. 1 is a perspective view showing the general configuration of a vehicle state information transmission apparatus according to one preferred embodiment of the present invention.

Referring now to the drawings and FIG. 1 is particular, there is shown a vehicle state information transmission apparatus 11 installed in a vehicle 12 for transmitting vehicle state information to a human driver. The term "vehicle state" is used herein to generally refer to traveling states or behaviors of the vehicle and conditions of various parts of the vehicle as on-vehicle devices.

As shown in FIG. 1, the vehicle 12 includes a body 13, a passenger compartment 14 defined in the body 13, a driver's seat 15 disposed inside the passenger compartment 14, a dashboard 16 disposed in front of the driver's seat 15, a power steering apparatus 17, a brake pedal 21, an accelerator pedal 2 serving as an operating means actuatable by the driver for operating the vehicle 12, a parking brake lever 23 provided on a left side of the driver's seat 15, an electronic control unit (ECU) 24 for controlling the vehicle 12, a vehicle state detection device 25 for detecting various states or conditions of the vehicle 12, a driver identification device 52, a navigation device 26 mounted in the dashboard 16, an instrument panel 27, a travel direction detection device or sensor 70 associated with a shift lever (not designated) for detecting a travel direction of the vehicle 12, and the aforesaid vehicle state information transmitting apparatus 11. The travel direction sensor 70 also forms part of the vehicle state detection device 25.

The power steering apparatus 17 includes a steering wheel 31 serving as an operation means actuatable by the driver for operating the vehicle 12, a steering shaft 32 connected at one end to a central hub of the steering wheel 31, a steering angle sensor 33 disposed adjacent to the steering shaft 32 for detecting a steering angle of the steering wheel 32. The steering wheel 31 has a body 34. The steering angle sensor 33 also forms part of the vehicle state detection device 25.

More specifically, the vehicle state information transmission apparatus 11 generally comprises the vehicle state detection device 25, a warning indicator (warning means) 38 operable based on information pertaining to the vehicle states detected by the vehicle state detection device 25, a mobile phone connector (not shown) for connection with a mobile phone, and a vehicle state information transmitting means or device 41.

The vehicle state information transmitting device 41 includes a tactile means or device 42 assembled in the steering wheel 31 and operable based on information pertained to the vehicle state detected by the vehicle state information detection device 25 to transmit the vehicle state information via the steering wheel 31 to the driver as tactile information, a tactile ON/OFF switch 43 for selectively enabling and disabling the tactile device 42, a warning selector switch 44 for selecting various warnings to be transmitted via the tactile device 42, a tactile pattern input section 45 for selecting tactile patterns for the tactile device 42, an amplitude selection switch 47 for selecting the amplitude of the tactile pattern (operation pattern) of the tactile device 42, and a driver circuit 46 for driving the tactile device 42 based on information received from the ECU 24.

In the illustrated embodiment, the tactile device 42 consists of a left tactile device 51 and a right tactile device 53. The left tactile device 51 is incorporated in a left grip portion of the steering wheel 31 for being gripped by the left hand of the driver, and the right tactile device 53 is incorporated in a right grip portion of the steering wheel 31 for being gripped by the right hand of the driver. The left grip portion (indicated as a satin finished surface for clarity) of the steering wheel 31 is located at the 9 to 10 o'clock position on the steering wheel 31, while the right grip portion (also indicated as a satin finished surface for clarity) of the steering wheel 31 is located at the 2 to 3 o'clock position on the steering wheel 31.

The warning selector switch 44 is disposed on the dashboard 16, however, it may be incorporated in either an operation part or a display panel of the navigation device 26. In the latter case, the switch 44 operates as a touch panel switch. In any case, the warning selector switch 44 is electrically connected to the navigation device 26 so that various warnings to be selected by the selector switch 44 are displaced on the display panel of the navigation device 26.

Figure 2:
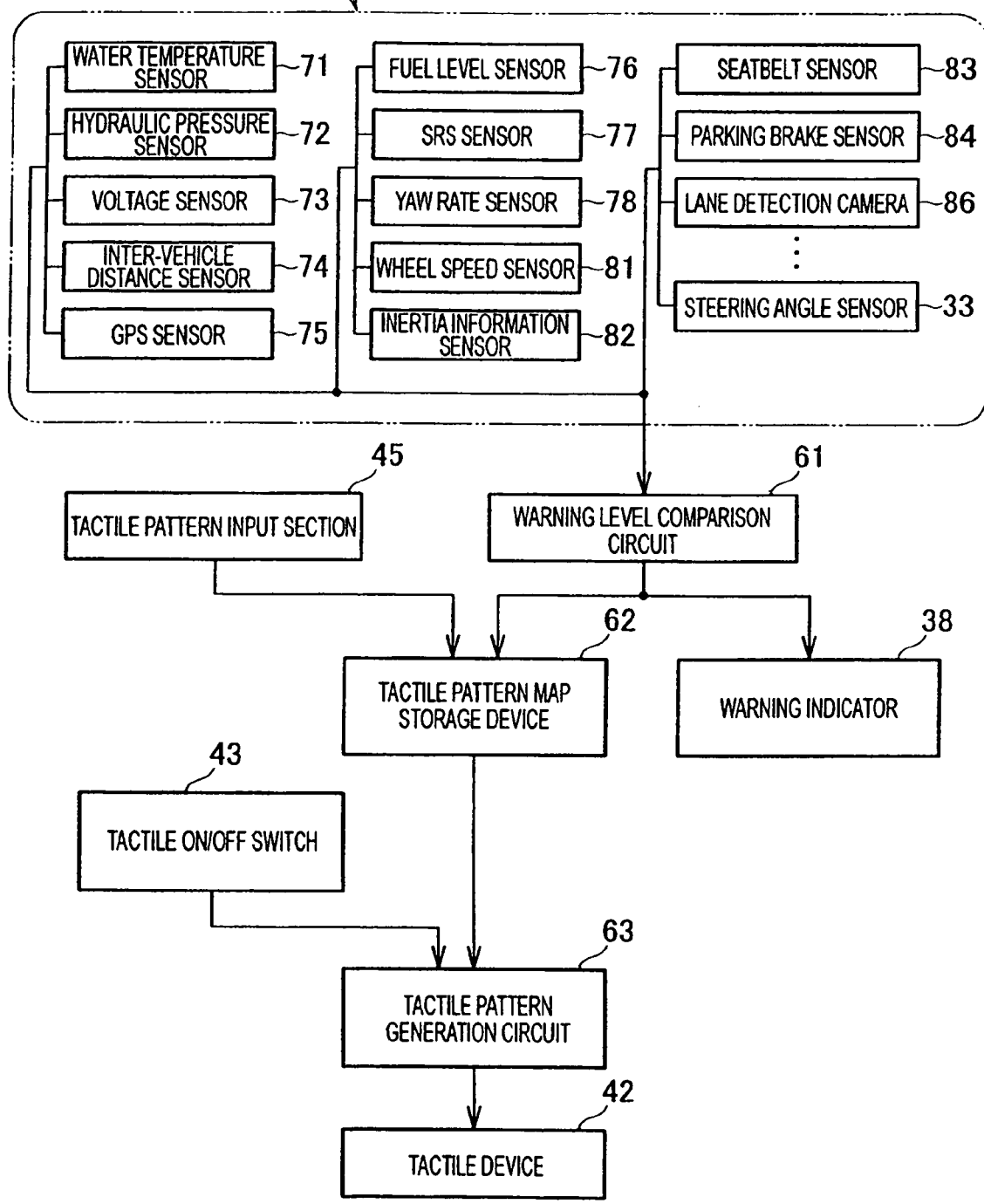
FIG. 2 is a block diagram showing the general configuration of the vehicle state information transmission apparatus used as a vehicle warning apparatus.

FIG. 2 shows in block diagram the general configuration of the vehicle state information transmission apparatus 11. As will be understood from the description given below, the vehicle state information transmission apparatus 11 takes the form a warning apparatus. The warning apparatus (vehicle state information transmission apparatus) 11 comprises a warning level comparison circuit 61 which determines whether or not vehicle state information detected by the vehicle state detecting device 25 falls in a warning range, the tactile pattern input section 45 which inputs a tactile pattern (operation pattern) of the tactile device 42, the warning indicator (warning means) which displays a warning based on information pertaining to the result of determination performed by the warning level comparison circuit 61, a tactile pattern map storage device 62 which determines a tactile pattern based on information inputted from the tactile pattern input section 45 and the information received from the warning level comparison circuit 61, the tactile ON/OFF switch 43 which selectively enables and disables the tactile device 42, a tactile pattern generation circuit 63 which determines details of the tactile pattern based on information stored in the tactile pattern map storage device 62 when information from the tactile ON/OFF switch 43 indicates an ON state of the switch 43, and the tactile device 42 which operates based on information received from the tactile pattern generation circuit 63.

The tactile pattern input section 45 is formed by a switch disposed on the dashboard 16. This switch 45 may be incorporated in either an operation part or a display panel of the navigation device 26. In the latter case, the switch 45 operates as a touch panel switch. In any case, the warning selector switch 44 is electrically connected to the navigation device 26 so that various tactile patterns (operation patterns) to be selected by the switch 45 are displaced on the display panel of the navigation device 26.

Figure 10A:
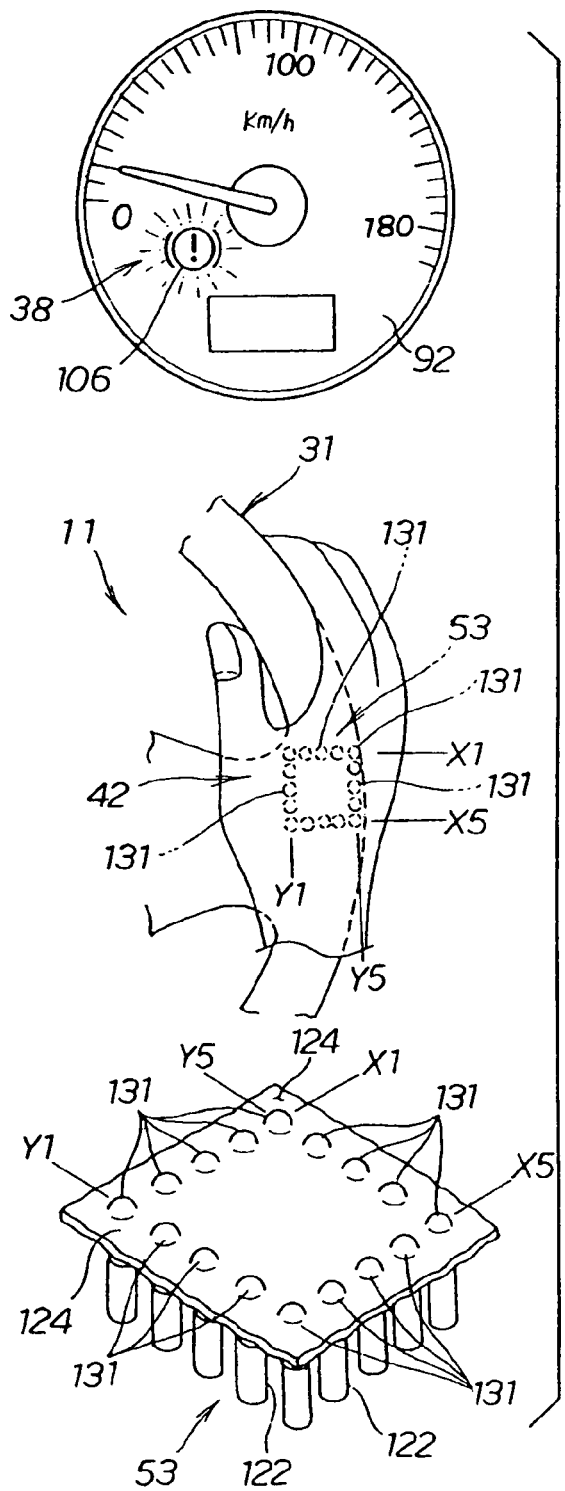
FIGS. 10A to 10C are diagrammatical views illustrative of the operation of the tactile device when used in combination with the warning indicators for transmitting information about parking brake reminder or warning to the driver.

The tactile pattern (operation patterns) may include any sort of pattern that can be formed by a plurality of projections to assume a given geometric shape or configuration and that is able to produce a tactile movement which can be well perceived by the driver as, for example, a sensation of something running across the palm of the driver or being tapped by something. Typical three examples of such tactile pattern are shown in FIGS. 10A to 10C, FIGS. 11A to 11G and FIGS. 12A to 12D, respectively. The tactile pattern shown in FIGS. 10A to 10C produces a tactile movement giving a sensation of square-shaped something contracting repeatedly. The tactile pattern shown in FIGS. 11A to 11G produces a tactile movement giving a sensation of something running diagonally across the driver's palm. The tactile pattern shown in FIGS. 12A to 12D produces a tactile movement, which can be perceived by the driver as being tapped at odd intervals by linear-shaped something at opposite sides of the driver's palm. The tactile pattern available according to the invention is not limited to the three examples explained above but may be selected at the user's option.

The tactile pattern input section 45 may be arranged to select a target of the warning using the display panel of the navigation device 26.

The tactile ON/OFF switch 43 is a pushbutton switch disposed on the dashboard 16. This switch 43 may be arranged on the operation part of the navigation device 26.

As shown in FIG. 2, the vehicle state detecting device 25 comprises a water temperature sensor 71 for detecting the temperature of cooling water, a hydraulic pressure sensor 72 for detecting the hydraulic pressure, a voltage sensor 73 for detecting a voltage, an inter-vehicle distance sensor 74 for detecting a distance to the leading vehicle, a GPS sensor 75 for measuring an actual location of the vehicle, a fuel level sensor 76 for detecting a level of fuel held in a fuel tank, an SRS sensor 77 for detecting a failure of an airbag device, a yaw rate sensor 78 for detecting a yaw rate of the vehicle, a vehicle wheel speed sensor 81 for detecting a vehicle wheel speed, an inertia information sensor 82 for detecting an inertia of the vehicle, a seatbelt sensor 83 for detecting fastening of a seatbelt device by the driver, a parking brake sensor 84 for detecting application of the parking brake, a vehicle speed calculation device 85 (FIG. 1) for calculating the vehicle speed, and a lane detection camera 86 for detecting a drive lane. Each of the sensors is disposed at an appropriate position. The vehicle state detecting device 25 further includes other conventional sensors required for obtaining information as required by the warning means (warning indicator) 38.

Figure 3:
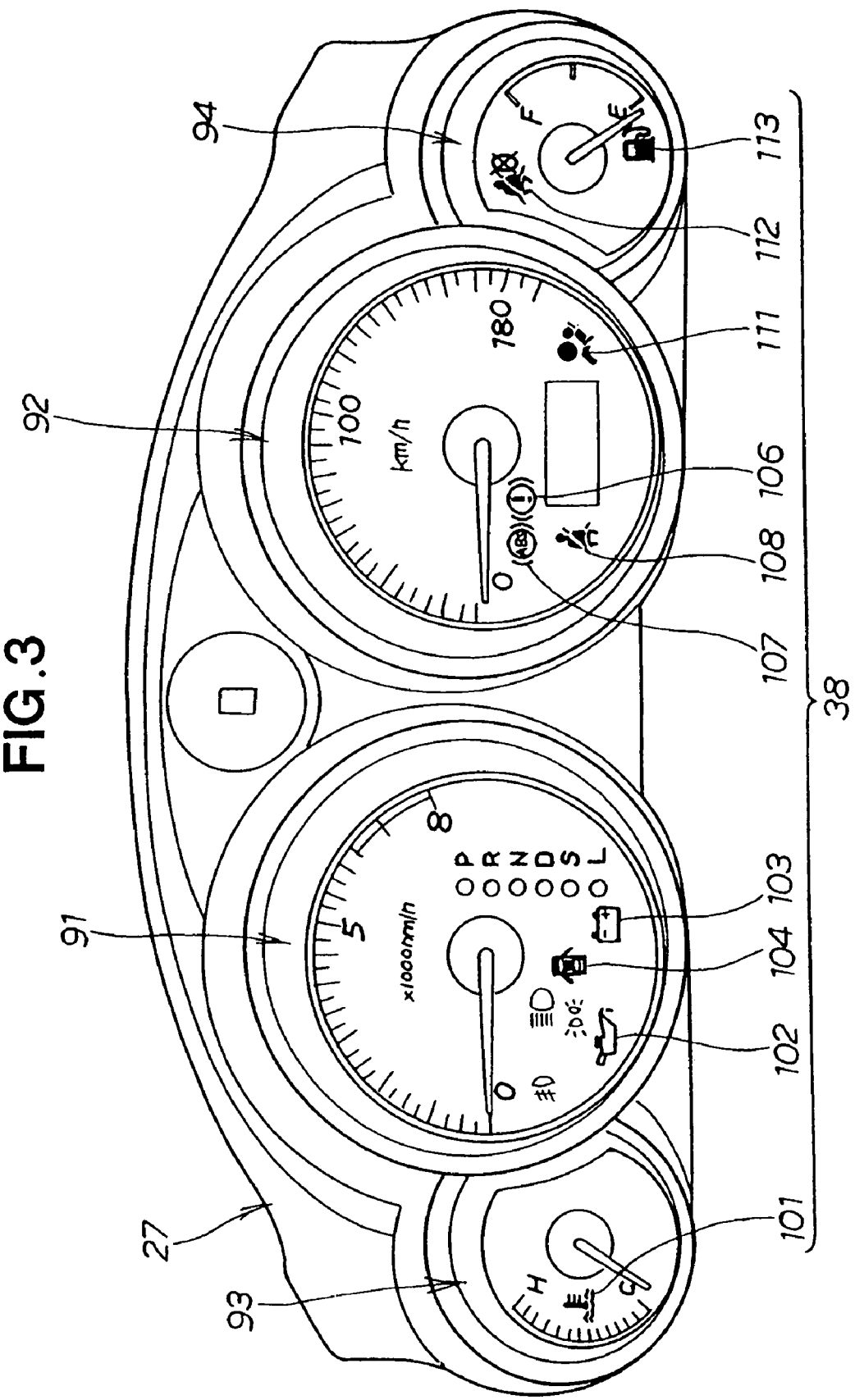
FIG. 3 is a front elevational view of a warning means incorporated in various meter units mounted on an instrument panel of the vehicle.

FIG. 3 shows the warning means 38 and the instrument panel 27 that are included in the vehicle warning apparatus. The instrument panel 27 includes a tachometer 91 on a left side thereof, a speedometer 92 disposed on a left side thereof, a water temperature meter or gauge 93 disposed on a left side of the tachometer 91, a fuel meter or gauge 94 disposed on a right side of the speedometer 92, and the warning means (warning indicator) 38. The warning means (warning indicator) 38 will come on, as shown in FIG. 3, when a warning occasion arises. For purposes of illustration, the warning means (warning indicator) 38 is shown in an ON or light-up state.

The warning means (warning indicator) 38 comprises a water temperature warning light 101 incorporated in the water temperature gauge 93 and indicating undue high water temperature based on information detected by the water temperature sensor 71, an engine oil warning light 102 incorporated in the tachometer 91 and indicating insufficient engine oil based on information detected by an appropriate sensor not shown, a battery warning light 103 indicating a battery failure, and a half-shut warning light 104 indicating half-shut of a door. The warning lights 101-104 are each provided as an icon, which is a symbolic representation of the function of the corresponding warning light.

The warning means (warning indicator) 38 further includes a parking brake warning light 106 incorporated in the speedometer 92 and indicating application of the parking brake based on information received from the parking brake sensor 84, an ABS failure warning light 107 indicating a failure of the ABS system, a seatbelt warning light 108 indicating an unfastened seatbelt based on information received from the seatbelt sensor 83, an airbag warning light 111 indicating an airbag failure based on information received from the SRS sensor 77, a side airbag warning light 112 incorporating in the fuel gauge 94 and indicating a side airbag failure based on information received from the SRS sensor 77, and a fuel warning light 113 indicating a low fuel level based on information received from the fuel level sensor 76. The warning lights 106-113 are each provided as an icon, which is a symbolic representation of the function of the corresponding warning light.

Other icons may be provided where appropriate. The warning means (warning indicator) 38 is substantially the same in construction as the conventional warning indicator and may take any from of construction.

Figure 4A:
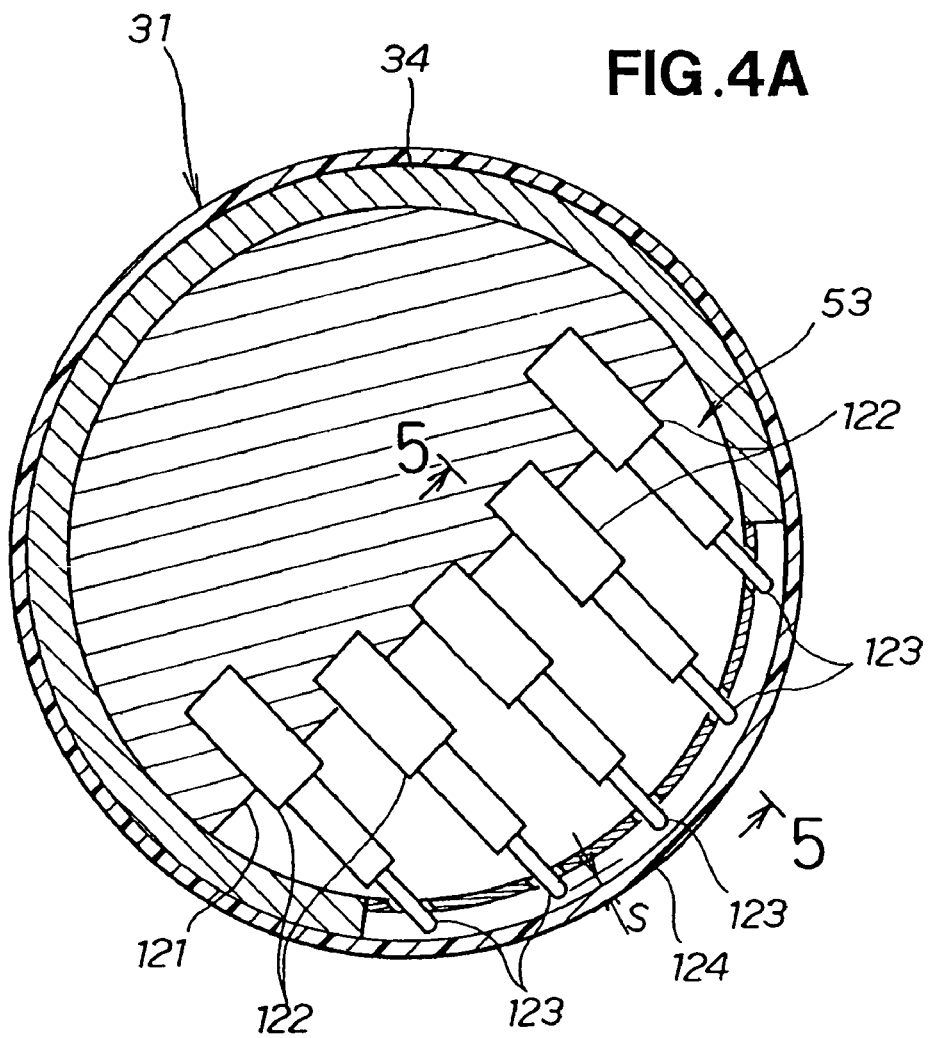
FIG. 4A is a cross-sectional view taken along line 4-4 of FIG. 1, showing a tactile device incorporated in a steering wheel.

FIG. 4A shows in cross section the right tactile device 53. As shown in this figure, the tactile device 53 includes a number of linear reciprocating actuators 122 disposed in a recessed portion 121 formed in the body 34 of the steering wheel. The actuators 122 are motor-driven linear reciprocating actuators each having an electric motor unit 125 fixedly mounted on the bottom of the recessed portion 121, an actuator rod 126 connected in driven relation to the motor unit 125 via a ball screw mechanism (not shown) so as to undergo linear reciprocating movement along the axis thereof when the motor 125 is rotating, and a surface pressure adjustment cap 123 made of elastic material such as rubber and fitted over a tip end portion of the actuator rod 126. The recessed portion 121 of the steering wheel 31 is closed by a tubular skin layer 124 of flexible material fitted over the steering wheel body 34.

As indicated by the arrows a1 and a2 shown in FIG. 5, the actuator rod 126 is reciprocally movable between a fully retracted standby position shown in FIGS. 4A and 5 and a fully extended working position shown in FIG. 7. The actuator rod 126 is normally disposed in the standby position where the cap 123 is separated from the skin layer 124 by a distance S (FIG. 4A). When the actuator rod 126 is disposed in the fully extended working position of FIG. 7, the skin layer 124 is locally displaced by the actuator rod 126 in an upward direction (radial outward direction of the steering wheel 31) by a distance Hm. The cap 123 fitted over the tip end portion of the actuator rod 126 gives an enlarged contact surface area to the actuator rod 126, lowering the surface pressure exerted from the actuator rod 126 to the skin layer 124 of the steering wheel 31. It will be appreciated that characteristics of a sensation transmitted from the tactile device 53 to the driver's hand can be altered by properly adjusting the elasticity and diameter of the cap 123. The type of the actuator 122 should by no means be limited to the motor-driven type but may be replaced by other type of actuator, such as a hydraulic or pneumatic actuator.

Figure 4B:
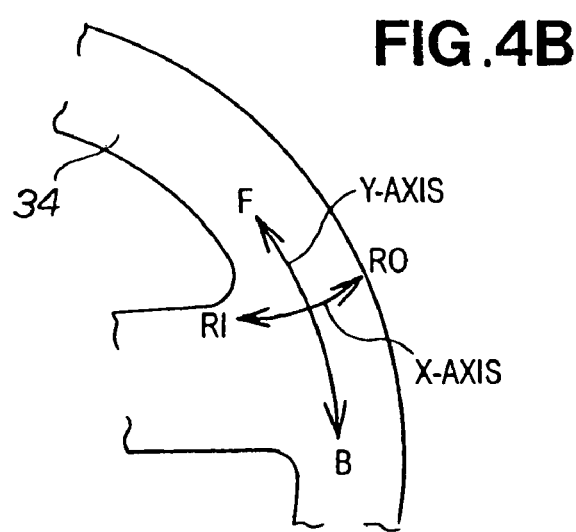
FIG. 4B is a fragmentary plan view showing a portion of the steering wheel in which the tactile device is incorporated.

As shown in FIG. 6, in the illustrated embodiment, a total of 25 linear reciprocating actuators 122 are arranged into a matrix or rectangular array of the actuators 122 having 5 rows (X1 to X5) lying side by side along an X-axis extending in a radial direction of the steering wheel 31 and 5 columns (Y1 to Y5) lying side by side along a Y-axis extending in a circumferential direction of the steering wheel 31 (see FIG. 4B). With this arrayed arrangement, it is readily possible to identify any of the individual actuators 122 by finding a coordinate position with reference to row and column numbers.

As will be understood from FIG. 7, the actuators 122 in the illustrated embodiment are so designed as to perform a linear reciprocating movement of the actuator rods 126 with a maximum stroke SM and at an advancing speed Vf and a retracting speed Vr. Each pair of adjacent actuators 122, 122 is operated at a given time interval "t". By properly setting operating conditions of the individual linear reciprocating actuators 122 to the extent that selected areas of the skin layer 124 are outwardly displaced at a given timing, a tactile pattern of any desired shape formed by projections on a front surface of the skin layer 124 moves in a given direction at a given timing with the result that a tactile motion such as a wave motion (vibration) that can be perceived by the driver is generated on the front surface of the skin layer 124. In case of the wave motion, frequency varies inversely with the time intervals "t", while the amplitude varies directly with the stroke of the actuator rod 126.

The number of the actuators 122 and the number of rows and columns are not limited to those in the illustrated embodiment. A rectangular array of 16 actuators 122 having four rows and four columns may be employed in the present invention. The left tactile device 51 is the same in construction and operation with the right tactile device 53, and further description thereof can be omitted.

FIG. 8 is a flowchart showing a series of operations to be achieved by the ECU 24 (FIG. 1) for operating the tactile device 42 in conjunction with the warning means (warning indicator) 83.

In step ST01, it is determined whether warning apparatus (vehicle state information transmission apparatus) 11 is in an operable state. If the result of determination is affirmative (YES), the control goes on step ST02 where vehicle state is detected by the vehicle state detecting device 25. Alternatively, if the result of determination at step ST02 is negative, the control is terminated.

Then step ST03 reads warning information. In the next step ST04, it is determined whether the warning information has reached a warning level. If the result of determination is affirmative, the control goes on to steps ST05 and ST06. Alternatively, if the determination at step ST04 is negative, the control is terminated.

Step ST05 lights up warning indicators (lights) of the warning means 38. At step ST06, input information about tactile pattern is read in. Then at step ST07, a tactile pattern is selected from a map based on the input information about the tactile pattern. Subsequently, step ST08 determines a command signal based on the map information. Then at step ST09, the tactile device 42 is activated based on an execution signal.

The operations performed at steps ST01 to ST09 will be discussed below in greater detail.

FIGS. 9A and 9B diagrammatically show an operation performed when the warning apparatus issues a parking brake reminder signal. In FIG. 9A the warning means (warning indicator) 38 mounted on the instrument panel 27 and the steering wheel 31 in which the tactile device 53 are incorporated are shown in combination with the steering wheel 31 disposed below the warning means 38. FIG. 9B further shows the tactile device 42 in combination with the warning means 38 and the steering wheel 31 with the tactile device 42 disposed below the steering wheel 31.

At first, the tactile ON/OFF switch 43 shown in FIG. 1 is turned on. Then, the warning selector switch 44 shown in FIG. 44 is operated to select "parking brake warning" from among various warnings displayed on a monitor screen of the navigation device 26, for example. Subsequently, the tactile pattern input section 45 is actuated to select an appropriate operation pattern from among those patterns shown on the display screen of the navigation device 26. In the illustrated embodiment, such an operation pattern, which can be, realized when a hollow square frame contracts toward the center is selected. The order of the foregoing operations may be altered at the driver's option.

As shown in FIG. 9A, when the parking brake is not working, the warning means (warning indicator such as a light) 38 arranged on the instrument panel 27 remains off and no corresponding warning symbol is displayed. In this condition, the vehicle 12 is in a parked state (vehicle speed=0 Km).

When the parking brake lever 23 is pulled up to the position indicated by phantom lines shown in FIG. 1, the warning means (warning indicator or light) 38 lights up, as shown in FIG. 9B. More specifically, when the parking brake lever 23 is actuated to apply the parking brake, the parking brake warning icon or symbol lights up. The right tactile device 53 of the tactile device 42 stays off.

Then the vehicle starts traveling forward, and when the vehicle speed exceeds 1 Km/h, the right tactile device 53 comes into operation. The right tactile device 53 operates to create projections 131 on the front surface of the skin layer 124 of the steering wheel 31 in such a manner as to simulate a wave motion traveling from the outer periphery toward the center. By way of the wave-like movement of the projections 123, the right tactile device 53 gives a warning of unreleased parking brake to the driver's hand. More specifically, while the parking brake warning symbol 106 of the warning means 38 shown in FIG. 10A stays on and when the vehicle starts traveling with the parking brake lever 23 still staying at the working position, the right tactile device 53 operates to activates those actuators 122 located on outermost two rows X1 and X5 and columns Y1 and Y5 whereupon the actuator rods of the activated actuators 122 project upward to thereby form a total of 16 projections 131 on the front surface of the skin layer 124.

Figure 10B:
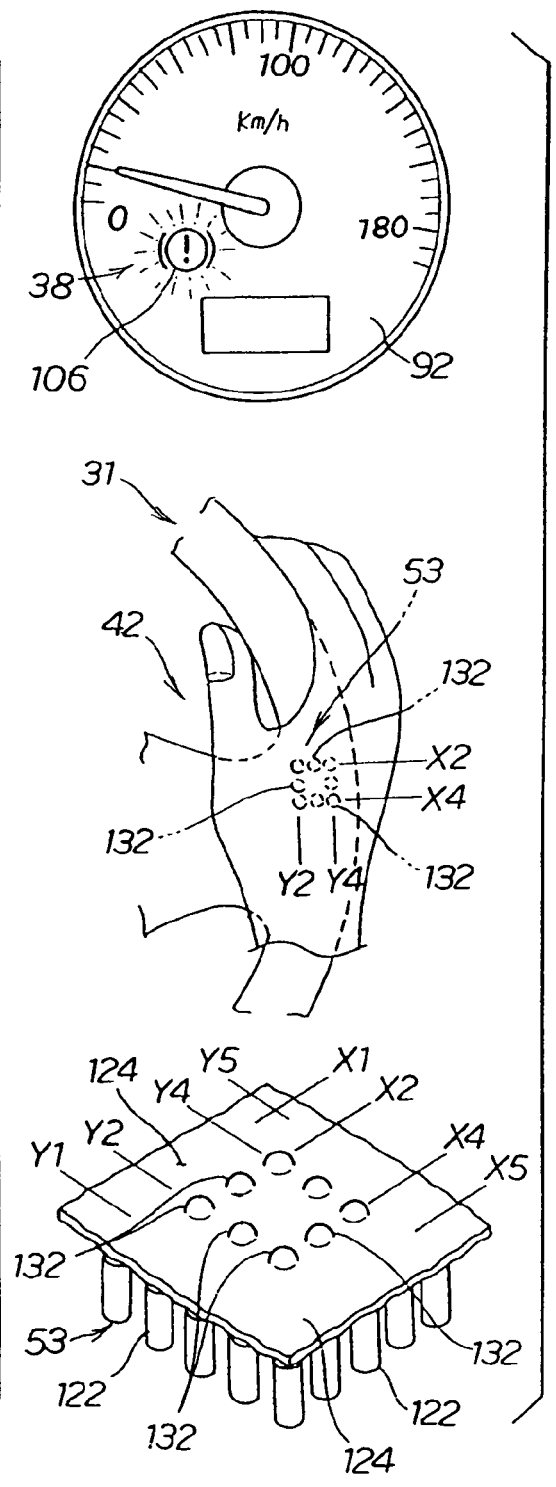

Subsequently, as shown in FIG. 10B, when a "t"-seconds time period has past after activation, the actuators 122 in the rows X1, X5 and columns Y1, Y5 are deactivated (retracted) and, at the same time, the actuators 122 in the rows X2, X4 and columns Y2, Y4 are activated (advanced). This causes the skin layer 122 of the steering wheel 31 to be locally displaced upward by the actuator rods of the activated actuators 122 with the result that a total of 8 projections 132 are produced on the front surface of the skin layer 124.

Figure 10C:
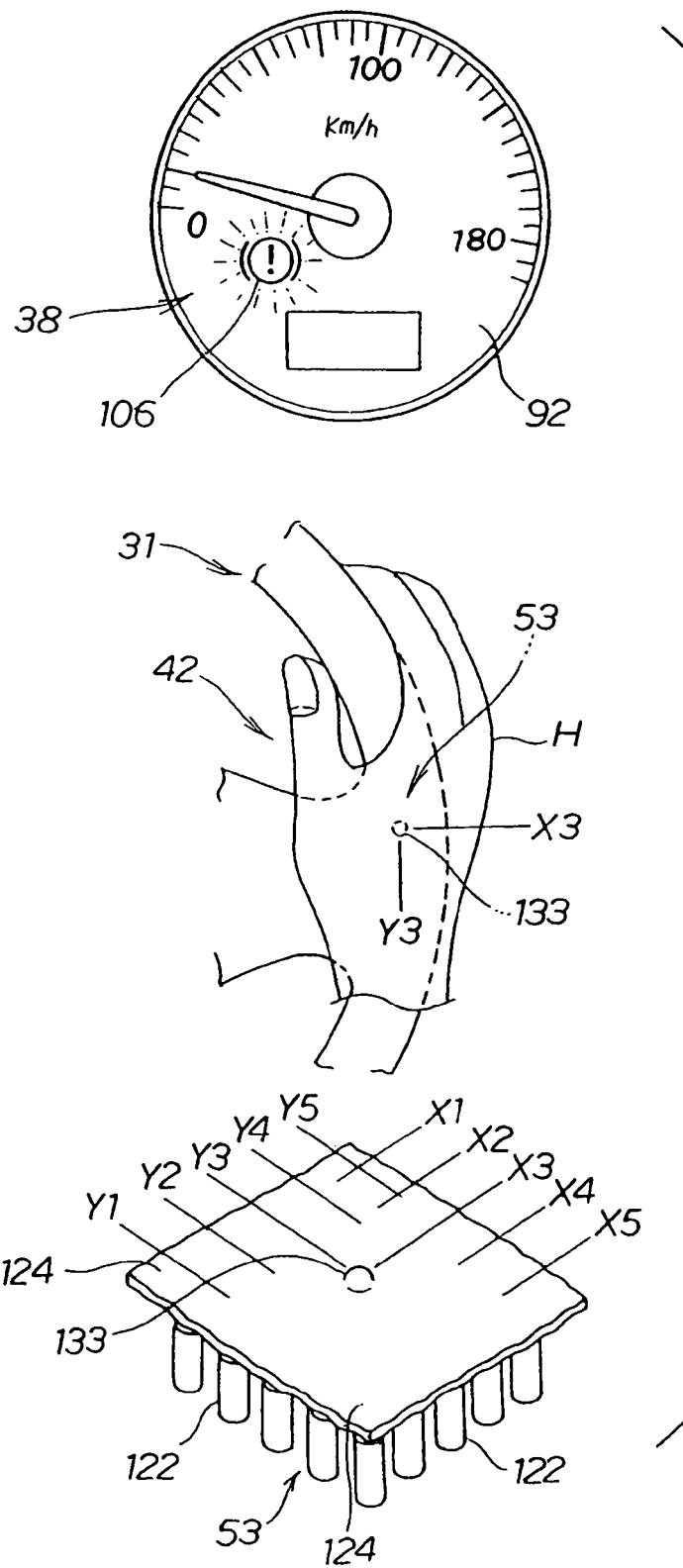

When a t-seconds time period has elapsed after the activation, the actuators 122 in the rows X2, X4 and columns Y2, Y4 are deactivated (retracted) and, at the same time, the central actuator 122 is activated (advanced), as shown in FIG. 10C. This causes the actuator rod of the activated central actuator 122 (X3, Y3) displace a central portion of the skin layer 124 upward, thus forming a single projection 133 on the front surface of the skin layer 124. Operation of the right tactile device 53 returns to the condition shown in FIG. 10A and then the operations described above with reference to FIGS. 10, 10B and 10C are repeated. By thus transmitting tactile movement of the projections 131, 132, 133 to the driver's palm, it is possible to warn the driver of an unreleased parking lever condition.

Though not shown, the left tactile device 51 operates in synchronism with the operation of the right tactile device 53. Accordingly, the same warning of unreleased parking brake condition is also issued from the left tactile device 51 to the driver. This will increase the reliability of the warning information transmitting to the driver.

In the warning apparatus 11 of the foregoing embodiment, the vehicle state information transmission apparatus 41 comprises a tactile device 42, which transmits a change in the vehicle state via the operating means (steering wheel) 31 to the driver as tactile information, and the tactile device 42 is operable in conjunction with the warning means (warning indicator). With this arrangement, it becomes possible for the driver to perceive warning information from its hand, which is in contact with the operating means (steering wheel) 31. This will insure highly clear and reliable transmission of vehicle state information to the driver.

The expression "the tactile device 42 is operable in conjunction with the warning means 38" used herein should be construed in a comprehensive manner as covering two different modes of operation: in a first operation mode, lighting-up of the warning means (warning indicator or light) 38 and activation of the tactile device 42 occur at the same time or in synchronism with each other and, while in a second operation mode, lighting-up of the warning means (warning indicator or light) 38 and activation of the tactile device 42 occur at different times. In one typical example of the second operation mode, activation of the tactile device 42 is deferred until certain conditions are met after lighting-up of the warning means, which may occur when the vehicle speed reaches a predetermined level or a predetermined time has elapsed.

When the parking brake lever 23 is released from the working position, the parking brake warning symbol (light) 106 of the warning means 38 goes off, and at the same time, the left and right tactile devices 51, 53 of the tactile device 42 terminate operation to transmit tactile information to the driver's hands.

The operation pattern (tactile pattern) used for transmitting a warning of unreleased parking brake to the driver may be selected at the driver's option. Accordingly, a radially expanding pattern, which is realized by simply reversing the order of activation/deactivation of the actuators 122 shown in FIGS. 10A to 10C, can be used in the present invention.

FIGS. 11A to 11G diagrammatically illustrate a series of operations achievable by the warning apparatus when it issues an E-mail arrival notice to the driver. In FIGS. 11A to 11G, the right tactile device 53 and the steering wheel 31 incorporating therein the tactile device 53 are shown in combination for purposes of explanation. The tactile device 42 (53) used in this mode of operation differs from the one use in the parking brake warning operation described above with reference to FIGS. 10A to 10C only in that a matrix or rectangular array of linear reciprocating actuators 122 has four rows X1 to X4 and four columns Y1 to Y4, and a total of 16 actuators 122 are used to form the matrix.

For operation, the tactile ON/OFF switch 43 shown in FIG. 1 is turned on. Then, using the warning selector switch 44 shown in FIG. 1, an icon representing the "E-mail Arrived" is selected from among those icons or symbols displaced on a monitor screen. Subsequently, using the tactile pattern input section 45 shown in FIG. 1, a suitable tactile pattern is selected from among those displaced on the monitor screen. In the illustrated embodiment, a diagonally traveling tactile pattern is selected. Then, the driver's own mobile phone (not shown) is connected to a suitable connector terminal of the vehicle. The forgoing order of operations can be changed at user's option.

When an E-mail is received, the tactile device 42 issues a notice to the driver by way of tactile information transmitted to the driver's hand. More specifically, when an E-mail is received, the actuator 122 which is located at a front right corner (X1, Y4) of the matrix shown in FIG. 1A is activated whereupon the actuator rod 126 (FIG. 5) projects upward to thereby displace a corresponding part of the flexible skin layer 124 in an upward direction. Thus, a single projection 137 is formed on the front surface of the skin layer 124. The projection 137 thus formed is well perceived by the driver as being tapped at its palm by something. The actuator 122 located at the front right corner (X1, Y4) is then deactivated to lower or retract its actuator rod.

Subsequently, as shown in FIG. 11B, two actuators 122, 122 located at coordinate positions (X1, Y3) and (X3, Y1) next to the front-right corner actuator are activated simultaneously. This causes the skin layer 124 to be deflected upwardly by the actuator rods of the activated actuators 122, 122 to the extent that two projections 138, 138 are formed on the front surface of the skin layer 124 at portions corresponding in position to the activated actuators. The projections 138, 138 thus formed are well perceived by the driver as being tapped by something at portions of the palm, which are slightly offset toward a first-finger side from the previously tapped portion. The actuators 122 having (X1, Y3) and (X3, Y1) coordinate positions are then deactivated to thereby retract the actuator rods thereof.

Subsequently, as shown FIG. 11C, three actuators 122 having coordinate positions of (X1, Y2), (X2, Y3) and (X3, Y4), respectively, are activated simultaneously whereupon the flexible skin layer 124 is upwardly displaced by the actuator rods of the activated actuators 122 to the extent that three projections 141, 141, 141 are formed on the front surface of the skin layer 124 at portions corresponding in position to the activated actuators. The projections 141 thus formed are well perceived by the driver as being tapped by something at portions of the palm, which are slightly offset toward a first-finger side from the previously tapped portions. The actuators 122 having (X1, Y2), (X2, Y3) and (X3, Y4) coordinate positions are then deactivated to thereby retract the actuator rods thereof.

Then, as shown FIG. 11D, four actuators 122 having coordinate positions of (X1, Y1), (X2, Y2), (X3, Y3) and (X4, Y4), respectively, are activated simultaneously whereupon the flexible skin layer 124 is upwardly displaced by the actuator rods of the activated actuators 122 to the extent that three projections 141 are formed on the front surface of the skin layer 124 at portions corresponding in position to the activated actuators. The projections 141 thus formed are well perceived by the driver as being tapped by something at portions of the palm, which are slightly offset toward a first-finger side from the previously tapped portions. The actuators 122 having of (X1, Y1), (X2, Y2), (X3, Y3) and (X4, Y4) coordinate positions are then deactivated to thereby retract the actuator rods thereof.

Figure 11G:
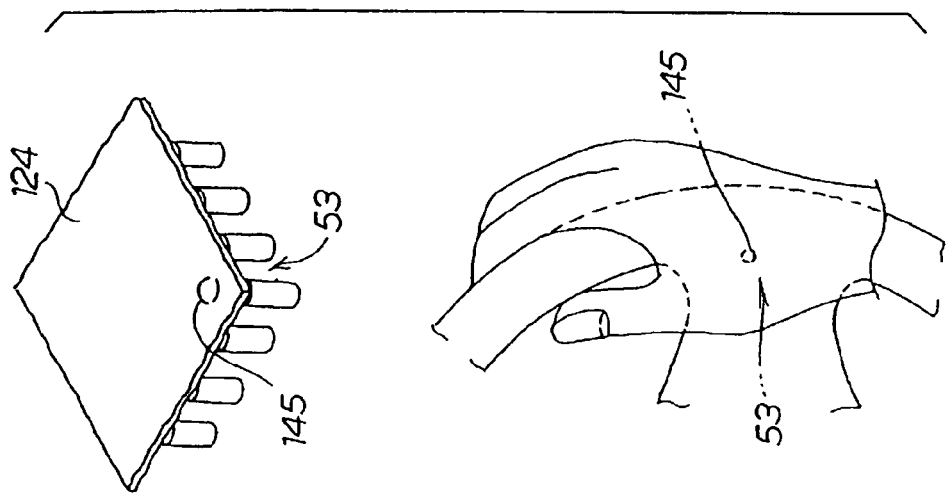

Subsequently, as shown FIG. 11E, three actuators 122 having coordinate positions of (X2, Y1), (X3, Y2) and (X4, Y3), respectively, are activated simultaneously whereupon the flexible skin layer 124 is upwardly displaced by the actuator rods of the activated actuators 122 to the extent that three projections 143, 143, 143 are formed on the front surface of the skin layer 124 at portions corresponding in position to the activated actuators. The projections 143 thus formed are well perceived by the driver as being tapped by something at portions of the palm, which are slightly offset toward a first-finger side from the previously tapped portions. The actuators 122 having (X2, Y1), (X3, Y2) and (X4, Y3) coordinate positions are then deactivated to thereby retract the actuator rods thereof.

Figure 11F:
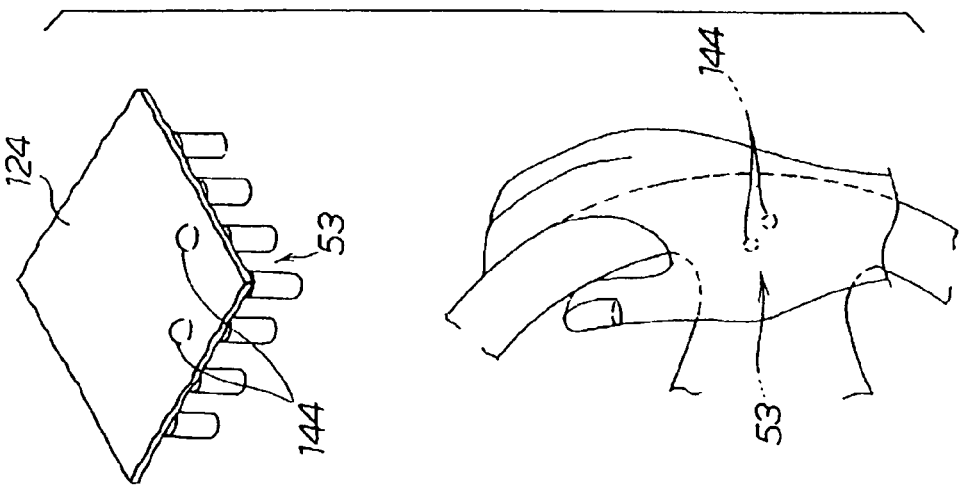
Figure 11E:
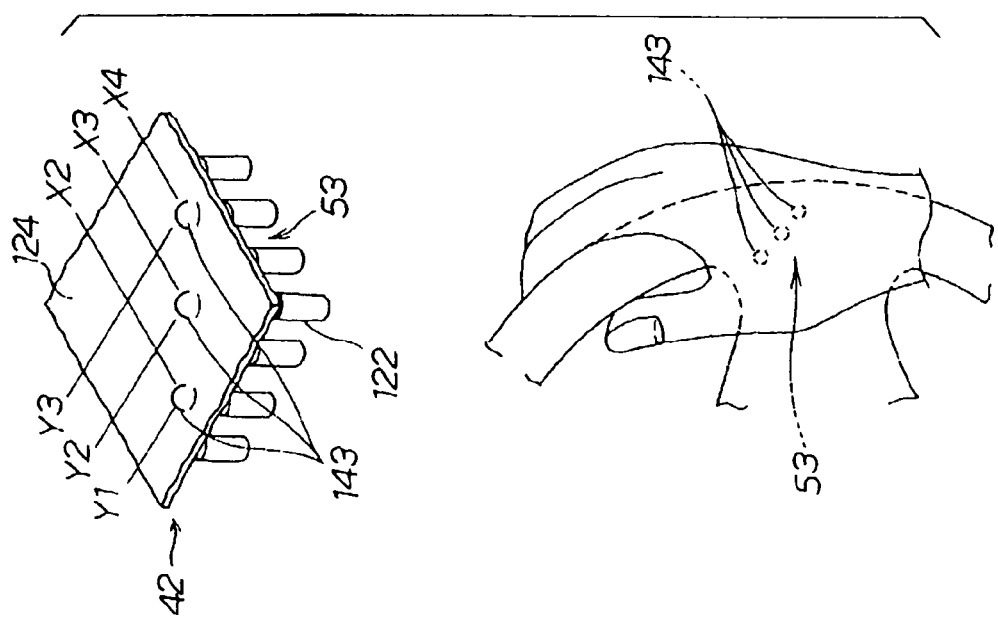

Subsequently, as shown in FIG. 11F, two actuators 122, 122 located at coordinate positions (X2, Y1) and (X1, Y1) are activated simultaneously. This causes the skin layer 124 to be deflected upwardly by the actuator rods of the activated actuators 122, 122 to the extent that two projections 144, 144 are formed on the front surface of the skin layer 124 at portions corresponding in position to the activated actuators. The projections 144, 144 thus formed are well perceived by the driver as being tapped by something at portions of the palm, which are slightly offset toward a first-finger side from the previously tapped portion. The actuators 122 having coordinate positions (X2, Y1) and (X1, Y1) are then deactivated to thereby retract the actuator rods thereof.

Then, as shown in FIG. 11G, the actuator 122 which is located at the rear left corner (X4, Y1) of the matrix is activated whereupon the actuator rod 126 (FIG. 5) of the activated actuator 122 projects upward to thereby displace a corresponding part of the flexible skin layer 124 in an upward direction. Thus, a single projection 145 is formed on the front surface of the skin layer 124. The projection 145 thus formed is well perceived by the driver as being tapped at its palm by something. The actuator 122 located at the front right corner (X1, Y4) is then deactivated to lower or retract its actuator rod.

Then the operation returns to the process shown in FIG. 11A and the same operations discussed above with reference to FIGS. 11-11G are repeated. By thus repeating the operations, the apparent movement is especially well perceived by the driver as a sensation of something rubbing a limited palm area of the hand. Thus, the arrival of E-mail message can be transmitted to the driver with certainty.

FIGS. 12A to 12D illustrate a sequence of operations of the tactile device 42 achieved when a lane departure occurs during traveling. In each of the drawing figures, the position of the vehicle 12, the steering wheel 31 in which the tactile device 53 is incorporated, and the tactile device 53 are shown in combination for the purpose of explanation.

Operation begins when the tactile switch 43 shown in FIG. 1 is turned on. Then, using the warning selector switch 44, the "lane departure warning" is selected from among those warnings displaced on the monitor screen. Next, the tactile pattern input section 45 shown in FIG. 1 is operated to select a desired tactile pattern from among those patterns displaced on the monitor screen. The order of the foregoing operations may be altered at the driver's option.

As shown in FIG. 12A, while the vehicle 12 is traveling along the center of a drive lane 147, the right tactile device 53 operate to activate those linear reciprocating actuators 122 disposed in the column Y3 based on information captured by the lane detection camera 86. Thus, a series of projections 153 is formed on the front surface of the skin layer 124 of the steering wheel 31 and the presence of such aligned projections 153 can be perceived by the driver as indicating the vehicle driving along the center of the drive lane 147. By thus providing the aligned projections 153 as a reference line, a vehicle lane departure can be grasped with ease. The foregoing operation of the tactile device 53 to provide a central reference line by way of forming the aligned projections 153 is not essential and can be omitted at the driver's desire at which instance the driver is freed from a sensation of something existing at all times at a limited palm area while driving along the center of the drive lane 147.

When the vehicle 12 while traveling departs from the lane center to the right, or stated otherwise when the vehicle 12 starts traveling alongside the centerline 155, the tactile device 53 activates the actuators 122 in the column Y4 (indicated by the arrow a3 in FIG. 12B) on the basis of information captured by the lane detection camera 86. This causes the flexible skin layer 124 to be displaced upwardly at a limited area corresponding in position to the aligned actuators 122 in the column Y4 with the result that five projections 156 are produced on the front surface of the skin layer 124 at an area which is offset to the right from the reference line formed by the projections 153 (FIG. 12A). The projections 156 thus formed enable the driver to acknowledge the vehicle traveling with a right-side lane departure. In the illustrated embodiment, the actuators 122 in the column Y4 are activated simultaneously, however, they may be activated in sequence at given time intervals either at one time or repeatedly.

Figure 12C:
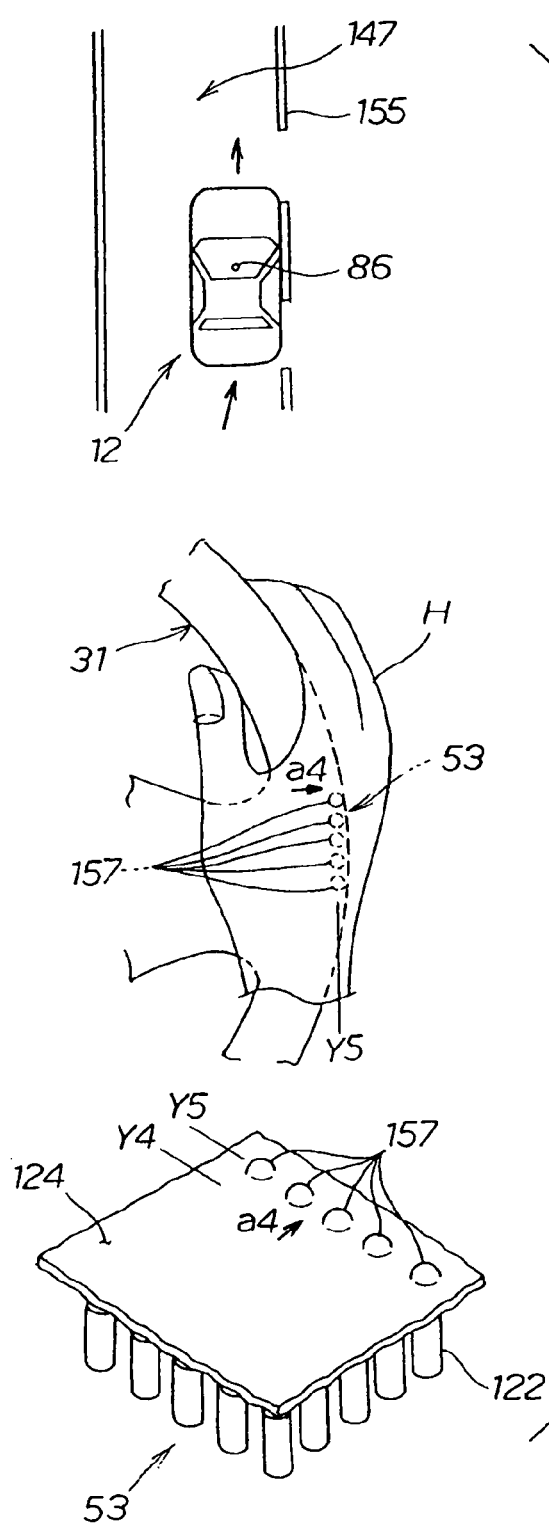

When the vehicle 12 further departs to the right from the center of the drive lane 147 and starts traveling closely alongside the centerline, as shown in FIG. 12C, the tactile device 53 activates the actuators 122 in the column Y5 to thereby form five projections 157 aligned on the front surface of the skin layer 124 at a position which is slightly offset to the right (as indicated by the arrow a4) from the position of the projections 156 shown in FIG. 12B. The projections 157 thus produced can be perceived by the driver as tactile information indicating the vehicle traveling along the drive lane 147 with a larger right-side lane departure.

Figure 12D:
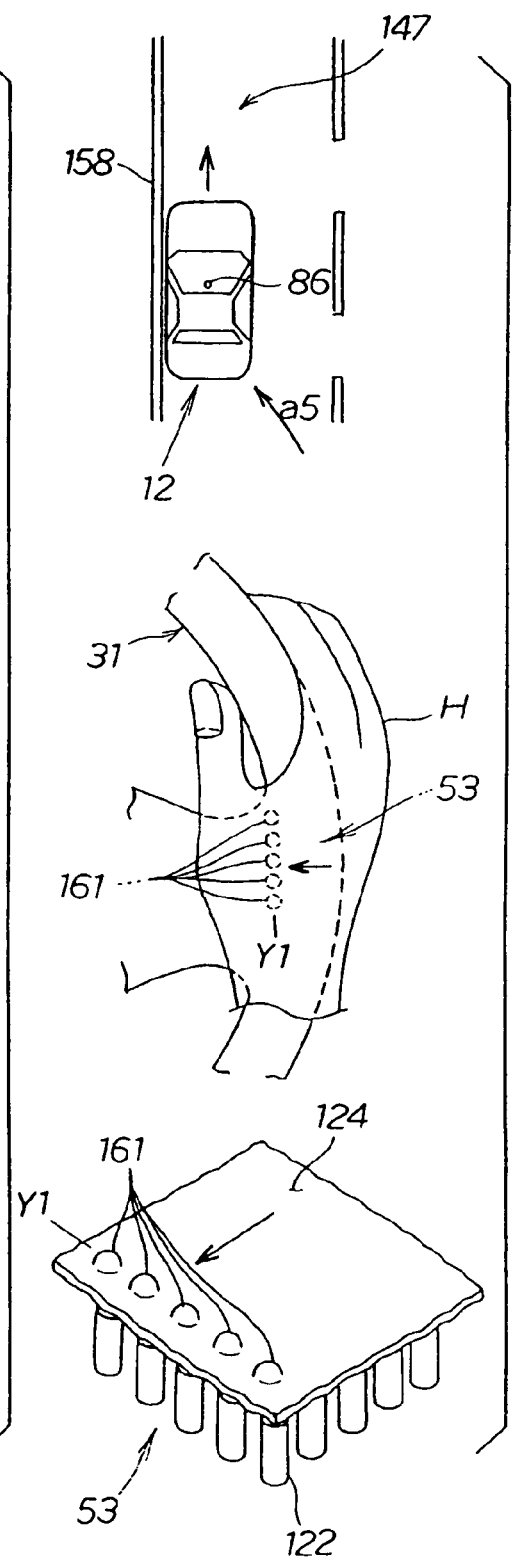

Alternatively, if the vehicle starts traveling alongside the road shoulder 158 with a large left-side lane departure as indicated by the arrow as shown in FIG. 12D, the tactile device 43 activates the actuators 122 in the column Y1 to thereby form five aligned projections 161 on the front surface of the skin layer 124. The projections 161 thus produced can be well perceived by the driver as tactile information indicating the vehicle traveling along the drive lane 147 with a large left-side lane departure.

In the illustrated embodiments described above, the tactile device 42 is assembled in the steering wheel 31. The tactile device 42 may be incorporated in any vehicle part other than the steering wheel 31. The illustrated vehicle state information transmitting apparatus is provided three different tactile patterns (operation patterns). Sine these tactile patters cannot be used in combination at one time, it is preferable to set the order of priority by using the monitor screen. It is also possible to modify the vehicle state information transmission apparatus to have only one operation pattern.

FIG. 13 shows a flowchart showing a series of operations to be achieved by the ECU 24 when a tactile information transmitting operation is performed with high fidelity with the steering angle according to an embodiment of the present invention.

At first, step ST101 reads a signal from the tactile ON/OFF switch 43 (FIG. 1) for subsequent determination as to whether the driver desires the tactile information transmission using the vehicle state information transmission apparatus 11.

Then, step ST102 determines whether the tactile ON/OFF switch 43 is in ON. If determination indicates the off state of the tactile ON/OFF switch 43, the control procedure is terminated. Alternatively, if the on state of the tactile ON/OFF switch is determined, the control procedure goes on step ST103 where various factors indicative of the vehicle states or conditions, such as a vehicle wheel speed Vh, vehicle speed Vc, lateral acceleration y, yaw rate θ, steering angle of the steering wheel 31, surface irregularities, steered angle of vehicle wheels, travel direction (forward/reverse), are detected.

Subsequently, step ST104 performs arithmetic processing to calculate a slit in a rotating direction of the wheels (when vehicle wheel speed Vh and vehicle speed Vc are not equal), steering angle of the steering wheel 31, slip angle β about vehicle central axis as vehicle turning center (yaw rate θ and steering wheel steering angle) with filtering of the calculated factors.

Step ST104 is followed by step ST105 where matching with table maps (FIGS. 14A and 14B) is performed. Next, step ST106 determines a tactile pattern based on conditions determined in advance. The tactile pattern is a nature of a wave motion produced by projections formed on the skin layer 124 of the steering wheel 31 when the tactile device 42 is operating. In determining the tactile pattern, modification of the tactile pattern may be made where appropriate. Then, step ST107 activate the tactile means (device 42 in the illustrated embodiment).

The operations performed in steps ST01 to ST107 will be described below in greater detail with reference to FIGS. 14A-14B, FIGS. 15A-15E, 16A-16E and 17A-17E.

Figure 14A:
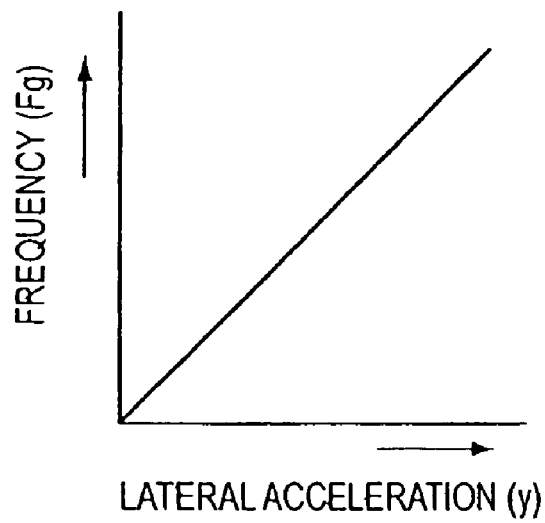
FIG. 14A is a table map showing a correlation between lateral acceleration and frequency for use in a tactile pattern determining operation shown in FIG. 13.

FIG. 14A shows a table map showing a correlation between the lateral acceleration y acting on the vehicle and the frequency Fg of the wave motion produced by the tactile device 42. The map shows that the frequency Fg is in direct proportion to the lateral acceleration y, and the frequency Fg is set to be 0 when the lateral acceleration y is 0, i.e., the vehicle is traveling straight.

Figure 14B:
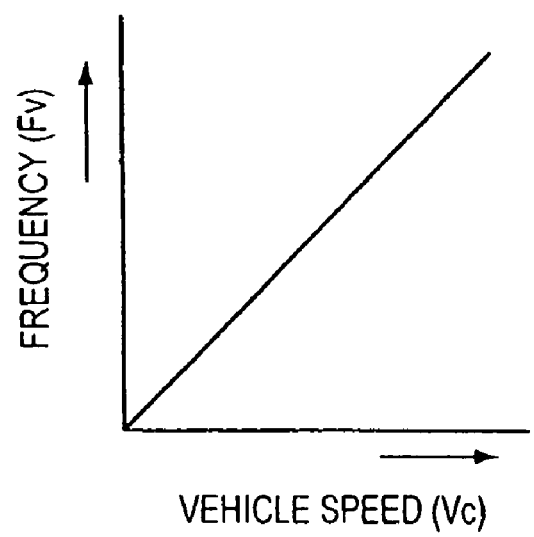
FIG. 14B is a table map showing a correlation between the vehicle speed and the frequency for use in the tactile pattern determining operation shown in FIG. 13.

FIG. 14B shows a table map showing a correlation between the vehicle speed Vc and the frequency Fv of the wave motion produced by the tactile device 42. The map shows that the frequency Fv is in direct proportion to the vehicle speed Vc, and the frequency Fc is set to be 0 when the vehicle speed Vc is 0, i.e., the vehicle is in a parked state.

Figure 15A:
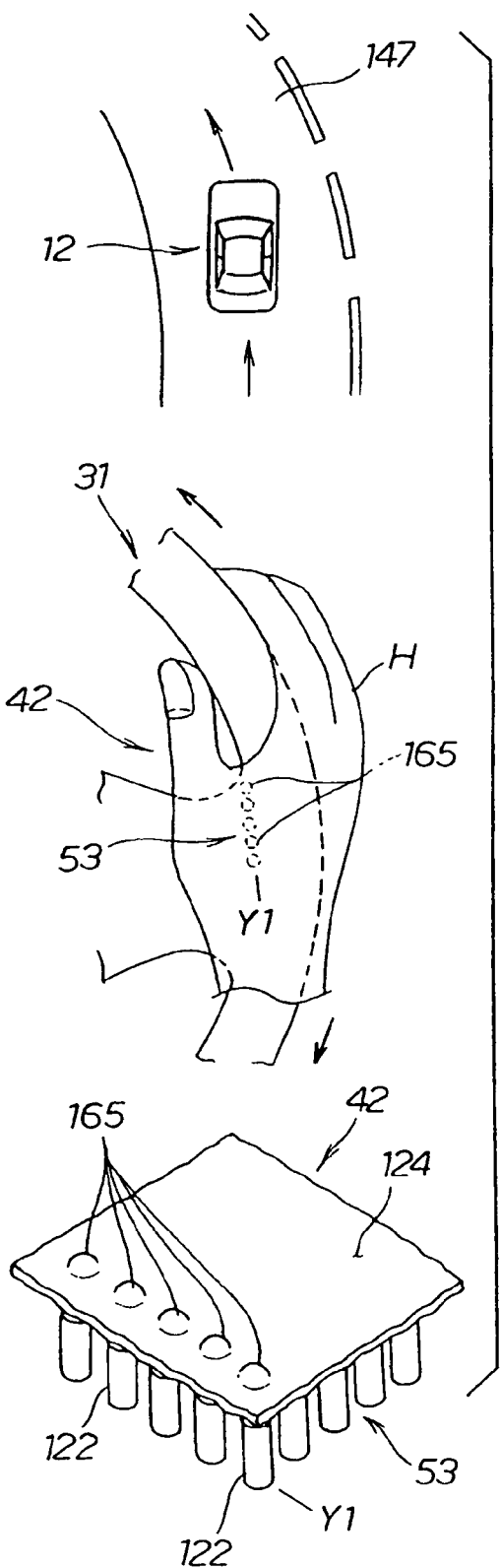
FIGS. 15A to 15E are diagrammatical views illustrative of the operation performed by the tactile device to transmit tactile vehicle state information via the steering wheel to the driver as the diver turns the steering wheel from the neutral position in a counterclockwise direction through an angle not more than 90 degrees, and preferably 75 degrees.
Figure 15B:
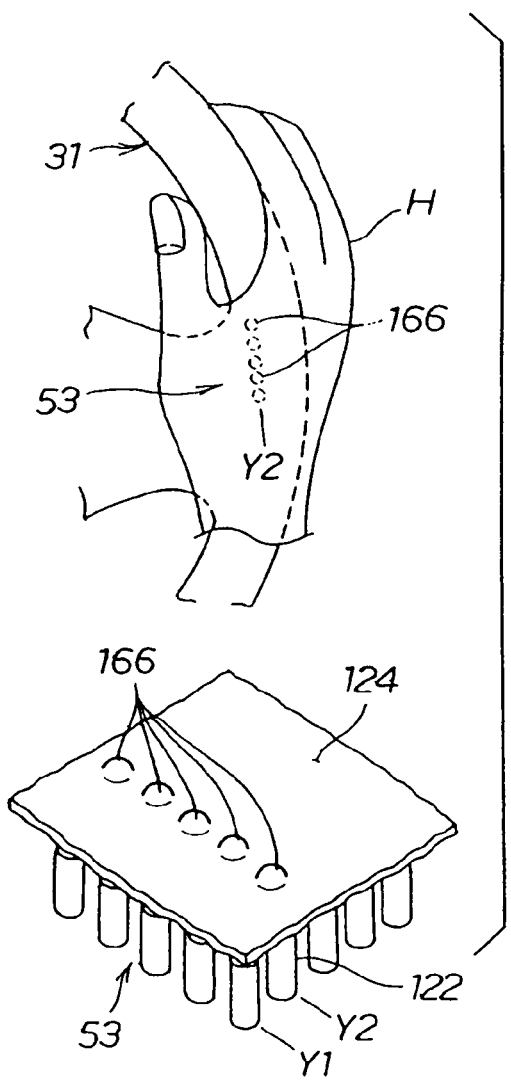

FIGS. 15A and 15B show in combination the behavior of the vehicle 12 traveling along a drive lane 147, the position of a right grip portion of the steering wheel 31 in which the right tactile device 53 of the tactile device 42 is incorporated, and the nature of projections formed on the skin layer 124 of the steering wheel 31 by the operation of the tactile device 53, which are achieved while the steering wheel 31 is at around the "go-straight" or neutral position.

For purposes of explanation, a steering angle, which is achieved when the steering wheel 31 is turned leftward or counterclockwise, will be described with a sign (+) affixed therewith, while a steering angles, which is achieved when the steering wheel 31 is turned rightward or clockwise, will be described with a sign (−) affixed therewith. As described above, the right grip portions of the steering wheel 31 in which the right tactile device 53 is incorporated is located at the 2 to 3 o'clock position when the steering wheel 31 is in the neutral position (in the following description, the 3 o'clock position will be adopted for purposes of illustration). Accordingly, ¼ turn of the steering wheel 31 from the neutral position will bring the right grip portion (right tactile device 53) to the 12 o'clock position (+90° position) or the 6 o'clock position (−90° position). Similarly, ½ turn of the steering wheel 31 from the neutral position will bring the right grip portion (right tactile device 53) to the 9 o'clock position (∓180° position. Further, ¾ turn of the steering wheel 31 from the neutral position will bring the right grip portion (right tactile device 53) to the 6 o'clock (+270° position) position or the 12 o'clock position (−270° position). The same representation rule will apply to any angles achieved when the steering angle is turned 360° or greater.

The term "at around the "go-straight" or neutral position" is used herein to refer to the position that the right grip portion (right tactile device 53) may take when the steering wheel 31 is turned ∓90° (more properly ∓75°) From the neutral position.

As shown FIG. 15A, when the vehicle 12 enters a left curve, the right tactile device 53 is activated to produce a wave motion traveling from the left to the right by means of a series of aligned projections formed successively on the front surface of the skin layer 124 of the steering wheel 31. The curve of the drive lane 147 has a radius of curvature progressively decreasing in the direction of travel of the vehicle 12.

More specifically, when the vehicle 12 approaches the left curve 62, the driver will turn the steering wheel 31 leftward (counterclockwise) whereupon a steering angle of the steering wheel and a lateral acceleration occurring at that time are detected. Based on information pertaining to the detected controlled variables, the linear actuators 122 located in the column Y1 of the actuator matrix are activated simultaneously to thereby displace corresponding areas of the flexible skin layer 124 upward with the result that five aligned projections 165 are formed on the front surface of the skin layer 124. Formation of the projections 165 can be well perceived by the driver as being tapped by something at its palm. Immediately after the formation of the projections 165, the actuators 122 in the column Y1 are deactivated simultaneously to thereby retract their actuation rods 126 (FIG. 5). The projections 165 on the skin layer 124 vanish instantly.

In synchronism with deactivation of the column-Y1 actuators 122, the actuators 122 in column Y2 are activated, as shown in FIG. 15B. This causes the skin layer 124 to be locally displaced upward to thereby form a row of projections 166 on the front surface thereof at a position one-column distance offset to the right from the position of the projections 165 formed in the preceding cycle. Formation of the projections 166 can be perceived by the driver as being tapped by something at a palm portion, which is slightly offset to the right from the portion tapped in the preceding cycle. Immediately after the formation of the projections 166, the column-Y2 actuators 122 are deactivated and the projections 166 vanish instantly.

Figure 15E:
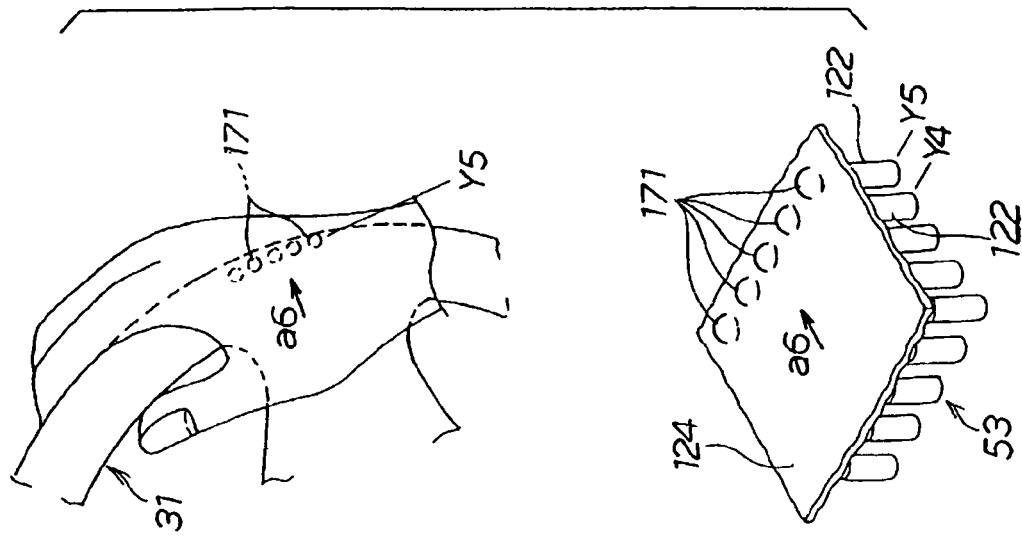
Figure 15D:
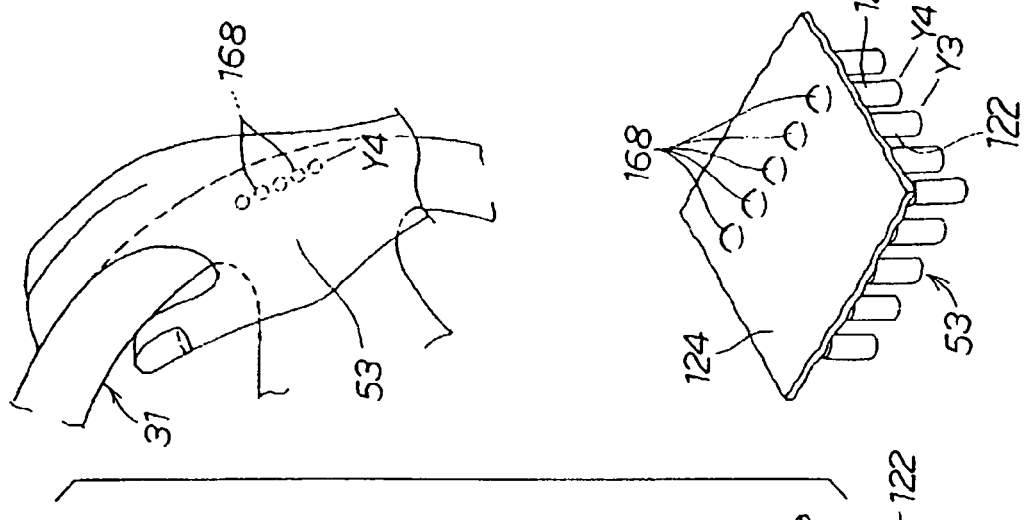
Figure 15C:
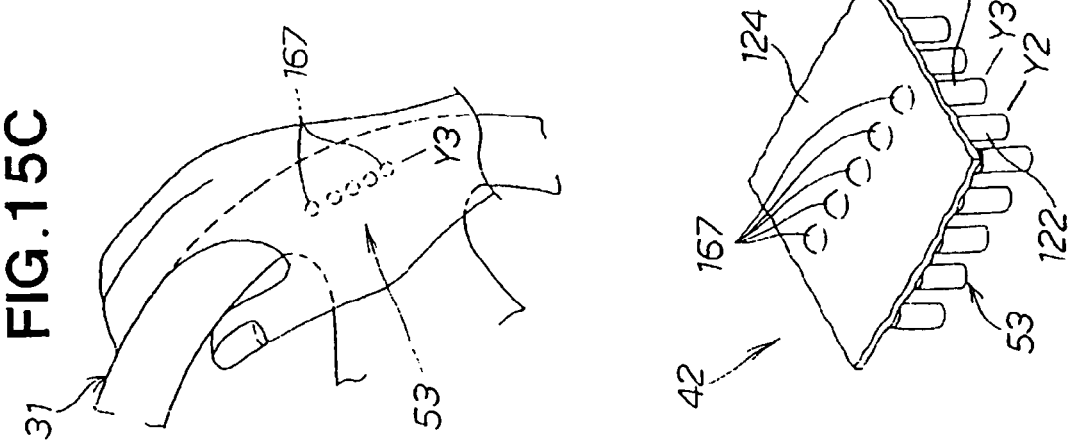

Furthermore, in synchronism with deactivation of the column-Y2 actuators 122, the actuators 122 in column Y3 are activated, as shown in FIG. 15C. This causes the skin layer 124 to be locally displaced upward to thereby form a row of projections 167 on the front surface thereof at a position one-column distance offset to the right from the position of the projections 166 formed in the preceding cycle. Formation of the projections 167 can be perceived by the driver as being tapped by something at a palm portion, which is slightly offset to the right from the portion tapped in the preceding cycle. Immediately after the formation of the projections 167, the column-Y3 actuators 122 are deactivated and the projections 167 vanish instantly.

In synchronism with deactivation of the column-Y3 actuators 122, the actuators 122 in column Y4 are activated, as shown in FIG. 15D. This causes the skin layer 124 to be locally displaced upward to thereby form a row of projections 168 on the front surface thereof at a position one-column distance offset to the right from the position of the projections 167 formed in the preceding cycle. Formation of the projections 168 can be perceived by the driver as being tapped by something at a palm portion, which is slightly offset to the right from the portion tapped in the preceding cycle. Immediately after the formation of the projections 168, the column-Y4 actuators 122 are deactivated and the projections 168 vanish instantly.

Furthermore, in synchronism with deactivation of the column-Y4 actuators 122, the actuators 122 in column Y5 are activated, as shown in FIG. 15E. This causes the skin layer 124 to be locally displaced upward to thereby form a row of projections 171 on the front surface thereof at a position one-column distance offset to the right (in a radial outward direction of the steering wheel) from the position of the projections 168 formed in the preceding cycle. Formation of the projections 171 can be perceived by the driver as being tapped by something at a palm portion, which is slightly offset to the right from the portion tapped in the preceding cycle. Immediately after the formation of the projections 171, the column-Y5 actuators 122 are deactivated and the projections 171 vanish instantly.

The foregoing sequence of operations shown in FIGS. 15A to 15E is repeated with result that the flexible skin layer 124 generates a wave motion traveling from the left to the light at a frequency Fg. The wave motion can be well conceived by the driver as a sensation of something running across a palm portion or as being rubbed by something at the palm portion. Since the direction of travel of the wave motion is substantially the same as the direction of the lateral acceleration, and since the frequency of the wave motion is proportional to the lateral acceleration, the driver is able to get the magnitude of a current lateral acceleration from the tactile information represented by the wave motion.

As previously described, the radius of curvature of the drive lane 147 reduces progressively in the traveling direction of the vehicle 12. Accordingly, traveling of the vehicle 12 along the driving lane 147 requires the driver to steer continuously and gradually to the left. Such steering operation will place the steering wheel 31 to the position shown in FIGS. 16A to 16E where the right grip portion (in which the tactile device 53 is incorporated) has advanced about 90 degrees (and more strictly 75 to 105 degrees) from its initial position shown in FIGS. 15A to 15E. While the steering wheel 31 is located at around the +90° position (which is 90 degree advanced to the left from the neutral position), the tactile device 53 so operates as to produce a wave motion of the skin layer 124 traveling in the same direction (i.e., left-to-right direction) as that produced as before (when the steering wheel 31 is located at around the neutral position). To this end, the tactile device 53 changes its operation mode in such a manner as to activates only those actuators 122 which are arrayed in the rows X1 to X5.

Figure 16C:
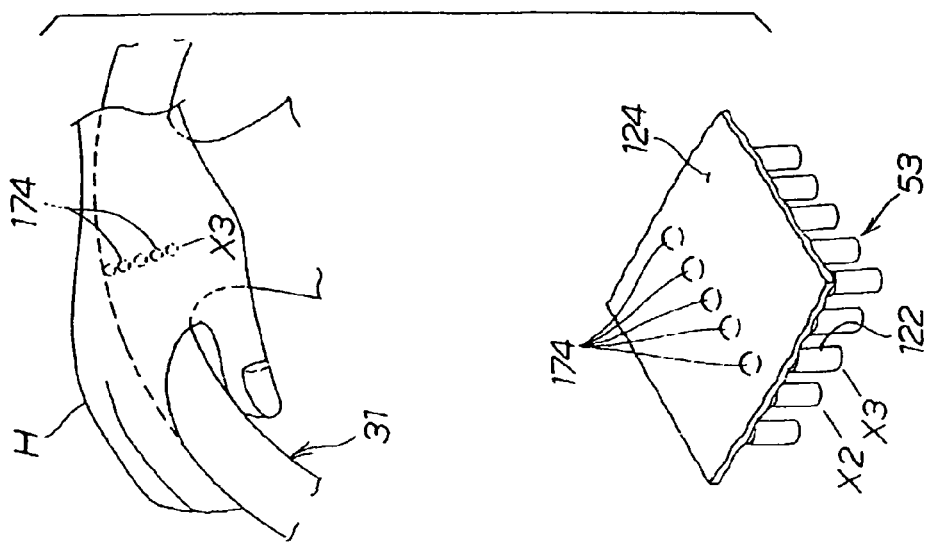
Figure 16B:
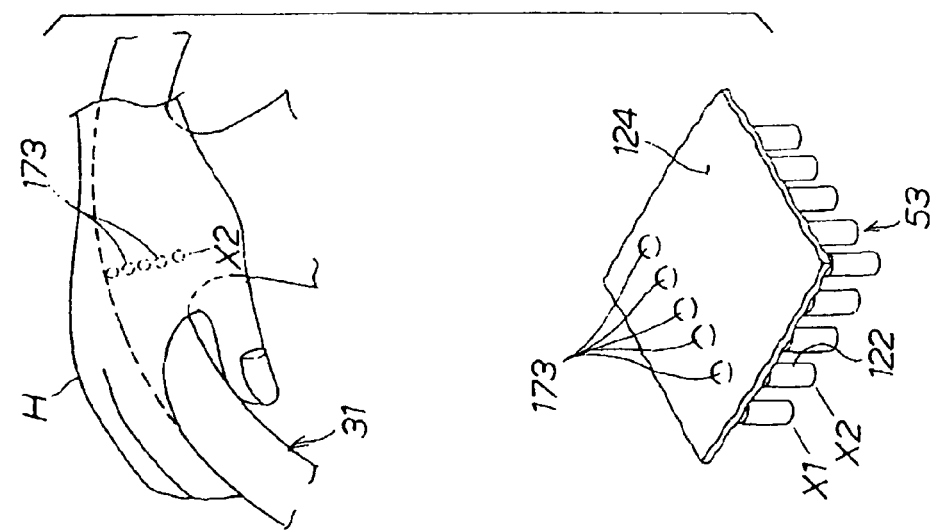
Figure 16A:
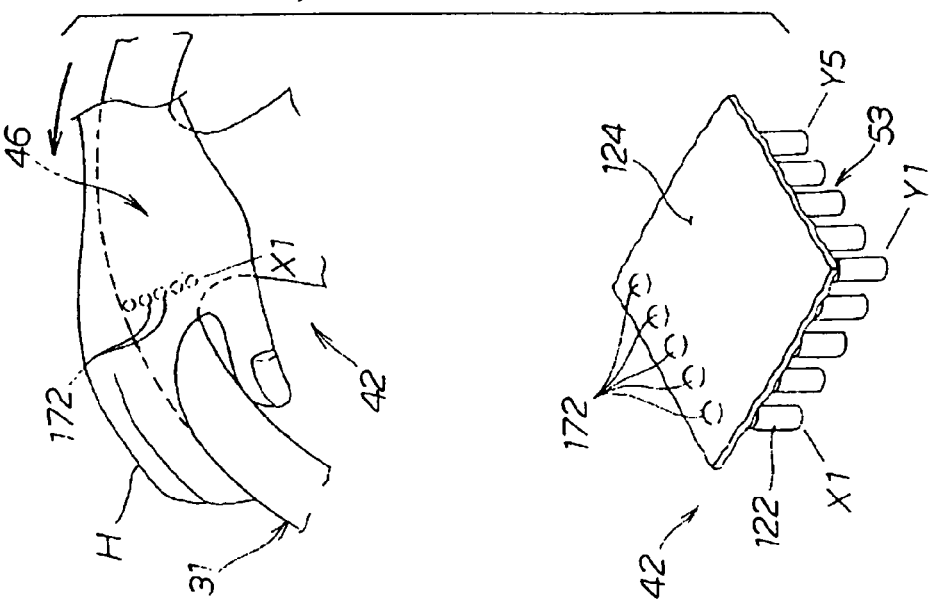

More specifically, when the driver has steered left until the right grip portion (right tactile device 53) reaches around its +90° position, as shown in FIG. 16A, a steering angle of the steering wheel and a lateral acceleration are detected. Based on information pertaining to the detected controlled variables, the linear actuators 122 located in the row X1 of the actuator matrix are activated simultaneously to thereby displace corresponding areas of the flexible skin layer 124 upward with the result that five aligned projections 172 are formed on the front surface of the skin layer 124. Formation of the projections 172 can be well perceived by the driver as being tapped by something at its palm. Immediately after the formation of the projections 172, the actuators 122 in the row X1 are deactivated simultaneously to thereby retract their actuation rods 126 (FIG. 5). The projections 172 on the skin layer 124 vanish instantly.

In synchronism with deactivation of the row-X1 actuators 122, the actuators 122 in row X2 are activated, as shown in FIG. 16B. This causes the skin layer 124 to be locally displaced upward to thereby form a row of projections 173 on the front surface thereof at a position one-row distance offset to the right from the position of the projections 172 formed in the preceding cycle. Formation of the projections 173 can be perceived by the driver as being tapped by something at a palm portion, which is slightly offset to the right from the portion tapped in the preceding cycle. Immediately after the formation of the projections 173, the row-X2 actuators 122 are deactivated and the projections 173 vanish instantly.

Furthermore, in synchronism with deactivation of the row-X2 actuators 122, the actuators 122 in row X3 are activated, as shown in FIG. 16C. This causes the skin layer 124 to be locally displaced upward to thereby form a row of projections 174 on the front surface thereof at a position one-column distance offset to the right from the position of the projections 173 formed in the preceding cycle. Formation of the projections 174 can be perceived by the driver as being tapped by something at a palm portion, which is slightly offset to the right from the portion tapped in the preceding cycle. Immediately after the formation of the projections 174, the row X-3 actuators 122 are deactivated and the projections 174 vanish instantly.

In synchronism with deactivation of the row-X3 actuators 122, the actuators 122 in row X4 are activated, as shown in FIG. 16D. This causes the skin layer 124 to be locally displaced upward to thereby form a row of projections 175 on the front surface thereof at a position one-column distance offset to the right from the position of the projections 174 formed in the preceding cycle. Formation of the projections 174 can be perceived by the driver as being tapped by something at a palm portion, which is slightly offset to the right from the portion tapped in the preceding cycle. Immediately after the formation of the projections 175, the row-X4 actuators 122 are deactivated and the projections 175 vanish instantly.

Furthermore, in synchronism with deactivation of the row X4 actuators 122, the actuators 122 in row X5 are activated, as shown in FIG. 16E. This causes the skin layer 124 to be locally displaced upward to thereby form a row of projections 176 on the front surface thereof at a position one-column distance offset to the right from the position of the projections 175 formed in the preceding cycle. Formation of the projections 176 can be perceived by the driver as being tapped by something at a palm portion, which is slightly offset to the right from the portion tapped in the preceding cycle. Immediately after the formation of the projections 176, the row X-5 actuators 122 are deactivated and the projections 176 vanish instantly.

The foregoing sequence of operations shown in FIGS. 16A to 16E is repeated with result that the flexible skin layer 124 generates a wave motion traveling from the left to the right at a frequency Fg. The wave motion can be well conceived by the driver as a sensation of something running across a palm portion or as being rubbed by something at the palm portion. Since the direction of travel of the wave motion is substantially the same as the direction of the lateral acceleration, and since the frequency of the wave motion is proportional to the lateral acceleration, the driver is able to get the magnitude of a current lateral acceleration from the tactile information represented by the wave motion. Additionally, because the direction of the wave motion produced on the skin layer 124 is substantially constant in disregard to a change (increase) in the steering angle, the driver is able to get information pertaining to the vehicle speed and lateral acceleration through the tactile information represented by way of the wave motion without a sense of discomfort.

FIG. 17A shows the steering wheel 31, which has been steered until the right grip portion (right tactile device 53) is located at around its +180° position. The term "at around its +180° position" is used herein to refer to an angular range that the right grip portion (right tactile device 53) may define when moving from +105° position to +255° position.

When the steering wheel 31 has steered 180 degrees left from the neutral position, the tactile device 53 changes its operation mode again so that only those actuators 122 lying in the columns Y1 to Y5 are activated successively column-by-column in the converse order, i.e., in the order from Y5 to Y1. In this operation mode, the tactile device 53 is able to produce a wave motion of the skin layer 124 traveling in the same direction (i.e., left-to-right direction) as that produced as before.

More specifically, when the steering wheel 31 is turned leftward to a position 180 degrees ahead from the neutral position, as shown in FIG. 17A, a steering angle of the steering wheel and a lateral acceleration occurring at that time are detected. Based on information pertaining to the detected controlled variables, the linear actuators 122 located in the column Y5 of the actuator matrix are activated simultaneously to thereby displace corresponding areas of the flexible skin layer 124 upward with the result that five aligned projections 180 are formed on the front surface of the skin layer 124. Formation of the projections 180 can be well perceived by the driver as being tapped by something at its palm. Immediately after the formation of the projections 180, the actuators 122 in the column Y5 are deactivated simultaneously to thereby retract their actuation rods 126 (FIG. 5). The projections 180 on the skin layer 124 vanish instantly.

In synchronism with deactivation of the column-Y5 actuators 122, the actuators 122 in column Y4 are activated, as shown in FIG. 17B. This causes the skin layer 124 to be locally displaced upward to thereby form a row of projections 181 on the front surface thereof at a position one-column distance offset to the right from the position of the projections 180 formed in the preceding cycle. Formation of the projections 181 can be perceived by the driver as being tapped by something at a palm portion, which is slightly offset to the right from the portion tapped in the preceding cycle. Immediately after the formation of the projections 181, the column-Y4 actuators 122 are deactivated and the projections 181 vanish instantly.

Furthermore, in synchronism with deactivation of the column-Y4 actuators 122, the actuators 122 in column Y3 are activated, as shown in FIG. 17C. This causes the skin layer 124 to be locally displaced upward to thereby form a row of projections 182 on the front surface thereof at a position one-column distance offset to the right from the position of the projections 181 formed in the preceding cycle. Formation of the projections 182 can be perceived by the driver as being tapped by something at a palm portion, which is slightly offset to the right from the portion tapped in the preceding cycle. Immediately after the formation of the projections 182, the column-Y3 actuators 122 are deactivated and the projections 182 vanish instantly.

Figure 17D:
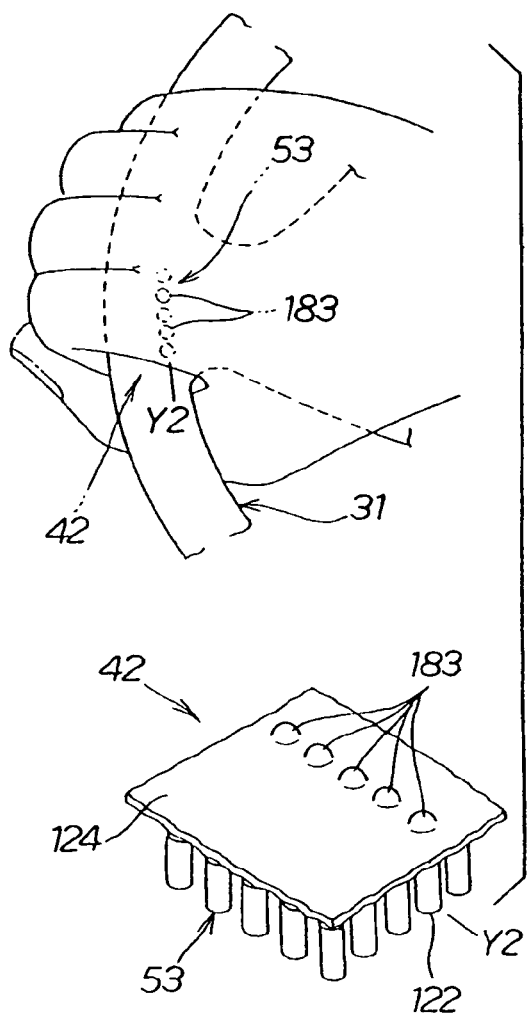

In synchronism with deactivation of the column-Y3 actuators 122, the actuators 122 in column Y2 are activated, as shown in FIG. 17D. This causes the skin layer 124 to be locally displaced upward to thereby form a row of projections 183 on the front surface thereof at a position one-column distance offset to the right from the position of the projections 182 formed in the preceding cycle. Formation of the projections 183 can be perceived by the driver as being tapped by something at a palm portion, which is slightly offset to the right from the portion tapped in the preceding cycle. Immediately after the formation of the projections 183, the column-Y2 actuators 122 are deactivated and the projections 183 vanish instantly.

Figure 17E:
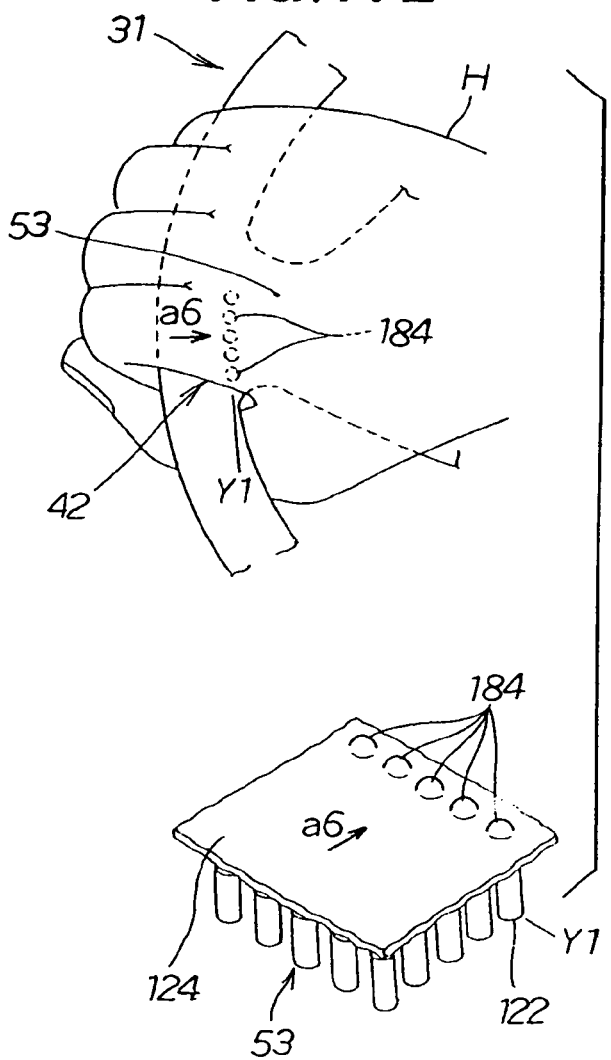

Furthermore, in synchronism with deactivation of the column-Y2 actuators 122, the actuators 122 in column Y1 are activated, as shown in FIG. 17E. This causes the skin layer 124 to be locally displaced upward to thereby form a row of projections 184 on the front surface thereof at a position one-column distance offset to the right from the position of the projections 183 formed in the preceding cycle. Formation of the projections 184 can be perceived by the driver as being tapped by something at a palm portion, which is slightly offset to the right from the portion tapped in the preceding cycle. Immediately after the formation of the projections 184, the column-Y1 actuators 122 are deactivated and the projections 184 vanish instantly.

The foregoing sequence of operations shown in FIGS. 17A to 17E is repeated with result that the flexible skin layer 124 generates a wave motion traveling from the left to the light (in a direction of the arrow a6 shown in FIG. 17E) at a frequency Fg. The wave motion can be well conceived by the driver as a sensation of something running across a palm portion or as being rubbed by something at the palm portion. Since the direction of travel of the wave motion is substantially the same as the direction of the lateral acceleration, and since the frequency of the wave motion is proportional to the lateral acceleration, the driver is able to get the magnitude of a current lateral acceleration from the tactile information represented by the wave motion. Additionally, because the direction of the wave motion produced on the skin layer 124 is substantially constant in disregard to a change (increase) in the steering angle, the driver is able to get information pertaining to the vehicle speed and lateral acceleration through the tactile information represented by way of the wave motion without a sense of discomfort.

When the diver further turns the steering wheel 31 leftward until the right grip portion (incorporating therein the right tactile device 53) is located at around its +270° position, the right tactile device 53 changes its operation mode in such a manner that only those actuators 122 lying in the row X1 to X5 are activated successively row-by-row in the converse order, i.e., in the order from X5 to X1. By thus changing the operation mode, the tactile device 53 is able to produce a wave motion of the skin layer 124 traveling in the same direction (i.e., left-to-right direction) as the wave motion produced when the steering wheel 31 is steered leftward through an angle of 90 degrees to place the right grip portion (right tactile device 53) to the position shown in FIGS. 16A to 16E. The term "at around its +270° position" is used herein to refer to an angular range that the right grip portion (right tactile device 53) may define when moving from +255° position to +285° position.

In the embodiment described above, the motion formed by the flexible skin layer 124 when the tactile device 53 is operating is a wave motion. The wave motion may also be referred to as a vibratory motion or oscillation. The amplitude of the wave motion is fixed and not variable with the lateral acceleration. The amplitude of the wave motion may be set to be variable with the lateral acceleration in which instance the driver is allowed to get information about the magnitude of lateral acceleration from the amplitude of the wave motion.

As described above with reference to FIG. 1, the vehicle state information transmission apparatus 11 (also serving as a warning apparatus) comprises the driver identification device 52. The driver is therefore allowed to set in advance the controlled variables or parameters such as the type, and intensity of the tactile pattern according to its desire or comfort. The preset data can be readily resumed when the driver accesses the vehicle state information transmission apparatus 11 through the driver identification device 52.

Figure 18A:
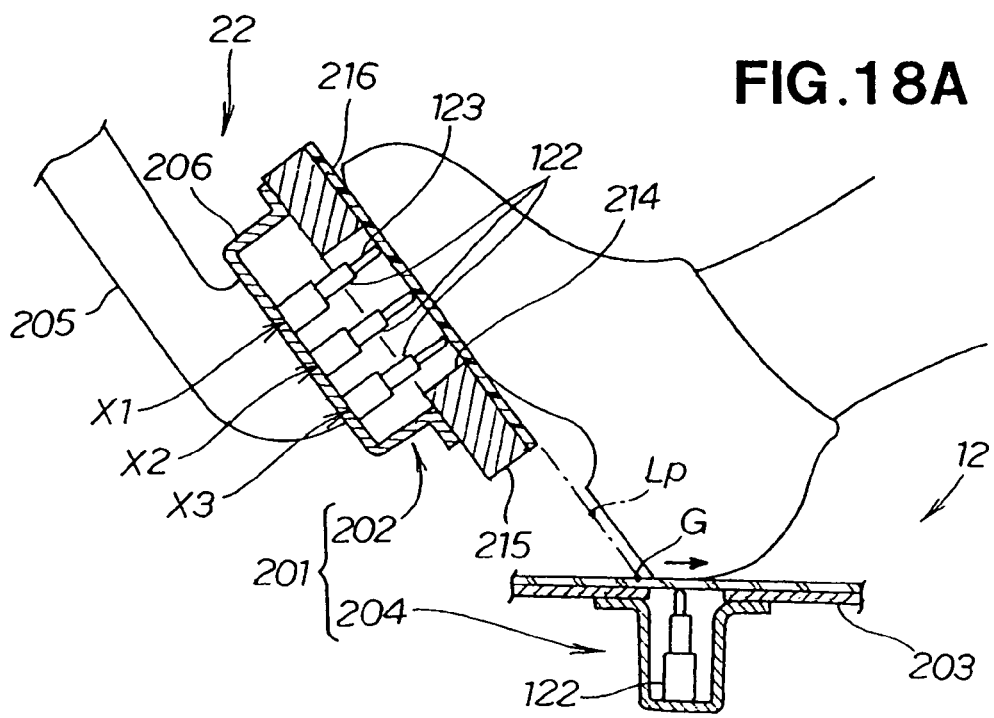
FIG. 18A is a vertical cross-sectional view of a tactile device according another embodiment of the invention, including a first tactile unit assembled with an accelerator pedal and a second tactile unit assembled with a vehicle floor at a position appropriate for engagement with the heel of a driver's foot.
Figure 18B:
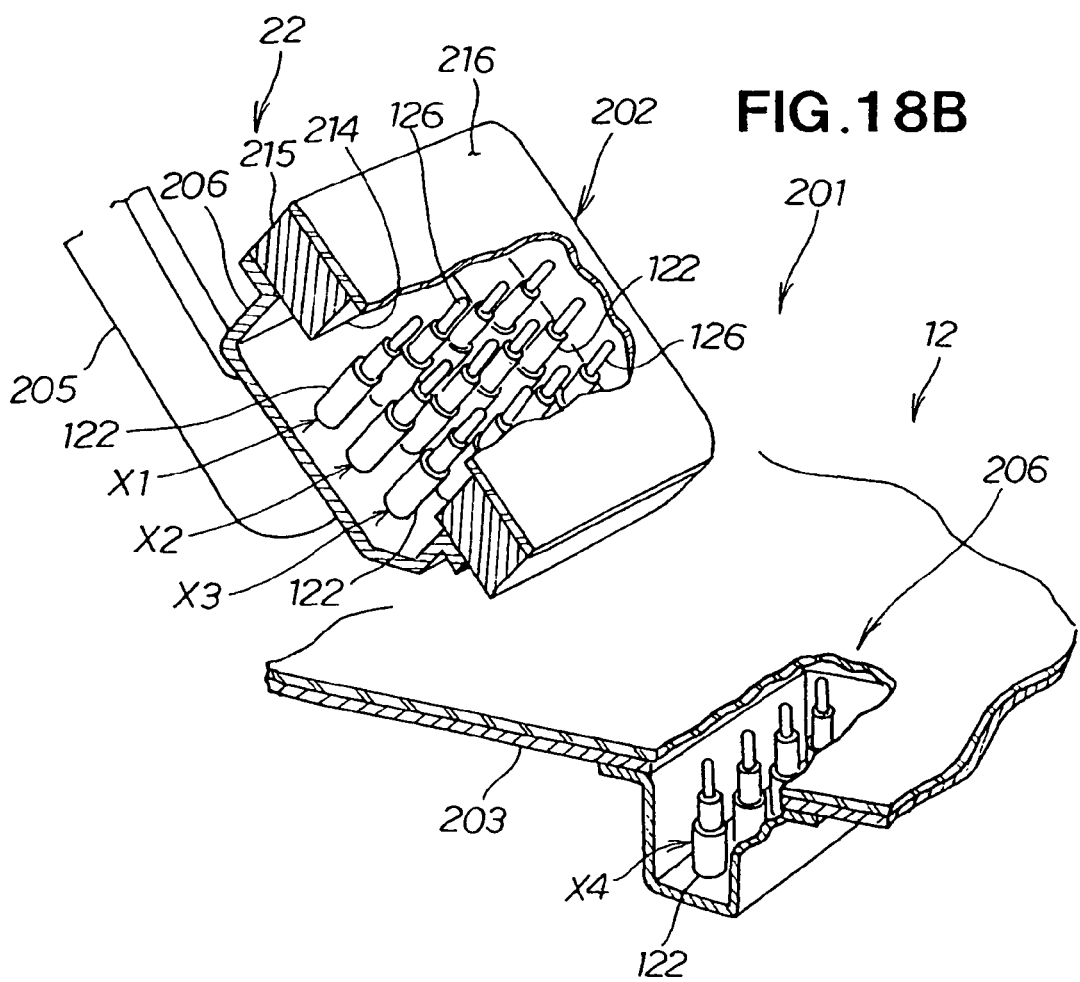
FIG. 18B is a perspective view with parts cut away for clarity of the tactile device shown in FIG. 18A.

FIGS. 18A and 18B show a second form of application of the tactile device according to the present invention, wherein the tactile device is assembled with or incorporated in the accelerator pedal. As shown in these figures, the tactile device 201 is comprised of a first tactile device or unit 202 built in the accelerator pedal 22 and a second tactile device or unit 204 installed in a vehicle floor 203. The accelerator pedal 22 forms an operation means of the vehicle 12 because it is actuatable by the driver to operate or maneuver the vehicle 12.

The first tactile unit (pedal tactile device) 202 includes a matrix or rectangular array of linear reciprocating actuators 122 having four columns and three rows X1, X2, X3. The actuators 122 are structurally and functionally the same as those used in the foregoing embodiment and further description thereof can be omitted. The actuators 122 are illustrated with surface pressure adjustment caps removed for clarity. The actuator array is installed in a box 206 attached to the free end of an arm member 205 of the accelerator pedal 22 with an open end facing upward. A foot plate 215 is attached to close the open end of the box 206 and has an aperture 214 elongated in a width direction of the vehicle 12. The elongated aperture 214 is closed by a flexible cover or skin layer 216 attached to an upper surface of the footplate 215.

The second tactile unit (floor tactile unit) 206 is disposed at a position appropriate for engagement with the driver's heel, as shown in FIG. 18A. The floor tactile device 206 includes a single row or array of actuators 122 aligned in the width direction of the vehicle 12. More specifically, as shown in FIG. 18A, the actuator array 122 is disposed at a position which is slightly offset backward (rightward in this figure) from a junction G between the floor surface and an imaginary line LP extending on and along the front surface of the foot plate 215 when the accelerator pedal 22 is in its free or unloaded position. The actuator array 122 of the floor tactile device 206 and the actuator rows X1-X3 of the actuator matrix of the pedal tactile unit 202 extend parallel with each other.

Operation of the second tactile device 201 will be described with reference to FIGS. 19A to 19D, which show in combination a schematic vertical cross-sectional view and a plan view of the tactile unit 201 for easy reference.

The second tactile device 201 is arranged such that when the driver depresses the accelerator pedal 22 to accelerate the vehicle the vehicle 12, the second tactile device 201 will generates a wave motion traveling in a backward direction of the vehicle, which is transmitted to the bottom of the driver's foot F to thereby enable the driver to acknowledge the vehicle being in an accelerating state or condition. The wave motion has constant amplitude and a variable frequency Fv, which vary in direct proportion to the vehicle speed.

Figure 19A:
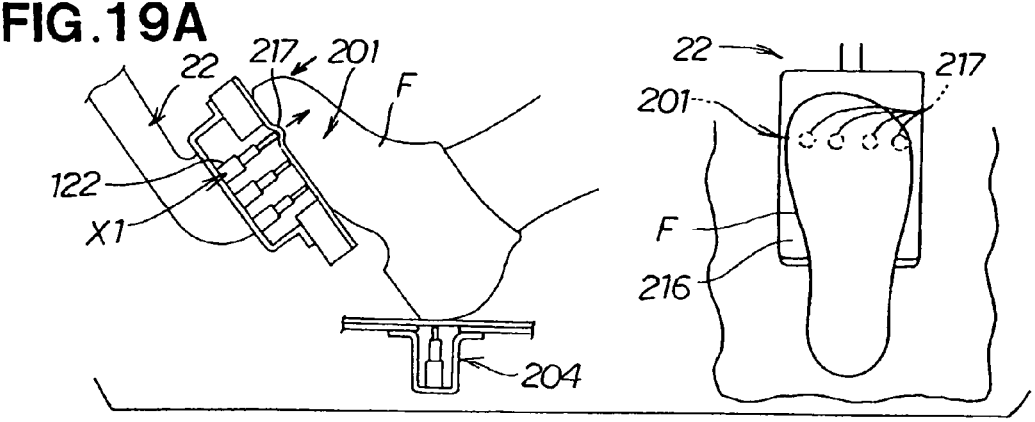
FIGS. 19A to 19D are diagrammatical views showing the operation performed by the tactile device of FIG. 18A to transmit tactile information via the accelerator pedal and the vehicle floor to the driver when the accelerator pedal is depressed to accelerate the vehicle.
Figure 19B:
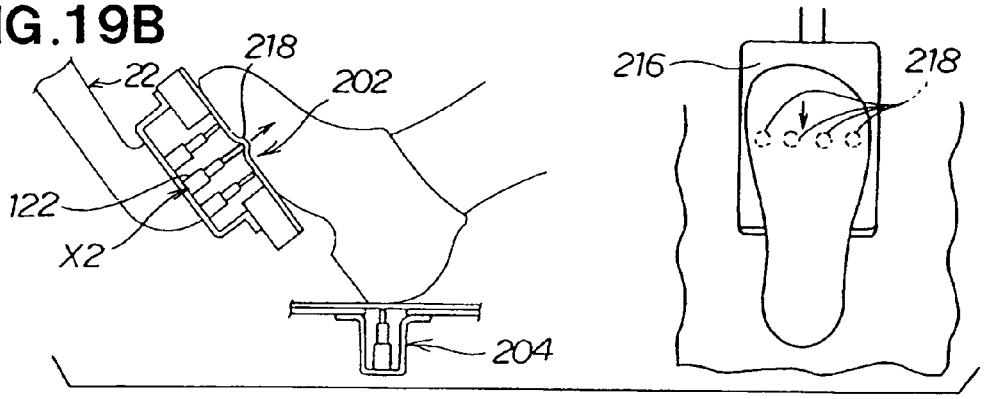
Figure 19C:
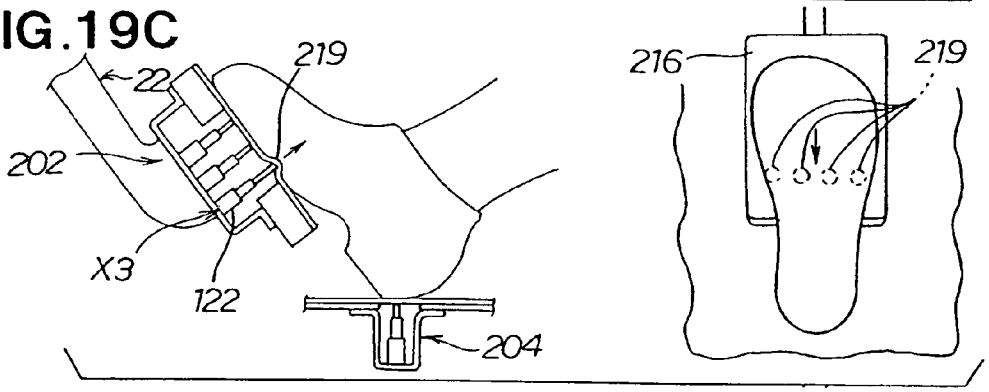
Figure 19D:
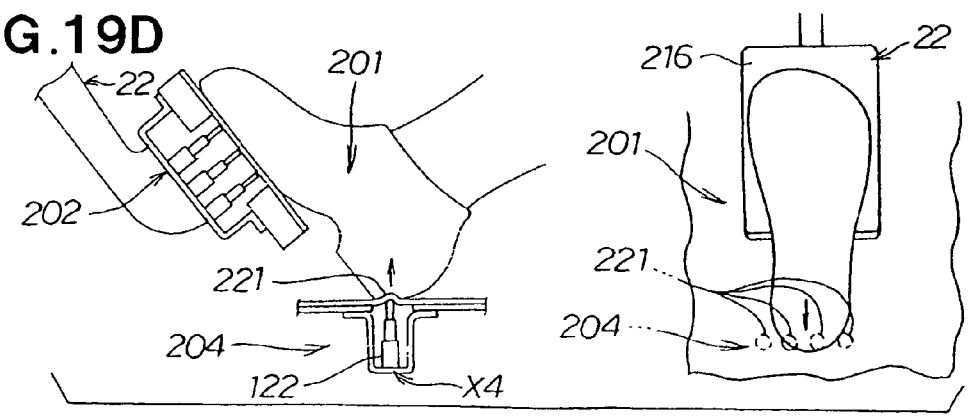

More specifically, with the shift lever placed in a forward position (first gear position or drive range position), the accelerator pedal 22 is depressed with the driver's foot F whereupon based on information pertaining to the vehicle speed and vehicle travel direction, the pedal tactile device 202 activates the actuators 122 in the front row X1 to thereby produce a series of transversely aligned projections 217 on a front surface of the flexible skin layer 216, as shown in FIG. 19A. Immediately after formation of the projections 217, the front row actuators 122 (X1) are deactivated and, at the same time, the second row actuators 122 (X2) are activated to thereby produce a row of projections 218 on the front surface of the skin layer 216, as shown in FIG. 19B. Soon after formation of the projections 218, the second row actuators 122 (X2) are deactivated and, at the same time, the third row actuators 122 (X3) are activated to thereby form a row of projections 219 on the front surface of the skin layer 216, as shown in FIG. 19C. Immediately after formation of the projections 219, the third row actuators 122 (X3) are deactivated and, in synchronism therewith, the actuators 122 of the floor tactile device 204 are activated to thereby form a row of projections 221 on a surface of a floor mat or surface sheet member (not designated), as shown in FIG. 19D. Immediately after formation of the projections 221, the floor actuators 122 are deactivated and, at the same time, the front row actuators 122 (X1) of the pedal tactile device 202 are activated.

The foregoing sequence of operation is performed repeatedly, so that the flexible skin layer 216 on the accelerator foot plate 215 generates a wave motion traveling backward (toe-to-heel direction) at a frequency, which varies in direct proportional to the vehicle speed. The wave motion can be perceived by the driver as a sensation of something rubbing the foot bottom in the toe-to-heel direction. In this instance, since the frequency of the wave motion gradually increases with the vehicle speed, the driver is able to feel the acceleration of the vehicle 12.

Thereafter, when the driver starts releasing the depression on the acceleration pedal 22 to thereby slowdown the vehicle 12, the second tactile device 201 will generates a wave motion traveling forward (heel-to-toe direction), which is transmitted to the bottom of the driver's foot F to thereby enable the driver to acknowledge the vehicle being in deceleration state or condition. In this instance, since the frequency of the wave motion decrease with the vehicle speed, the driver can feel the deceleration of the vehicle.

Figure 20A:
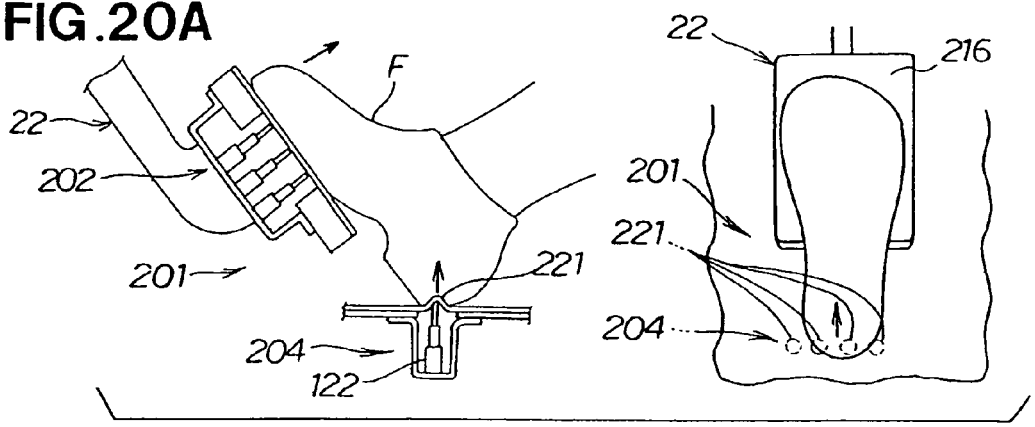
FIGS. 20A to 20D are diagrammatical view illustrative of the operation performed by the tactile device of FIG. 18A to transmit tactile information via the accelerator pedal and the vehicle floor to the driver when the pressure on the accelerator pedal is released to slow down the vehicle.
Figure 20B:
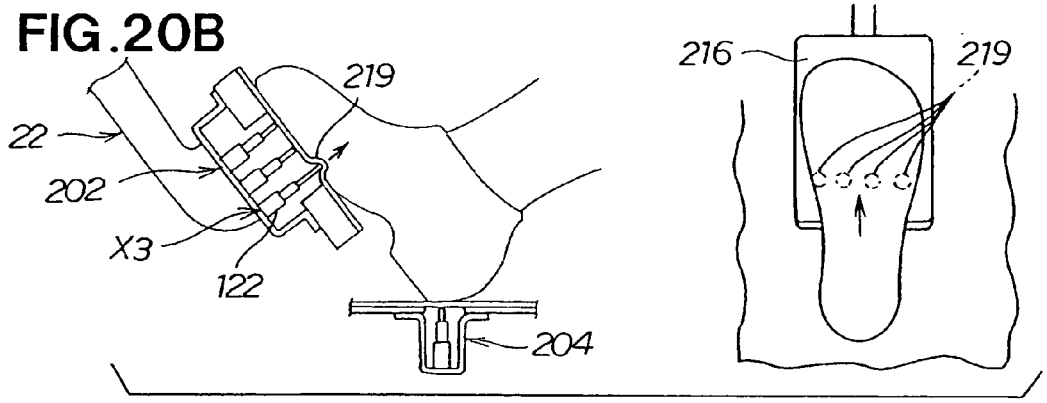
Figure 20C:
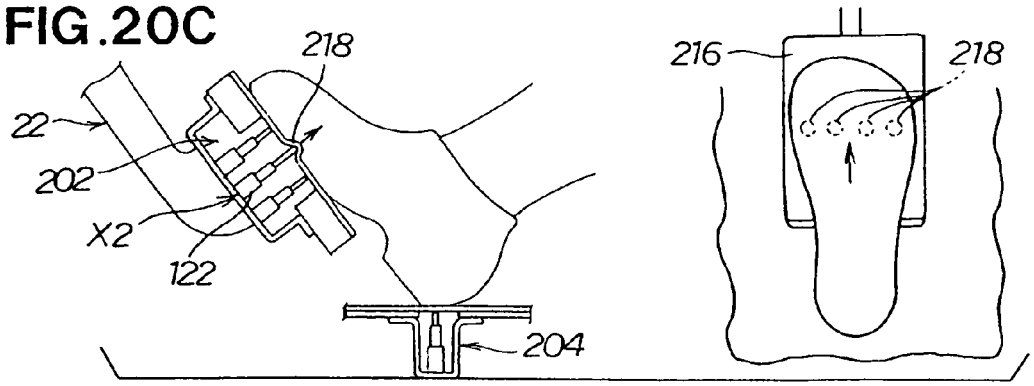
Figure 20D:
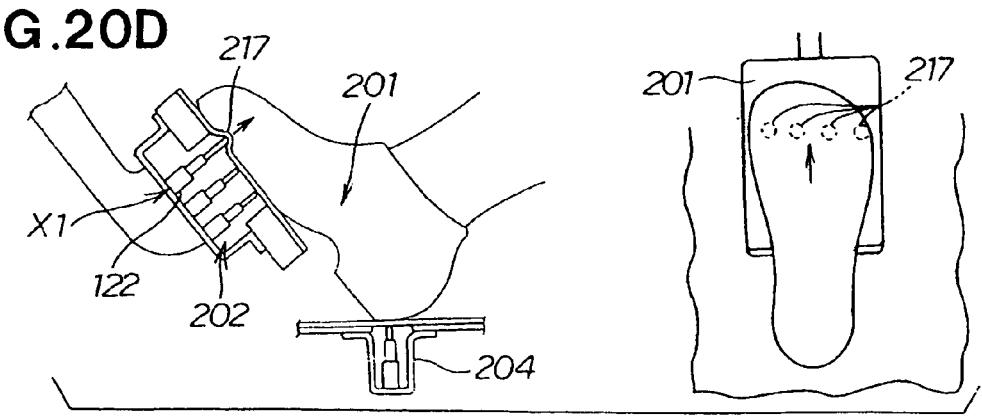

More specifically, as shown in FIG. 20A, when the driver starts releasing the depression on the acceleration pedal, the second tactile device 201, on the basis of vehicle speed information, first activates the actuators 122 of the floor tactile device 204 to thereby produce a row of projections 221 on the front surface of the floor mat or surface sheet member. Immediately after formation of the projections 221, the actuators 122 of the floor tactile device 204 are deactivated and, at the same time, the third row actuators 122 (X3) of the pedal tactile device 202 are activated to thereby produce a row of projections 219 on the front surface of the skin layer 216 of the accelerator foot plate 215 (FIG. 18A), as shown in FIG. 20B. Immediately after formation of the projections 219, the third row actuators 122 (X3) are deactivated and, at the same time, the second row actuators 122 (X2) are activated to thereby produce a row of projections 218 on the front surface of the skin layer 216, as shown in FIG. 20C. Soon after formation of the projections 218, the second row actuators 122 (X2) are deactivated and, at the same time, the front row actuators 122 (X1) are activated to thereby form a row of projections 217 on the front surface of the skin layer 216, as shown in FIG. 20D. Immediately after formation of the projections 217, the front row actuators 122 (X1) are deactivated and, in synchronism therewith, the actuators 122 of the floor tactile device 204 are activated to thereby form a row of projections 221 on the surface of the floor mat or surface sheet member, as shown in FIG. 20A.

The foregoing sequence of operation is performed repeatedly, so that the flexible skin layer 216 on the accelerator foot plate 215 generates a wave motion traveling forward (heel-to-toe direction) at a frequency, which varies in direct proportional to the vehicle speed. The wave motion can be perceived by the driver as a sensation of something rubbing the foot bottom in the heel-to-toe direction. In this instance, since the frequency of the wave motion gradually decreases with the vehicle speed, the driver is able to feel the deceleration of the vehicle 12.

By thus forming the wave motions of different travel directions depending on the acceleration/deceleration of the vehicle, the vehicle accelerating/decelerating conditions can be clearly discriminated by the driver. It is possible according to the present invention to arrange the second tactile device 201 such that a wave motion traveling in the heel-to-toe direction is produced during reverse (backward) traveling of the vehicle. In such instance, mode selection is made between the deceleration mode and the reverse travel mode by using the tactile pattern input section 45 (FIG. 1).

As described above, the second tactile device 201 is well adaptable to a change in the vehicle traveling direction. It is possible according to the invention to operate the first-mentioned tactile device 42 (composed of the left and right tactile devices 51 and 53 assembled in the steering wheel 31) in the same manner as the second tactile device 201, in which instance the steering tactile device 42 still operates to change the travel direction of the wave motion at the occurrence of steering operations with predetermined steering angles. Selection of operation mode of the first tactile device 42 between the steering mode and the travel direction mode can be made by using the tactile pattern input section 45 (FIG. 1).

Figure 21:
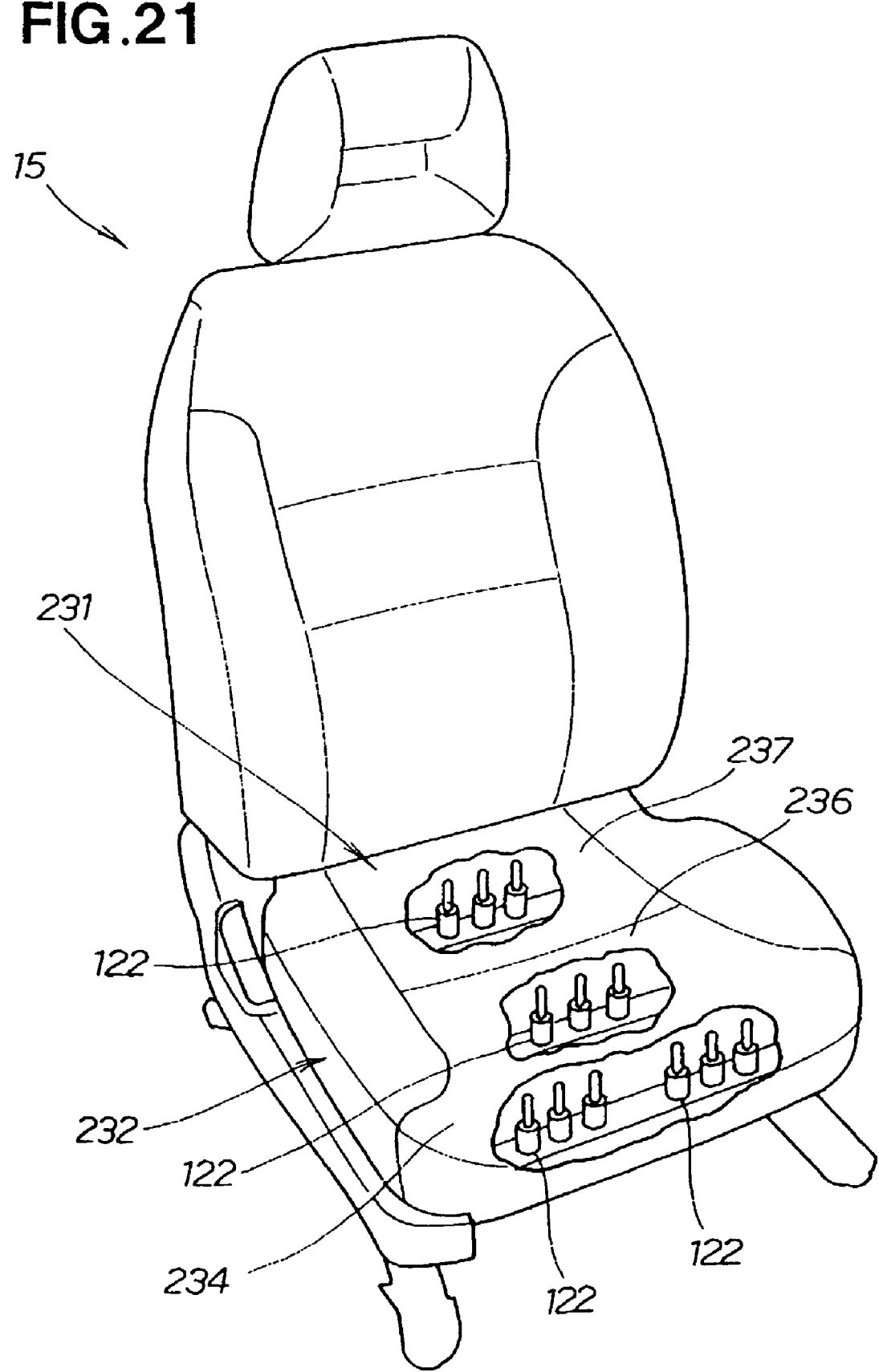
FIG. 21 is a perspective view with parts cut away for clarity of a driver's seat in which a tactile device according to still another embodiment of the invention is incorporated.

FIG. 21 shows still another form of application of the tactile device according to the present invention, which employs the driver's seat 15. As shown in this figure, a third tactile device 231 comprised of three rows of linear reciprocation actuators 122 is incorporated in a seat cushion 232 of the driver seat 15 with the actuator rows lying in the width direction of the vehicle. The front-row actuators 122 are disposed adjacent a front edge 234 of the seat cushion 232, central-row actuators 122 are disposed in a central portion 236 of the seat cushion 232, and the rear-row actuator 122 are disposed adjacent a rear edge 237 of the seat cushion 232.

As shown in FIGS. 22A to 22B and FIGS. 23A to 23C, the third tactile device (seat cushion tactile device) 231 is operationally connected to the second tactile device 201 composed of the pedal tactile device 202 and the floor tactile device 204 in a such manner while the vehicle is in the accelerating mode, the wave motion, which is transmitted to the driver's foot, further travels backward through the leg to the hip of the driver.

Figure 22A:
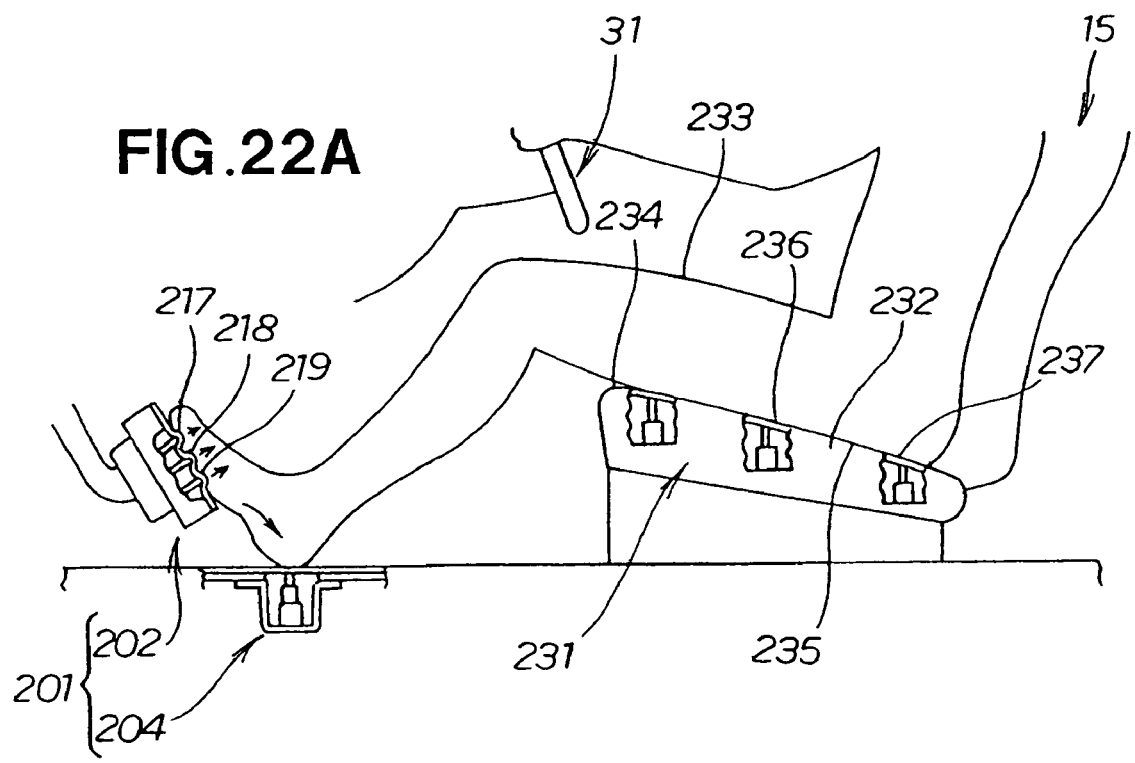
FIGS. 22A and 22B are diagrammatical views showing an operational relationship established between the tactile sensor assembled with the accelerator pedal and the vehicle floor and the tactile device incorporated in a seat cushion of the driver's seat when the accelerator pedal is depressed.
Figure 22B:
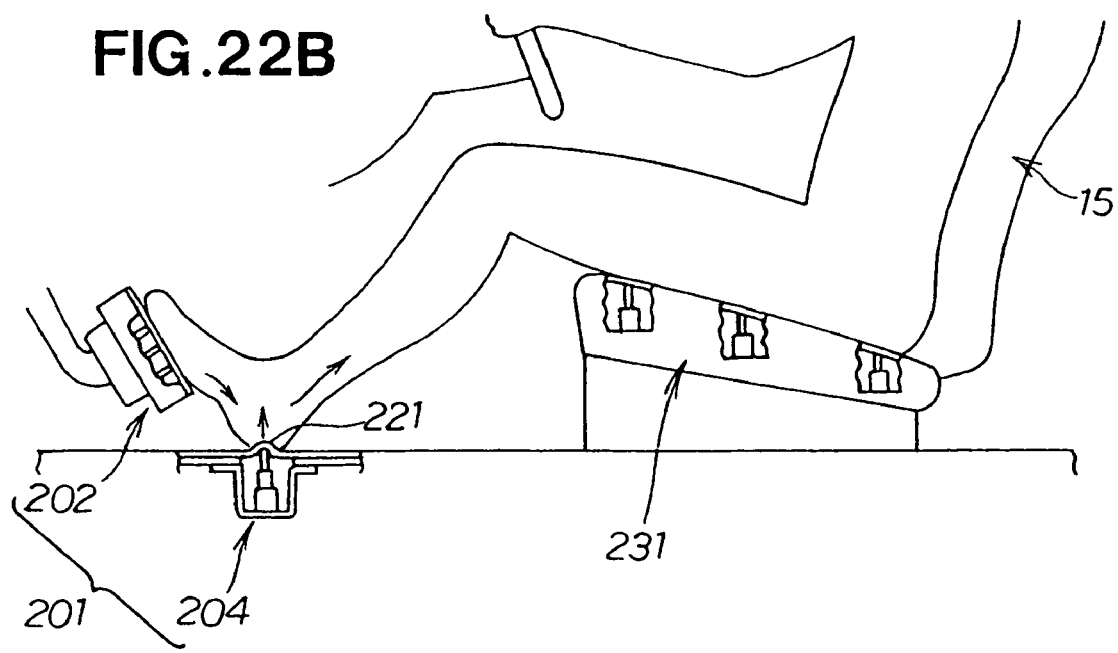

More specifically, as shown in FIG. 22A, a wave motion produced by the pedal tactile device 202 on the skin layer 216 of the accelerator pedal 22 (FIG. 18A) advances on and along the driver's foot bottom in the toe-to-heel direction, and in timed relation to the activation/deactivation of the actuators 122 of the floor tactile device 204, the third tactile device (seat cushion tactile device) 231 operates to activate the front, central and rear rows of actuators 122 in sequence so that a wave motion traveling backward at the same frequency as the wave motion running through the foot bottom is produced on a front surface of the seat cushion 232.

As shown in FIG. 23A, in timed relation to the deactivation of the actuators 122 of the floor tactile device 204, the front-row actuators 122 of the seat cushion tactile device 231 are activated to thereby produce a row of projections 241 on a surface layer 238 of the seat cushion 232. The projections 241 thus produced can be perceived by the driver as a sensation of something tapping on the back of the thigh 233 subsequent to rubbing as done at the foot bottom. The wave motion can thus be transmitted from the heel to the thing 233 of the driver.

Immediately after formation of the projections 241, the front-row actuators 122 of the seat cushion tactile device 231 are deactivated, and in synchronism with this deactivation, the central-row actuators 122 are activated to thereby form a row of projections 245 on the front layer 238 of the seat cushion 232, as shown in FIG. 23B. The projections 245 thus produced give rise to a sensation of the driver as being tapped by something at its hip 235.

Immediately after formation of the projections 245, the central-row actuators 122 are deactivated, and in synchronism with this deactivation, the rear-row actuators 122 are activated to thereby form a row of projections 247 on the front layer 238 of the seat cushion 232, as shown in FIG. 23C. The projections 247 thus produced can be perceived by the driver as a sensation of something tapping on the hip 235 at a portion offset backward from the portion tapped at the preceding cycle.

Immediately after formation of the projections 247, the rear-row actuators 122 are deactivated and, at the same time, the front-row actuators 122 are activated to thereby produce a row of projections 241 on the surface layer 238 of the seat cushion 232. The foregoing sequence of operations is repeated so that a wave motion traveling backward is produced on the surface layer 238 of the seat cushion 232. The wave motion thus produced can be perceived by the driver as a sensation of something rubbing the back of the thigh 233 and the bottom of the hip 235 in sequence in a knee-to-hip direction. The wave motion has constant amplitude and a variable frequency, which varies in direct proportion to the vehicle speed. Since the wave motion on the seat cushion surface layer 238 occurs in synchronism with the wave motion transmitted from the second tactile device 201 to the driver's foot, the driver is allowed to feel the acceleration of the vehicle with at a lower body thereof. This will ensure clear and reliable transmission of vehicle state information to the driver. Additionally, since the wave motion has a vehicle speed dependent variable frequency, the driver is able to feel various speed-dependent vehicle behaviors with high fidelity.

In the illustrated embodiment shown in FIGS. 21 to 23C, the seat cushion tactile device 231 is constructed to generate a wave motion traveling backward (in the knee-to-hip direction) as a information transmission medium. It is possible according to the invention to arrange the seat cushion tactile in such a manner as to generate a wave motion traveling forward (in the hip-to-knee direction). Furthermore, it is also possible according to the present invention to modify the seat cushion tactile device 231 in such a manner as to operate only when the vehicle 12 is traveling along a corner or a slip occurs between the vehicle wheels and the road surface.

Figure 24A:
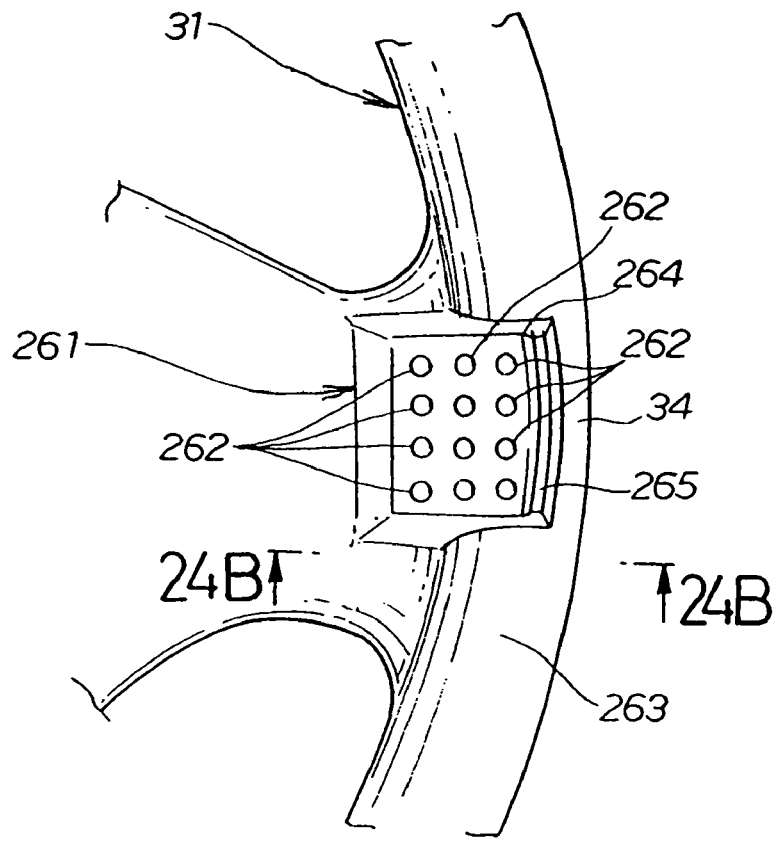
FIG. 24A is a fragmentary plan view of a part of the steering wheel in which a tactile device according to another embodiment of the invention is assembled.
Figure 24B:
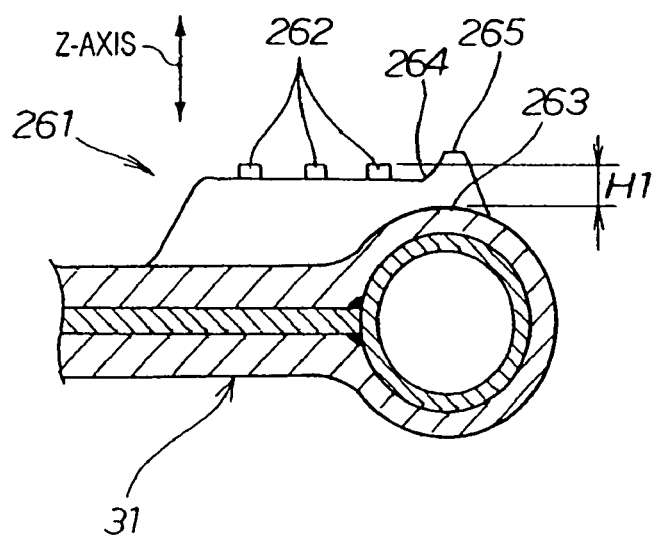
FIG. 24B is a cross-sectional view taken along the line 24B-24B of FIG. 24A.

FIGS. 24A and 24B show a tactile device 261 according to another embodiment of the present invention. The tactile device 261 differs from the tactile device 42 of the first embodiment shown in FIGS. 1 and 5 in that actuator rods 262 of linear reciprocating actuators project from an outer surface 263 (upper surface in the illustrated embodiment) of the steering wheel 31 by a distance H1, and a guard protrusion 263 is disposed on the grip portion of the steering wheel 31 so as to extend in a circumferential direction of the steering wheel 31 along an outer edge 264 of the tactile device 261.

Figure 25A:
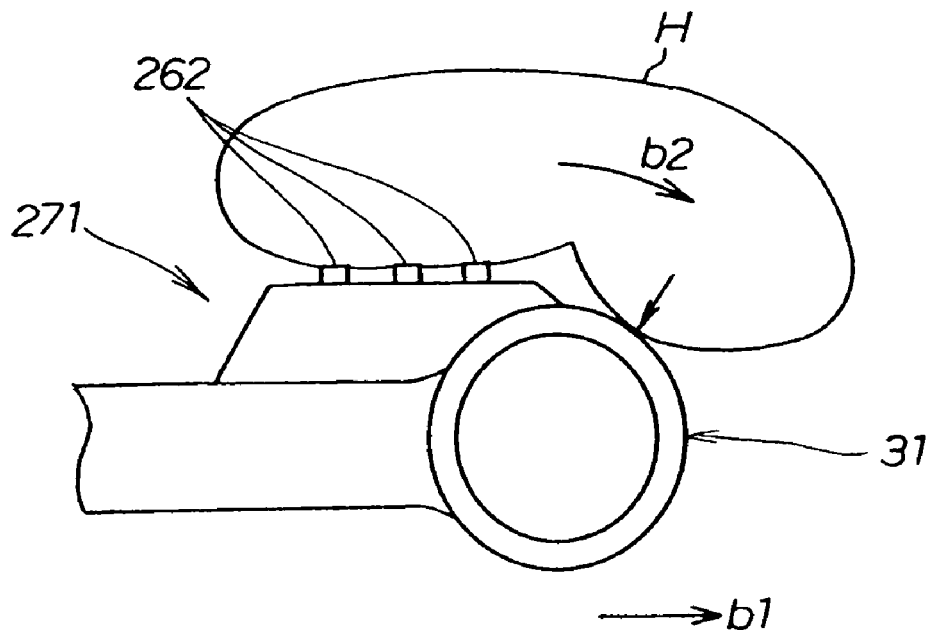
FIG. 25A is a view diagrammatically illustrating a tactile device for comparative purposes with the tactile device shown in FIGS. 24A and 24B.
Figure 25B:
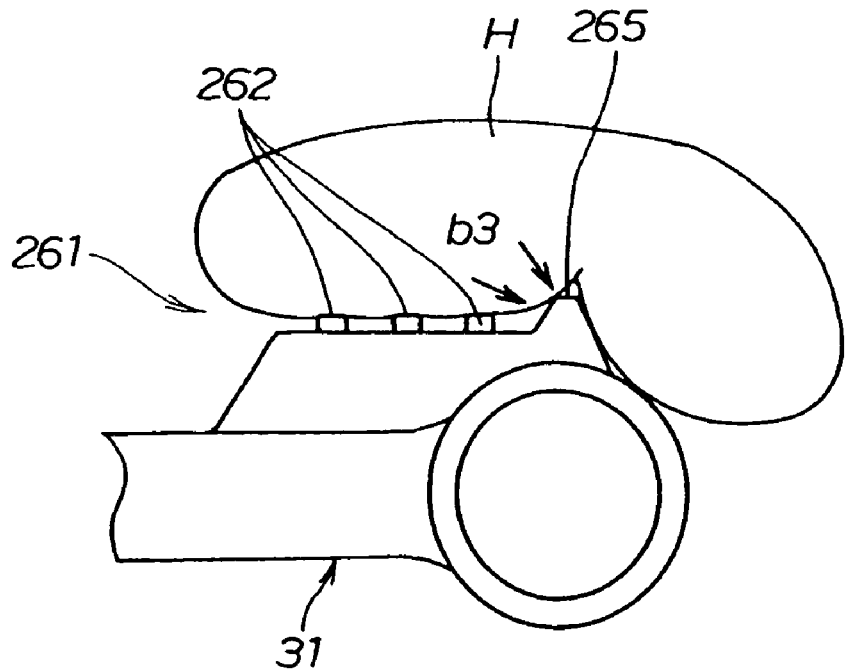
FIG. 25B is a view similar to FIG. 25A but showing the tactile device according to the embodiment shown in FIG. 24A.

The guard protrusion 265 offers a particular advantageous effect, which will become apparent from the following description given below with reference to FIGS. 25A and 25B. For comparative purposes, FIG. 25A dia-grammatically illustrates a steering wheel right grip portion incorporating therein a tactile device 272 of the structure identical to that of the tactile device 261. However, the steering wheel 31 has no such protrusion as comparable to the guard protrusion 265 shown in FIGS. 24A and 24B. FIG. 25B is a dia-grammatical view of the steering wheel right grip portion shown in FIG. 24B.

In case of the tactile device 271 of the comparative example, due to the absence of a projection compatible to the guard protrusion 265, tip end portions of the actuator rods 262 are likely to be pulled in a radial outward direction of the steering wheel, as indicated by the arrow b2, while the steering wheel is turned left or right. Thus, the tactile device 271 of the comparative example is therefore liable to be damaged at the actuator rods 262 and has a relatively short service like.

By contrast, in case of the tactile device 261 of the illustrated embodiment, the guard protrusion 265 is engageable with the driver's hand H (as indicated by the arrows b3 shown in FIG. 25B) to prevent the tactile device 261 from being subjected to undue force or stress tending to pull the actuator rods 262 in a radial outward direction during steering operation. The tactile device 261 is therefore durable and has a relatively long service lift.

Figure 26:
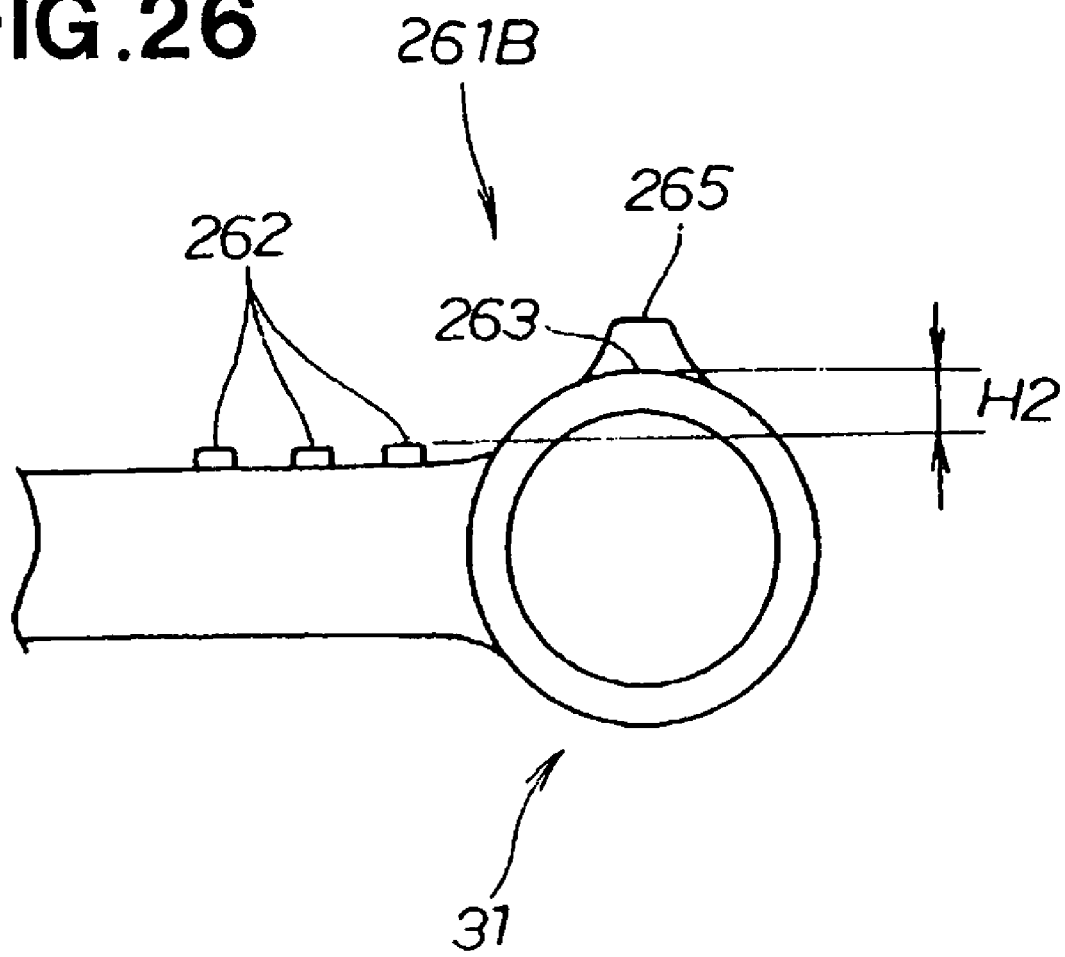
FIG. 26 is a diagrammatical view of a tactile device according to a modification of the present invention.

FIG. 26 diagrammatically shows a tactile device 261B according to a modification of the present invention. The modified tactile device 261B differs from the tactile device 261 shown in FIGS. 24A and 24B in that tip ends of the respective actuator rods 262 lie in a lower level than an upper surface 263 of the steering wheel 31 by a distance H2. The steering wheel 31 has a guard protrusion 265 corresponding in construction and function to the guard protrusion 265 discussed above with reference to FIG. 25B. With this arrangement, the guard protrusion 265 engages the driver's hand during steering operation and protects the actuator rods 262 from being subjected to undue force or stress tending to pull the actuator rod tip ends in a radial outward direction. Like the tactile device 261 shown in FIG. 24A, the tactile device 26 of FIG. 26 is durable and has a relatively long service like.

Figures 27A, 27B:
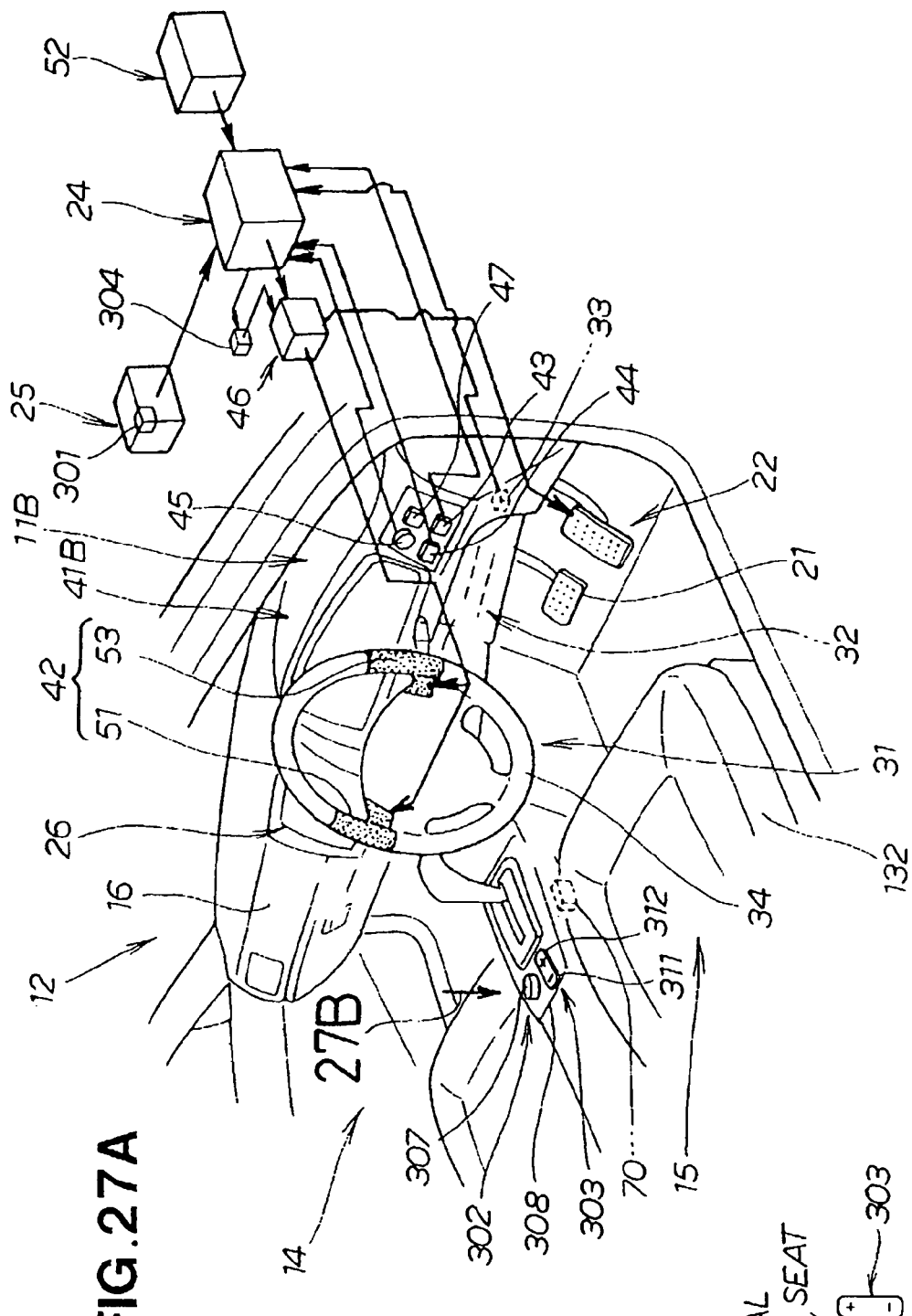
FIG. 27A is a perspective view showing the general configuration of a vehicle state information transmission apparatus according to another preferred embodiment of the present invention.
FIG. 27B is a view in a direction of the arrow 27B shown in FIG. 27A.

FIG. 27A shows in perspective the general configuration of a vehicle state information transmission apparatus 11B according to another preferred embodiment of the present invention. In this figure, these parts like or corresponding to those shown in FIG. 1 are designated by the same reference characters and no further description thereof is needed.

The vehicle state information transmission apparatus 11B of this embodiment will be differentiated from the apparatus of FIG. 1 in that the vehicle state information transmitting means or device 41B further comprises a parked vehicle detection means or sensor 301 forming part of the vehicle state detection device 25 for detecting a vehicle while being in a parked state, an adjustment permission means 302 (also referred as an adjustment permission unit) for permitting an operation amount adjustment of the tactile device 42 to start, an adjustment amount input means 303 (also referred as an adjustment amount input unit) for inputting an adjustment amount to thereby increase or decrease the operation amount of the tactile device 42, and a simulation means 304 (also referred as a simulation unit) for, on the basis of information pertaining to the parked vehicle detected by the parked vehicle sensor 301, information pertaining to the permission provided by the adjustment permission means 302, and information pertaining to the increase/decrease achieved by the adjustment amount input means 303, outputting information to activate the tactile device 42 in the same manner as it does during traveling of the vehicle, while the vehicle 12 is in a parked state.

In this embodiment, the term "adjustment amount" is used herein to refer to the frequency and amplitude of a tactile pattern (wave motion, for example) produced by the tactile device 42. The parked vehicle sensor 301 may take any form as long as it can detect the vehicle 12 while in the parked state.

Accordingly, the parked vehicle sensor 301 may be substituted by the travel direction sensor 70, the vehicle speed sensor 81 (FIG. 2), or the parking brake sensor 84 (FIG. 2) for the purpose of downsizing and cost cutting.

The adjustment permission means 302 is provided to allow the operator to make an adjustment for the adjustment amount with respect to any of the first tactile device (in-wheel tactile device) 42, the second tactile device 201 (pedal tactile device 202 and floor tactile device 204) and the third tactile device (seat cushion tactile device) 231. The adjustment permission means 302 is comprised of a rotary switch disposed, for example, in a center console 308 and has an adjustment dial 307, as shown in FIG. 27B, which is manually actuatable for selecting a desired tactile device. The rotary switch serves also as an ON/OFF switch.

The adjustment amount input means 303 is provided for imputing an adjustment amount (i.e., frequency and amplitude of a desired tactile pattern) to thereby adjust (increase or decrease) the operation amount of the selected tactile device. For this purpose, the adjustment amount input means 303 is disposed next to the adjustment permission means or switch 302 on the center console 308 and has a minus-side input section 311 and a plus-side input section 312. When the driver desires to increase the operation amount of the selected tactile device, the plus-side input section 312 is actuated or pressed down to thereby change the table map in a side to increase the gradient of the controlled variable. Alternatively, if the driver desires to decrease the tactile device operation amount, the minus-side input section 311 will be depressed to thereby change the table map in a side to decrease the gradient of the controlled variable. An adjustment to shift the table map while keeping the gradient constant or remain unchanged is also possible.

The simulation means 304 is configured to output a table map determined in accordance with the adjustment operation inputted from the adjustment amount input means 303 and preset vehicle travel conditions (changes in lateral acceleration and vehicle speed) while the vehicle is in the parked state.

Figure 28:
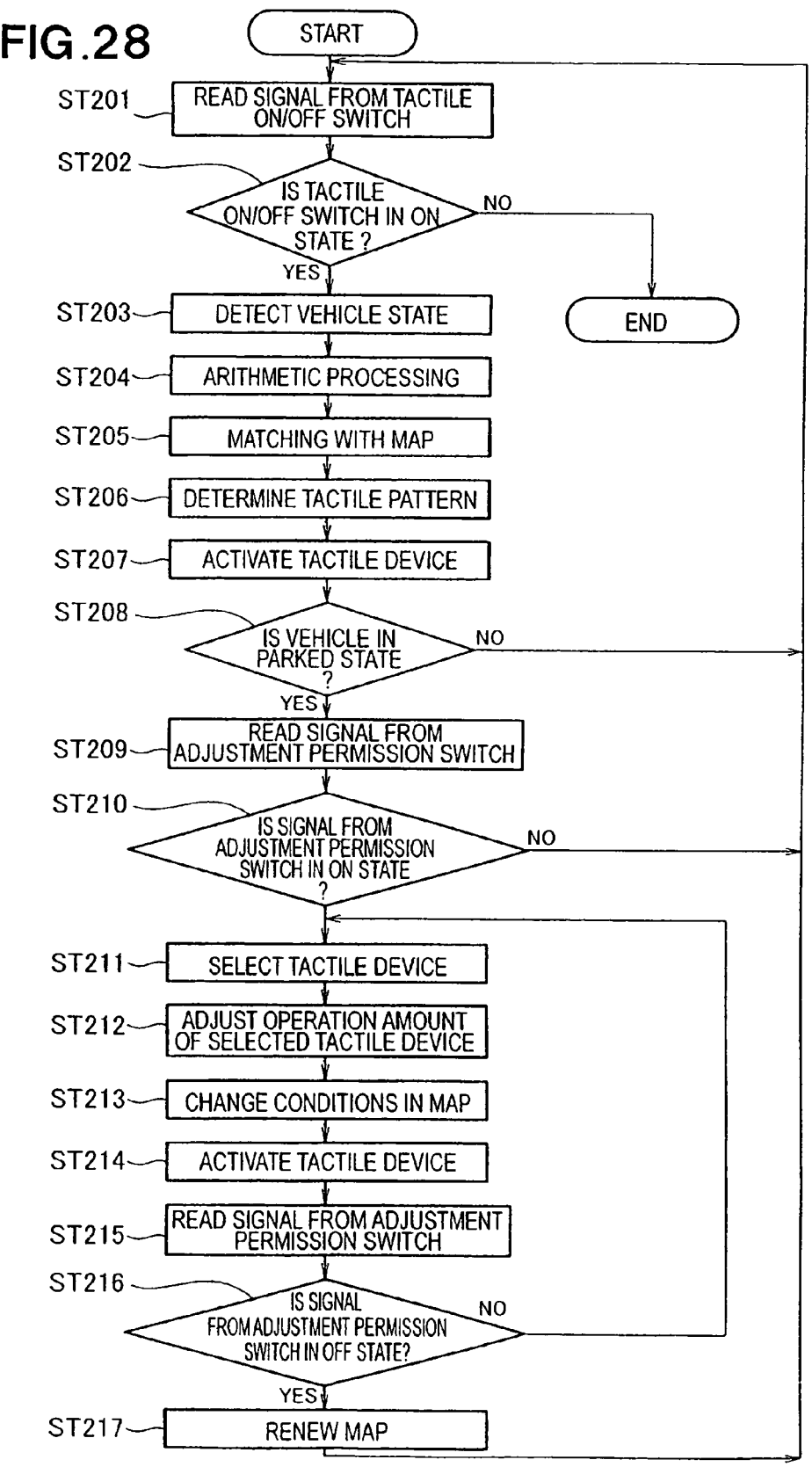
FIG. 28 is a flowchart showing a series of operations to be achieved by an electronic control unit (ECU) of the apparatus shown in FIG. 27A so as to alter conditions for a tactile vehicle state information transmitting operation and simulate the tactile vehicle state information transmitting operation based on the altered conditions while the vehicle is in a stopped or parked state.

Operation of the vehicle state information transmission apparatus 11B of the foregoing construction will be described below in detail with reference to a flowchart shown in FIG. 28. The operations performed in Steps ST201 to ST207 are the same as those performed in steps ST101 to ST107 shown in FIG. 13 discussed previously, and description will begins at step ST208.

Step ST208 determines whether the vehicle is in the parked state or not. If the determination shows the vehicle in the parked vehicle (YES), the control procedure advances to step ST209. Alternatively, if the determination shows the vehicle in the unparked or traveling state (NO), the control procedure returns to step ST201.

Step ST209 reads in a signal from the adjustment permission means or switch 302. In this instance, the signal may include information about a target tactile device to be adjusted is selected. Subsequently, step ST210 determines whether the signal from the adjustment permission switch 302 is indicative of the ON state or not. If the determination shows the signal representing the ON state (YES), the control procedure goes on to step ST211. Alternatively, if the OFF state of the adjustment permission switch signal is determined (NO), the control procedure returns to step ST201.

Step ST211 selects a target tactile device to be adjusted based on the signal from the adjustment permission switch 302. Subsequently, step ST212 adjusts an operation amount of the selected tactile device based on information inputted from the minus-side input section 311 or the plus-side input section 312 of the adjustment amount input means 303. If a change in operation pattern of the tactile device is desired (for example, if the direction of the wave motion described above with reference to FIGS. 15 to 17 should be changed), the tactile pattern input section 45 is manipulated as appropriate.

Subsequently, step S213 changes or alters the table map to the increase side or the decrease side based on the information received from the preceding step ST212. Then, step ST214 activates the tactile device to thereby allow the driver to feel the adjusted operation pattern (tactile pattern) of the target tactile device.

Subsequently in step ST215, a signal from the adjustment permission switch 302 is read in, and the next step ST216 determines whether the signal from the adjustment permission switch 302 is in the OFF state or not. If the determination shows the ON state (NO), the control procedure returns to step ST211. Alternatively, if the OFF state is determined for the adjustment permission switch signal (YES), the control procedure goes on to step ST217 where the table map is renewed or updated.

Operations performed in steps ST208 to ST217 will be described in further details on condition that a table map showing a correlation between the frequency of the tactile pattern (wave motion) and the lateral acceleration acting on the vehicle (such as shown in FIG. 14A) is prepared for the tactile device (in-wheel tactile device) 42 assembled in the steering wheel 31. In the determination performed in step ST208, a threshold value representing a vehicle speed 0 Km/h is used. If the determination shows the vehicle being in the parked state, the adjustment dial 307 of the adjustment permission switch 302 is turned to a desired position (STEERING WHEEL, PEDAL or SEAT), during which time the switch 302 is automatically turned on.

Then, the adjustment amount input means 303 is operated. By depressing the plus-side input section 312, for example, the frequency of the tactile pattern (wave motion) is increased. This means that the gradient of the frequency/lateral acceleration table map increase with the amount of actuation by the plus-side input section 312 of the adjustment amount input section 303.

With respect to the respective lateral acceleration values between a minimum and a maximum set in advance in the adjusted table map and the simulation means 304, information about the frequency of the tactile pattern is outputted in sequence. On the basis of the information thus outputted from the simulation means 304, the drive circuit or driver 45 drives the in-wheel tactile device 42 to operate, so that the driver is able to adjust the nature of a tactile sensation through an adjustment of the frequency of the tactile pattern (wave motion) from a minimum to a maximum in accordance with its own comfort.

The tactile pattern produced by the in-wheel tactile device 42 can be changed by operating the tactile pattern input section 45 in the same manner as done in step ST206. The FREQUENCY/LATERAL ACCELERATION table map may be replaced by the FREQUENCY/VEHICLE SPEED table map (such as shown in FIG. 14B).

After the adjustment by the driver is completed, the adjustment dial 307 of the adjustment permission switch 302 is turned to the OFF position whereupon a decision is inputted and, based on the decision information, the table map is renewed or updated. The adjustment operation is thus completed.

The adjustment described above is addressed to an adjustment operation performed to increase the frequency of the in-wheel tactile device 42 incorporated in the steering wheel 31. It is to be noted that other adjustment operations, which may be due, for example, for decreasing the frequency of the in-wheel tactile device 42 or for another tactile device such as the pedal tactile device 201, can be also performed in the same manner as described above. The adjustment permission switch 302 and the adjustment amount input means 303 provided on the center console 308 for the adjustment described above may be replaced by corresponding functions of the navigation device 26.

Figure 29A:
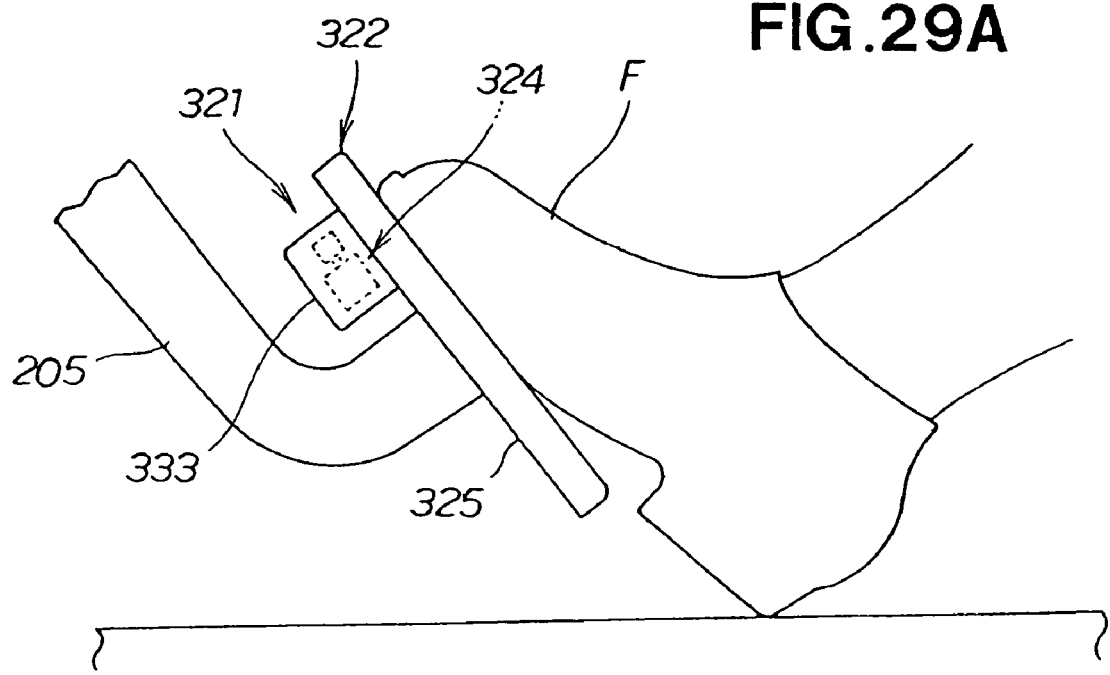
FIG. 29A is a side view showing a tactile device assembled with an accelerator pedal according to another embodiment of the present invention.
Figure 29B:
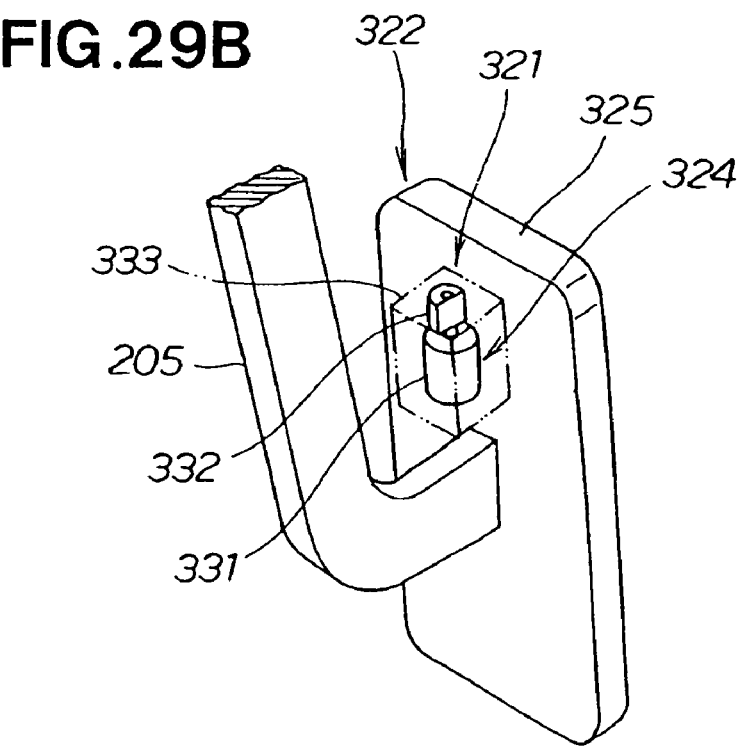
FIG. 29B is a perspective view of the accelerator pedal and the tactile device assembled therewith.
Figure 30:
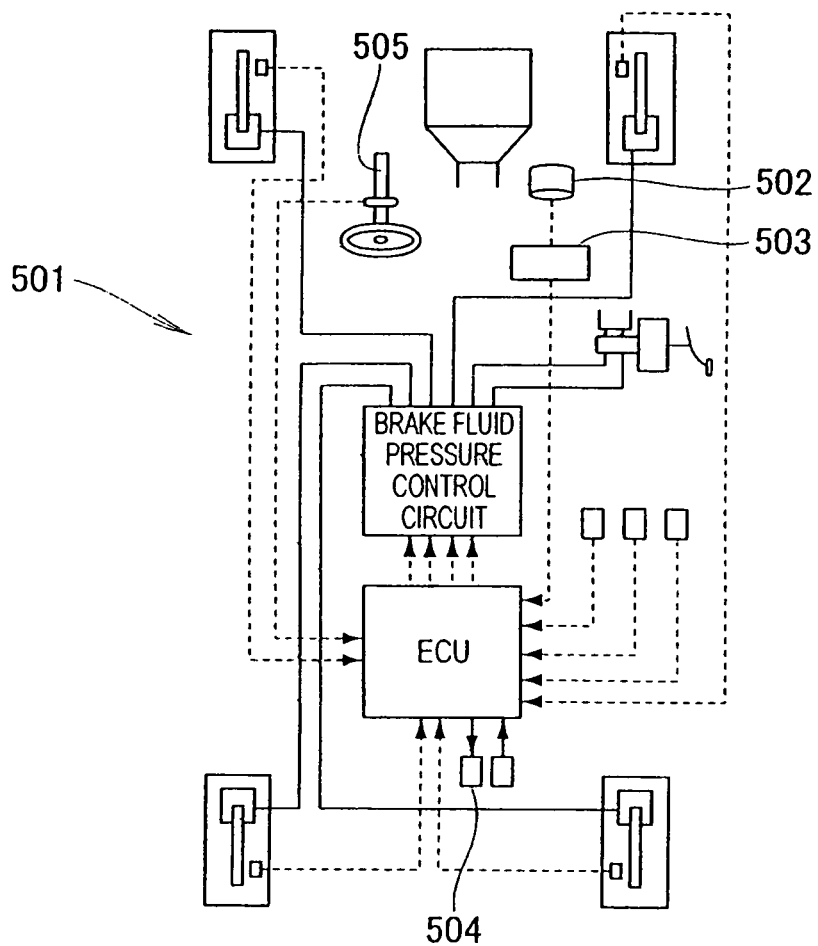
Figure 31:
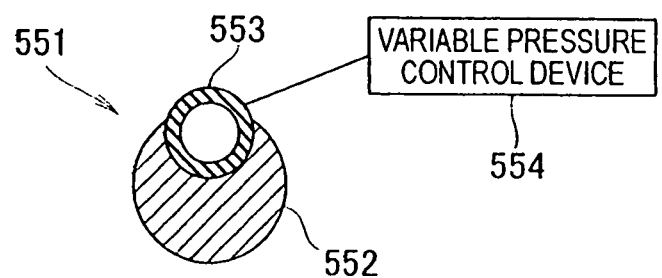
FIG. 31 is a cross-sectional view of a conventional vehicle steering wheel having a rubber tube fitted around a periphery of the steering wheel as a tactile device.
Figure 32A:
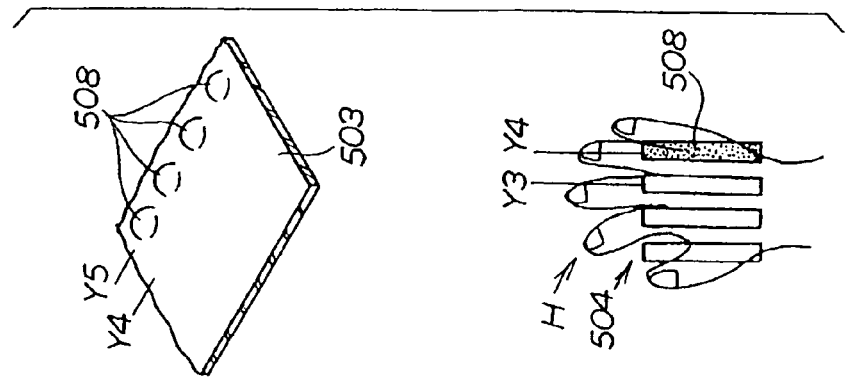
FIGS. 32A to 32D are views diagrammatically illustrating operation of a conventional tactile device incorporated in a vehicle steering wheel.
Figure 32B:
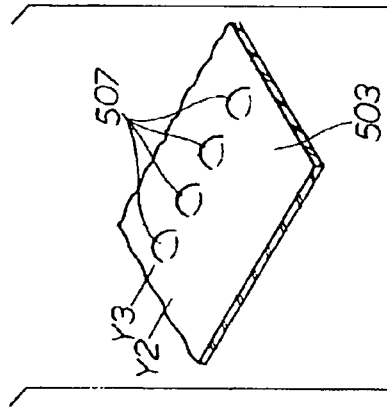
Figure 32C:
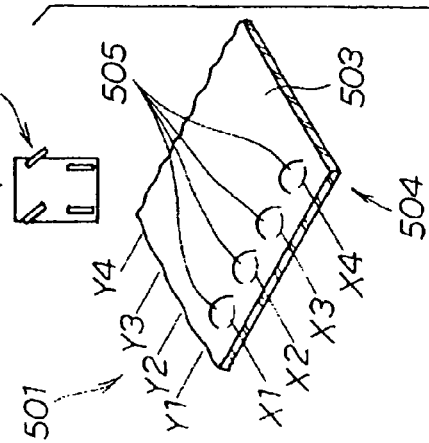
Figure 32D:
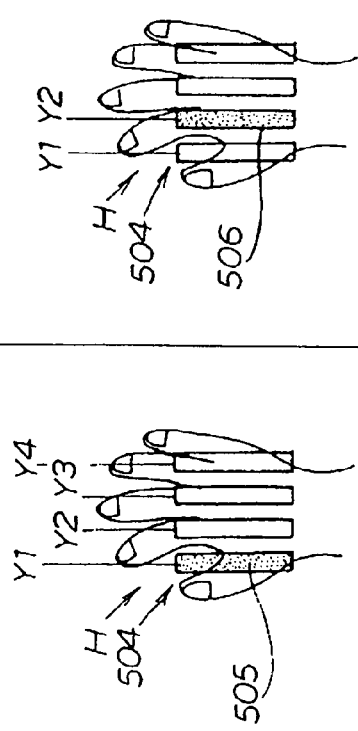

FIGS. 29A and 29B show a modified form of the pedal tactile device according to the present invention. The modified pedal tactile device 321 comprises a vibration generating mechanism 324 associated with an accelerator pedal 322. The accelerated pedal 322 is an existing accelerator pedal initially provided in the vehicle and includes a foot plate 325 attached to the free end of an arm 205. The vibration generating mechanism 324 is mounted on a backside of the foot plate 325. The vibration generating mechanism 324 may use any type of vibration source. In the illustrated embodiment, an electric motor 331 (FIG. 29B) equipped with an eccentric weight 332 (FIG. 29B) on its output shaft (not designated) is employed as a vibration source. The electric or motor-driven vibration generating mechanism 324 is mounted to the backside of the foot plate 325 and covered with a cover 333.

The pedal tactile device 321 comprised of the motor-driven vibration generating mechanism 324 operates such that when the driver depresses the foot-plate 325 of the accelerator pedal 322 to speed up the vehicle, the electric motor 331 is energized to rotate the eccentric weigh in unison with the output shaft. In this instance, due to the eccentricity of the eccentric weight 332 relative to the output shaft of the motor 331, the vibration generating mechanism 324 (forming the pedal tactile device 321) starts vibrating. The thus produced vibration is directly transmitted to the foot plate 325 and thence to the bottom of the driver's foot F.

The vibratory motion thus transmitted to the driver's foot F can be well perceived by the driver as a kind of tactile information indicative of an accelerated condition of the vehicle. It is preferable that the vibratory motion generated by the vibration generating mechanism 324 has a variable frequency, which varies in direct proportion to the vehicle speed or lateral acceleration. By thus linking the characteristic of the vibratory motion with the vehicle traveling conditions, transmission of tactile information can be performed with high fidelity. Furthermore, since the tactile device 321 vibrates the foot plate 325 itself, the driver is freed from an obligation to continuously depress the foot plate 325, which is due for the embodiment shown in FIGS. 18A and 18B where a wave motion (vibratory motion) occurs only at the skin layer 216 of the accelerator pedal 22 and not at the foot plate 215 on which the skin layer 216 is provided. This will lessen the labor of the driver. Additionally, mounting of the tactile device 321 to the backside of the foot-plate 325 improves the appearance of the accelerator pedal 322 and the weatherability of the tactile device 321 against rainwater, dust and dirt that may be brought to the foot plate 325 via the driver foot F.

Obviously, various minor changes and modifications of the present invention are possible in light of the above teaching. It is therefore to be understood that within the scope of the appended claims the invention may be practiced otherwise than as specifically described.

What is claimed is:

1. A vehicle state information transmission apparatus comprising:
   a steering wheel actuatable by a driver of a vehicle for operating the vehicle;
   a vehicle state detecting device for detecting a state of the vehicle;

warning indicator for issuing a warning to the driver based on information pertaining to the vehicle state detected by the vehicle state detecting device; and vehicle state information transmitting device for transmitting the information pertaining to the vehicle state detected by the vehicle state detecting device to the driver, wherein the vehicle state information transmitting device comprises a tactile device which transmits a change in the vehicle state via the steering wheel to the driver as a tactile information, and the tactile device is operable in conjunction with the warning indicator such that vehicle state information is perceived by the driver even when the vehicle is operated in loud environments, wherein said tactile device is operable to selectively generate a plurality of geometric tactile information patterns, each having distinct configurations and being operable to produce distinct tactile movements;

wherein one of the geometric tactile information patterns is pre-selected by the driver;

wherein said vehicle state detecting device comprises a lane departure sensor for detecting a lane departure of the vehicle, wherein when the lane departure of the vehicle is detected by the lane departure sensor, the tactile device operates to issue a lane departure warning to the driver by way of one of the pre-selected geometric tactile information patterns transmitted via the steering wheel to the driver; and wherein said tactile device comprises a plurality of actuators incorporated in the steering wheel and arranged in a matrix having a plurality of rows of the actuators lying in a radial direction of the steering wheel and a plurality of columns of the actuators lying in a circumferential direction of the steering wheel, wherein when the lane departure sensor detects a lane departure of the vehicle, the tactile device activates the actuators in one of the columns which corresponds in direction and amount to the detected lane departure of the vehicle.

2. A vehicle state information transmission apparatus comprising:

a steering wheel actuatable by a driver of a vehicle for operating the vehicle;

a vehicle state detecting device for detecting a state of the vehicle; and vehicle state information transmitting device for transmitting the information pertaining to the vehicle state detected by the vehicle state detecting device to the driver, wherein the vehicle state detecting device comprises a steering angle sensor for detecting a steering angle of the steering wheel of the vehicle, and wherein the vehicle state information transmitting device comprises a tactile device operable to selectively generate a plurality of geometric tactile information patterns, each having distinct configurations and being operable to produce distinct tactile movements;

said tactile device further being operable to transmit a change in the vehicle state via the steering wheel to the driver based on one of the geometric tactile information patterns pre-selected by the driver, the tactile device having a variable action pattern which is variable with the progress of turning movement of the vehicle on the basis of information pertaining to the steering angle detected by the steering sensor such that an orientation of the pre-selected geometric tactile information pattern with respect to the driver remains constant regardless of a change in the steering angle.

3. A vehicle state information transmission apparatus comprising:

an accelerator pedal actuatable by a driver of a vehicle for operating the vehicle;

a vehicle state detecting device for detecting a state of a vehicle; and vehicle state information transmitting device for transmitting the information pertaining to the vehicle state detected by the vehicle state detecting device to the driver; and wherein the vehicle state detecting device comprises a travel direction sensor for detecting a travel direction of the vehicle including a forward travel direction and a reverse travel direction, and wherein the vehicle state information transmitting device comprises a tactile device operable to selectively generate a plurality of geometric tactile information patterns, each having distinct configurations and being operable to produce distinct tactile movements;

said tactile device being further operable to transmit a change in the vehicle state via the accelerator pedal to the driver as one of the geometric tactile information patterns having a variable action pattern which is variable in accordance with the travel direction of the vehicle on the basis of information pertaining to the travel direction detected by the travel direction sensor, wherein said one of the geometric tactile information patterns is pre-selected by the driver;

wherein when the vehicle is in an accelerating state, the one of the geometric tactile information patterns transmitted via the accelerator pedal to the driver by the tactile device travels in a toe-to-heel direction of the accelerator pedal, and when the vehicle is in a decelerating state, the one of the geometric tactile information patterns transmitted via the accelerator pedal to the driver via the tactile device travels in a heel-to-toe direction of the accelerator pedal.

4. A vehicle state information transmission apparatus comprising:

a steering wheel actuatable by a driver of a vehicle for operating the vehicle;

a vehicle state detecting device for detecting a state of the vehicle, the vehicle state detecting device comprising a parked vehicle sensor for detecting the vehicle while being in a parked state; and vehicle state information transmitting device for transmitting the information pertaining to the vehicle state detected by the vehicle state detecting device to the driver, wherein the vehicle state information transmitting device comprises a tactile device comprising a plurality of geometric tactile information patterns, each having distinct configurations and being operable to produce distinct tactile movements;

said tactile device being operable to transmit a change in the vehicle state via the steering wheel to the driver as one of the geometric tactile information patterns selectively pre-defined by the driver;

adjustment permission unit for permitting an operation amount adjustment of the tactile device to start;

an adjustment amount input unit for inputting an adjustment amount to thereby increase or decrease the operation amount of the tactile device; and a simulation unit for, on the basis of information pertaining to the parked vehicle detected by the parked vehicle sensor, information pertaining to the permission provided by the adjustment permission unit, and information pertaining to the increase/decrease achieved by the adjustment amount input unit, outputting information to activate the tactile device in the same manner as it does during traveling of the vehicle, while the vehicle is in a parked state;

wherein the vehicle state detecting device further comprises a lane departure sensor for detecting a lane departure of the vehicle, wherein when the lane departure of the vehicle is detected by the lane departure sensor, the tactile device operates to issue a lane departure warning to the driver by way of one of the pre-selected geometric tactile information patterns transmitted via the steering wheel to the driver; and wherein the tactile device comprises a plurality of actuators incorporated in the steering wheel and arranged in a matrix having a plurality of rows of the actuators lying in a radial direction of the steering wheel and a plurality of columns of the actuators lying in a circumferential direction of the steering wheel, wherein when the lane departure sensor detects a lane departure of the vehicle, the tactile device activates the actuators in one of the columns which corresponds in direction and amount to the detected lane departure of the vehicle.

5. The vehicle state information transmission apparatus of claim 2, wherein the steering wheel includes a grip portion for being gripped by the driver, the tactile device being assembled in the grip portion of the steering wheel, the steering wheel further having a guard protrusion disposed in the grip portion and engageable with a hand of the driver to prevent the tactile device from being subjected to undue stress during steering operation.

6. The vehicle state information transmission apparatus of claim 3, wherein the tactile device comprises a vibration generating mechanism assembled with the accelerator pedal.

7. The vehicle state information transmission apparatus of claim 1, wherein each of the geometric tactile information patterns translates across different portions of the tactile device.

8. The vehicle state information transmission apparatus of claim 1, wherein the selected geometric tactile information pattern transforms into a different geometric tactile information pattern.

9. The vehicle state information transmission apparatus of claim 1, further comprising a tactile pattern input unit configured to associate the pre-selected geometric tactile information pattern with the vehicle state.

10. The vehicle state information transmission apparatus of claim 2, wherein the orientation of the pre-selected geometric tactile information pattern is inverted when the steering angle is in a range of 90 degrees to 270 degrees.

11. The vehicle state information transmission apparatus of claim 2, wherein the pre-selected geometric tactile information pattern translates across different portions of the tactile device.

12. The vehicle state information transmission apparatus of claim 11, wherein a direction that the pre-selected geometric tactile information pattern translates across different portions of the tactile device reverses when the steering angle is in a range of 90 degrees to 270 degrees.

13. The vehicle state information transmission apparatus of claim 1, wherein each of the geometric tactile information patterns includes the simultaneous actuation of at least a proper subset of the actuators.

14. The vehicle state information transmission apparatus of claim 3, wherein during operation, a frequency of a wave motion produced by the tactile device is directly proportion to a lateral acceleration of the vehicle.

15. The vehicle state information transmission apparatus of claim 3, wherein during operation, a frequency of a wave motion produced by the tactile device is directly proportion to a vehicle speed.

* * * * *